(12) United States Patent
Bergh et al.

(10) Patent No.: US 7,150,994 B2
(45) Date of Patent: Dec. 19, 2006

(54) PARALLEL FLOW PROCESS OPTIMIZATION REACTOR

(75) Inventors: H. Sam Bergh, San Francisco, CA (US); James R. Engstrom, Ithaca, NY (US); Shenheng Guan, Palo Alto, CA (US); Daniel Meron Pinkas, Alameda, CA (US); Kyle W. Self, San Jose, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 838 days.

(21) Appl. No.: 09/801,390

(22) Filed: Mar. 7, 2001

(65) Prior Publication Data

US 2002/0048536 A1 Apr. 25, 2002

Related U.S. Application Data

(63) Continuation-in-part of application No. 09/518,794, filed on Mar. 3, 2000, now Pat. No. 6,749,814.

(60) Provisional application No. 60/229,984, filed on Sep. 2, 2000, provisional application No. 60/187,566, filed on Mar. 7, 2000, provisional application No. 60/122,704, filed on Mar. 3, 1999.

(51) Int. Cl.
*G01N 31/10* (2006.01)
*B01J 8/00* (2006.01)

(52) U.S. Cl. ............ 436/37; 422/99; 422/103; 422/104; 422/129; 422/130; 422/131; 422/196; 436/43; 436/52; 436/155; 436/157; 436/158; 436/159; 436/181; 436/183

(58) Field of Classification Search ............ 422/62, 422/99–104, 129–131, 196; 436/37, 43, 436/52, 155, 157–159, 181, 183
See application file for complete search history.

(56) References Cited

U.S. PATENT DOCUMENTS

| | | | | |
|---|---|---|---|---|
| 3,431,077 A | | 3/1969 | Danforth | 23/253 |
| 3,501,548 A | * | 3/1970 | Doane et al. | 585/623 |
| 3,536,452 A | | 10/1970 | Norton et al. | 23/259 |
| 3,753,653 A | * | 8/1973 | Brieva et al. | 436/139 |
| 3,828,171 A | * | 8/1974 | Griffin | 700/273 |
| 3,875,499 A | * | 4/1975 | Roberts | 324/468 |
| 4,099,923 A | | 7/1978 | Milberger | 23/254 R |

(Continued)

FOREIGN PATENT DOCUMENTS

DE 27 14 939 B2 11/1979

(Continued)

OTHER PUBLICATIONS

Goetz, V. N. et al, Industrial & Engineering Chemistry, Product Research and Development 1974, 13, 110-114.*

(Continued)

*Primary Examiner*—Arlen Soderquist

(57) ABSTRACT

Parallel flow reaction systems comprising four or more reaction channels are disclosed. Distribution systems, and parallel flow reaction systems comprising such distribution systems are also disclosed. Specifically, the distribution systems comprise one or more subsystems, including for example, a flow-partitioning subsystem for providing a different flow rate to each of the four or more reactors, a pressure-partitioning subsystem for providing a different reaction pressure in the reaction cavity of each of the four or more reactors, and a feed-composition subsystem for providing a different feed composition to each of the four or more reactors. In preferred embodiments, the one or more subsystems can comprise at least one set of four or more flow restrictors, each of the four or more flow restrictors having a flow resistance that varies relative to other flow restrictors in the set.

186 Claims, 47 Drawing Sheets

(FLOW PARTITIONING)

(PRESSURE PARTITIONING)

U.S. PATENT DOCUMENTS

| | | | |
|---|---|---|---|
| 4,705,669 A | 11/1987 | Tsuji et al. | 422/93 |
| 4,869,282 A | 9/1989 | Sittler et al. | 137/15 |
| 4,996,387 A | 2/1991 | Gerhold et al. | 585/654 |
| 5,089,232 A | 2/1992 | May | 422/83 |
| 5,204,270 A * | 4/1993 | LaCount | 436/157 |
| 5,252,294 A | 10/1993 | Kroy et al. | 422/102 |
| 5,304,354 A * | 4/1994 | Finley et al. | 422/196 |
| 5,324,483 A | 6/1994 | Cody et al. | 422/131 |
| 5,417,938 A | 5/1995 | Shelden et al. | 422/196 |
| 5,534,328 A | 7/1996 | Ashmead et al. | 428/166 |
| 5,580,523 A | 12/1996 | Bard | 422/50 |
| 5,589,136 A | 12/1996 | Northrup et al. | 422/102 |
| 5,593,642 A | 1/1997 | DeWitt et al. | 422/131 |
| 5,595,712 A | 1/1997 | Harbster et al. | 422/129 |
| 5,603,351 A | 2/1997 | Cherukuri et al. | 137/597 |
| 5,611,214 A | 3/1997 | Wegeng et al. | 62/498 |
| 5,639,423 A | 6/1997 | Northrup et al. | 122/50 |
| 5,658,537 A | 8/1997 | Dugan | 422/191 |
| 5,683,517 A * | 11/1997 | Shan | 118/723 E |
| 5,690,763 A | 11/1997 | Ashmead et al. | 156/60 |
| 5,750,906 A | 5/1998 | Parker et al. | 73/863.73 |
| 5,776,359 A | 7/1998 | Schultz et al. | 252/62.51 |
| 5,780,748 A | 7/1998 | Barth | 73/861.47 |
| 5,811,062 A | 9/1998 | Wegeng et al. | 422/129 |
| 5,833,926 A | 11/1998 | Wurzel et al. | 422/81 |
| 5,842,787 A | 12/1998 | Kopf-Sill et al. | 366/340 |
| 5,843,385 A | 12/1998 | Dugan | 422/191 |
| 5,863,502 A * | 1/1999 | Southgate et al. | 422/58 |
| 5,863,801 A | 1/1999 | Southgate et al. | 436/63 |
| 5,865,417 A | 2/1999 | Harris et al. | 251/11 |
| 5,869,004 A | 2/1999 | Parce et al. | 422/100 |
| 5,872,010 A | 2/1999 | Karger et al. | 436/173 |
| 5,922,591 A | 7/1999 | Anderson et al. | 435/287.2 |
| 5,927,325 A | 7/1999 | Bensaoula et al. | 137/375 |
| 5,959,297 A | 9/1999 | Weinberg et al. | 250/288 |
| 5,985,356 A | 11/1999 | Schultz et al. | 427/8 |
| 6,004,617 A | 12/1999 | Schultz et al. | 427/8 |
| 6,030,917 A | 2/2000 | Weinberg et al. | 502/104 |
| 6,033,544 A | 3/2000 | Demers et al. | 204/450 |
| 6,063,633 A | 5/2000 | Willson | 436/37 |
| 6,087,181 A | 7/2000 | Cong | 436/37 |
| 6,149,882 A | 11/2000 | Guan et al. | 422/211 |
| 6,175,409 B1 | 1/2001 | Nielsen et al. | 356/337 |
| 6,647,342 B1 * | 11/2003 | Iglesia et al. | 702/22 |
| 6,737,026 B1 * | 5/2004 | Bergh et al. | 422/130 |
| 6,749,814 B1 * | 6/2004 | Bergh et al. | 422/130 |
| 2002/0014106 A1 | 2/2002 | Srinivasan et al. | |
| 2002/0042140 A1 | 4/2002 | Hagemeyer et al. | |
| 2002/0045265 A1 | 4/2002 | Bergh et al. | |
| 2002/0048536 A1 | 4/2002 | Bergh et al. | |

FOREIGN PATENT DOCUMENTS

| | | |
|---|---|---|
| DE | 234 941 A1 | 4/1986 |
| DE | 196 32 779 A1 | 2/1998 |
| DE | 198 05 719 A1 | 8/1999 |
| DE | 198 06 848 A1 | 8/1999 |
| DE | 198 09 477 A1 | 9/1999 |
| DE | 198 55 894 A1 | 6/2000 |
| EP | 0 796 654 A2 | 9/1997 |
| EP | 0 886 143 A1 | 12/1998 |
| GB | 967261 | 3/1962 |
| JP | 54-67462 * | 5/1979 |
| JP | 55-22101 * | 2/1980 |
| WO | WO 96/15576 | 5/1996 |
| WO | WO 97/32208 | 9/1997 |
| WO | WO 98/00231 | 1/1998 |
| WO | WO 98/03521 | 1/1998 |
| WO | WO 98/07026 | 2/1998 |
| WO | WO 98/13137 | 4/1998 |
| WO | WO 98/13605 | 4/1998 |
| WO | WO 98/16949 | 4/1998 |
| WO | WO 98/22811 | 5/1998 |
| WO | WO 98/53236 | 11/1998 |
| WO | WO 98/55852 | 12/1998 |
| WO | WO 98/56505 | 12/1998 |
| WO | WO 99/41005 | 8/1999 |
| WO | WO 99/64160 | 12/1999 |
| WO | WO 00/09255 | 2/2000 |
| WO | WO 00/14529 | 3/2000 |
| WO | WO 00/17413 | 3/2000 |
| WO | WO 00/51720 | 9/2000 |
| WO | WO 01/00315 | 1/2001 |

OTHER PUBLICATIONS

Creer, J. G. et al, Applied Catalysis 1986, 22, 85-95.*
Calleja, G. et al, Fuel 1995, 74, 445-451.*
Hogan, R. J. et al, Preprints—American Chemical Society, Division of Petroleum Chemistry 1971, 16, D35-D42.*
Steininger, M. et al, Journal of Chromatography 1982, 243, 279-284.*
Johnston, H. D. et al, Preprints—American Chemical Society, Division of Petroleum Chemistry 1983, 28, 960-972.*
Korf, C. J. et al, CSIR Report CENG 1986, 584, 31 pages.*
Kapteijn, F. et al, Industrial & Engineering Chemistry Research 1993, 32, 445-452.*
Kafarov, V. V. et al, Chemie Ingenieur Technik 1994, 66, 351-354.*
Baumhardt-Neto, R. et al, Polymer Bulletin 1998, 40, 103-109.*
Berenschot, J.W., et al., "Micromachining of {111} Plates in <001> Oriented Silicon", *J. Micromech. Microeng.* 8 (1998) 104-107.
Brenchley, D.L. et al., "Status of Microchemical Systems Development in the United States of America", AICHE, 2nd International Conference on Microreaction Technology, New Orleans, Louisiana, Mar. 9-12, 1998, pp. 18-23.
Bruns, M.W., "The Application of Silicon Micromachining Technology and High Speed Gas Chromatography to On-Line Process Control", *MTI Analytical Instruments*.
Bruns, M.W., "Silicon Micromachining and High Speed Gas Chromatography", *IEEE*, 1992, pp. 1640-1644.
Bryzek, J. et al., "Micromachines on the March", *IEEE Spectrum*, 1994, pp. 20-31.
Burns, J.R. et al., "Development of a Microreactor for Chemical Production", AICHE, 2nd International Conference on Microreaction Technology, New Orleans, Louisiana, Mar. 9-12, 1998, pp. 39-44.
Cooke, William S., 403P "Decreasing Gas Chromatography Analysis Times Using a Multicapillary Column", PITTCON '96, Chicago, Illinois, Mar. 3-8, 1996.
Franz, A.J. et al., "New Operating Regimes and Applications Feasible with Microreactors", MIT, 1997, pp. 33-38.
Greenway, G.M. et al., "The Use of a Novel Microreactor for High Throughput Continuous Flow Organic Synthesis", *Sensors and Actuators B*, 2000, pp. 153-158.
Grosjean et al., "A Practical Thermopneumatic Valve", *IEEE*, 1999, pp. 147-152.
Haswell, Stephen J. et al., "The Application of Micro Reactors to Synthetic Chemistry", *Chem. Commun.*, 2001, 391-398.
Hendrix, Charles D., "What Every Technologist Should Know About Experimental Design", *Chemtech*, 1979, pp. 167-174.
Henning, A.K. et al., "Microfluidic MEMS for Semiconductor Processing", *IEEE*, 1998, vol. 21, pp. 329-337.
Hinderling, C. et al., "Rapid Screening of Olefin Polymerization Catalyst Libraries by Electrospray Ionization Tandem Mass Spectrometry", *Angew. Chem. Int. Ed.*, 1999, 38, No. 15, pp. 2253-2256.
Jäckel, K.-P., "Microtechnology: Application Opportunities in the Chemical Industry", *DECHEMA Monographs*, 1996, vol. 132, VCH Vertagsgesellschaft, pp. 29-50.
Johansson, S. et al., "Nanofabrication of Model Catalysts and Simulations of their Reaction Kinetics", *J. Vac. Sci. Technol.*, 1999, A 17(1), pp. 297-302.
Klein, J. et al., "Combinatorial Material Libraries on the Microgram Scale with an Example of Hydrothermal Synthesis", *Angew. Chem. Int. Ed.*, 1998, 37(24); 3369-3372.

Lambert, R.H. et al., "Utilization of a Portable Microchip Gas Chromatograph to Identify and Reduce Fugitive Emissions at a Pharmaceutical Manufacturing Plant", *Field Analytical Chemistry and Technology*, 1997, 1(6): 367-374.

Löwe, H. et al., "Microreactor Concepts for Heterogeneous Gas Phase Reactions", AICHE, 2nd International Conference on Microreaction Technology, New Orleans, Louisiana, Mar. 9-12, 1998, pp. 63-73.

Matlosz, M. et al., "Microsectioned Electrochemical Reactors for Selective Partial Oxidation", AICHE, 2nd International Conference on Microreaction Technology, New Orleans, Louisiana, Mar. 9-12, 1998, pp. 54-59.

Oosterbroek, R.E. et al., "Utilizing the {111} Plane Switch-Over Etching Process for Micro Fluid Control Applications".

Pérez-Ramírez, J. et al., "The Six-Flow Reactor Technology-A Review on Fast Catalyst Screening and Kinetic Studies", *Catalysis Today*, 2000, 60, 93-109.

Randhava, R. et al., "Advanced Configurations for Catalyst Research", *CEP*, 1983, pp. 52-58.

Rich et al., "An 8-Bit Microflow Controller Using Pneumatically-Actuated Valves", *IEEE*, 1999, pp. 130-134.

Sadler, D.J. et al., "A New Magnetically Actuated Microvalve For Liquid and Gas Control Applications", Center for Microelectronic Sensors and MEMS, University of Cincinnati.

Sie, S.T., "Miniaturization of Hydroprocessing Catalyst Testing Systems: Theory and Practice", *AIChE Journal*, 1996, vol. 42, No. 12, pp. 3498-3507.

Srinivasan, R. et al., "Micromachined Reactors for Catalytic Partial Oxidation Reactions", AICHE Journal, 1997, vol. 43, No. 11, pp. 3059-3069.

Tonkovich, A.Y. et al, "The Catalytic Partial Oxidation of Methane in a Microchannel Chemical Reactor", AICHE, 2nd International Conference on Microreaction Technology, New Orleans, Louisiana, Mar. 9-12, 1998, pp. 45-53.

Wang et al., "A Parylene Micro Check Valve", *IEEE*, 1999, pp. 177-182.

Weißmeier, G. et al., "Strategy for the Development of Micro Channel Reactors for Heterogeneously Catalyzed Reactions", 24-32.

Zdeblick et al., "Thermopneumatically Actuated Microvalves and Integrated Electro-Fluidic Circuits", TRF, Solid State Sensor and Actuator Workshop, Hilton Head, South Carolina, Jun. 13-16, 1994, pp. 251-255.

Zech, T. et al., "Simultaneous Screening of Catalysts in Microchannels: Methodology and Experimental Setup".

* cited by examiner (PRESSURE PARTITIONING)

(FLOW/PRESSURE PARTITIONING)

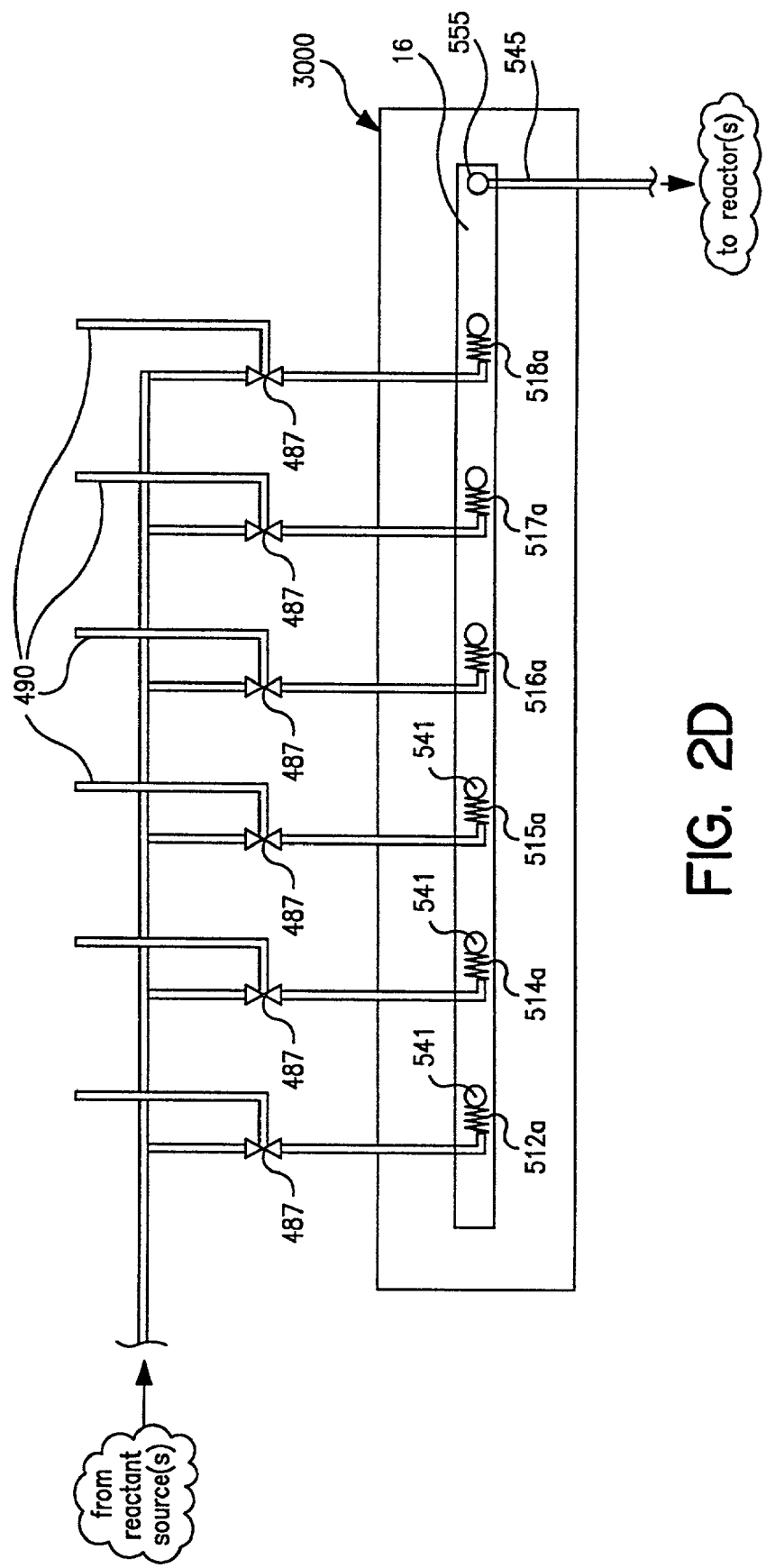

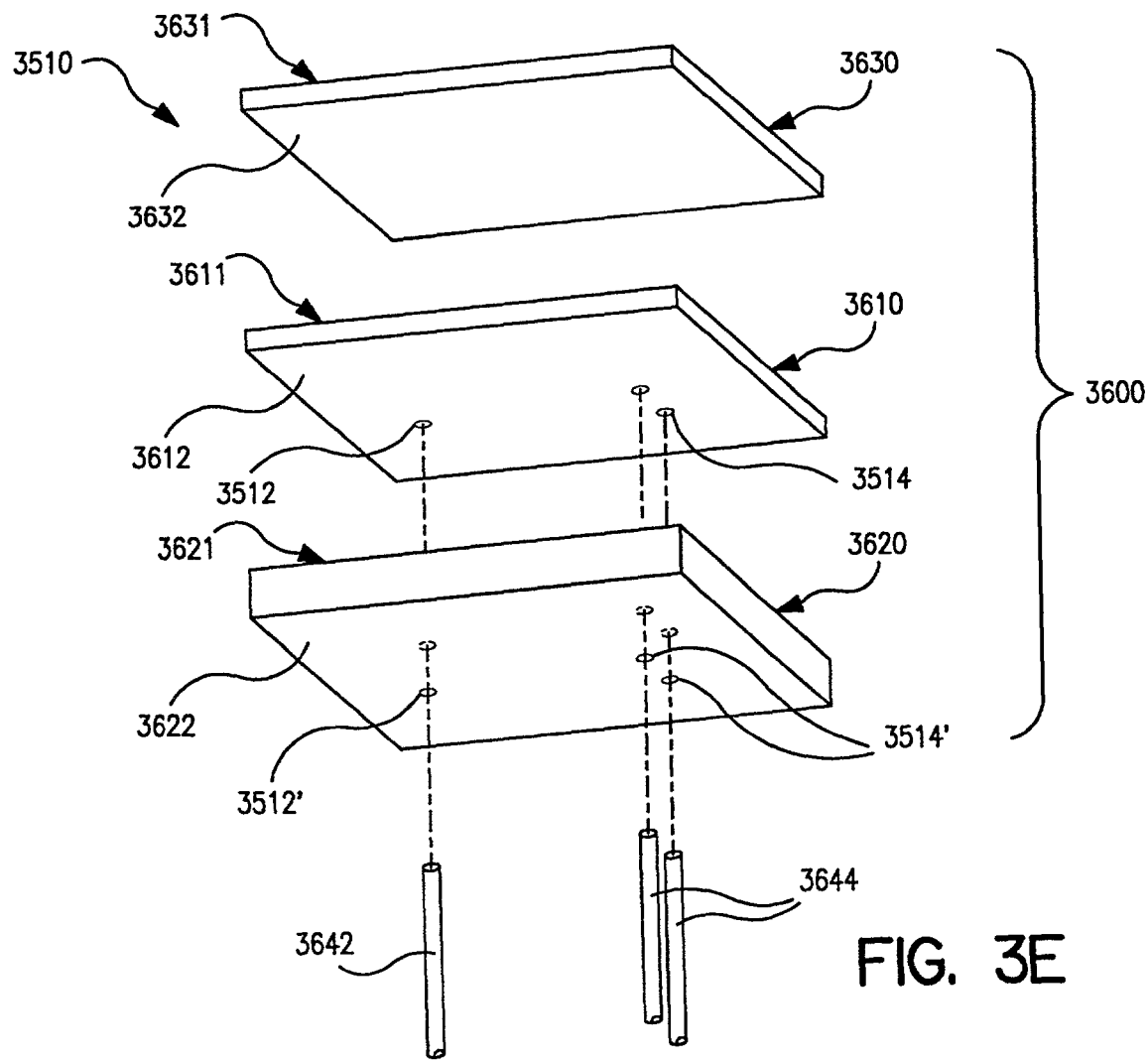
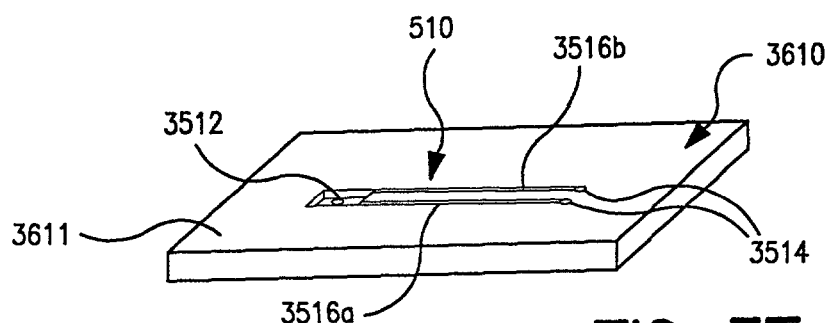
FIG. 3E
FIG. 3F

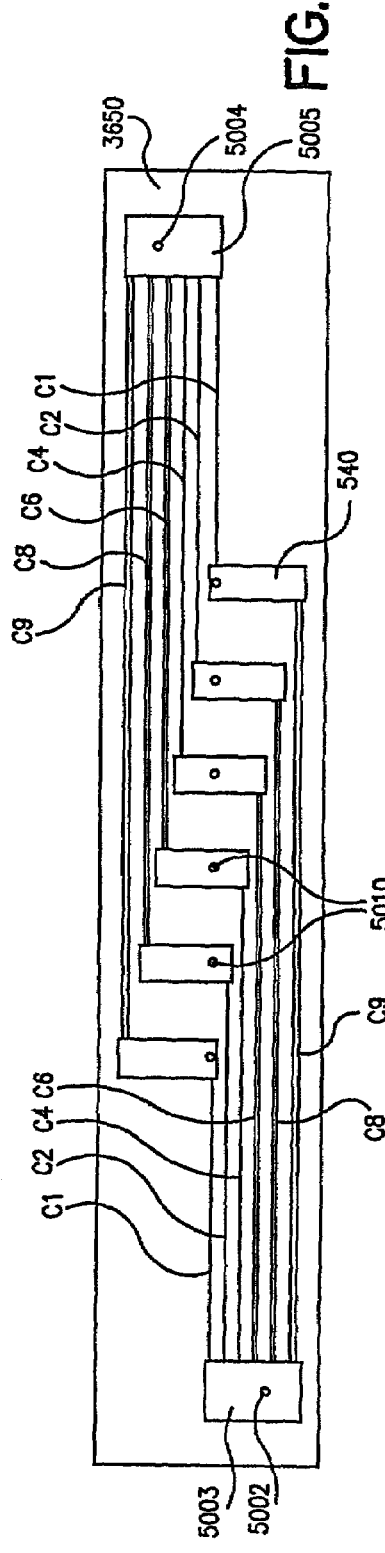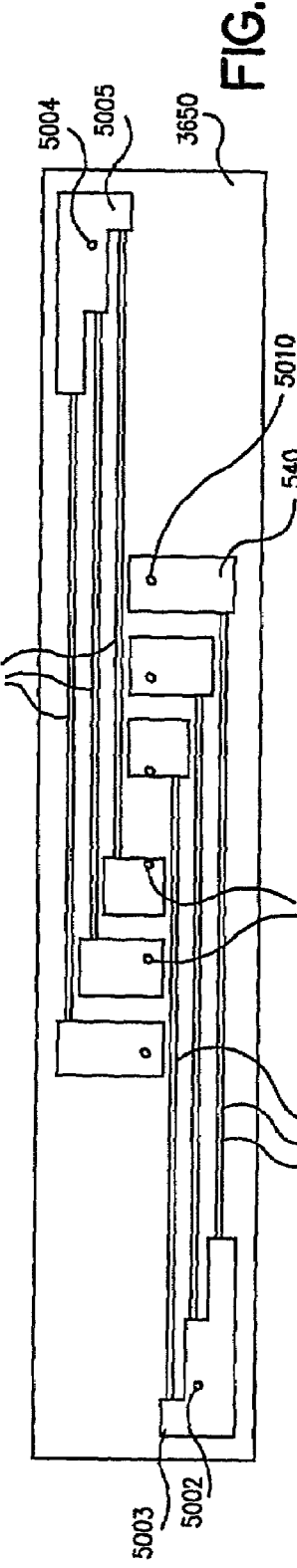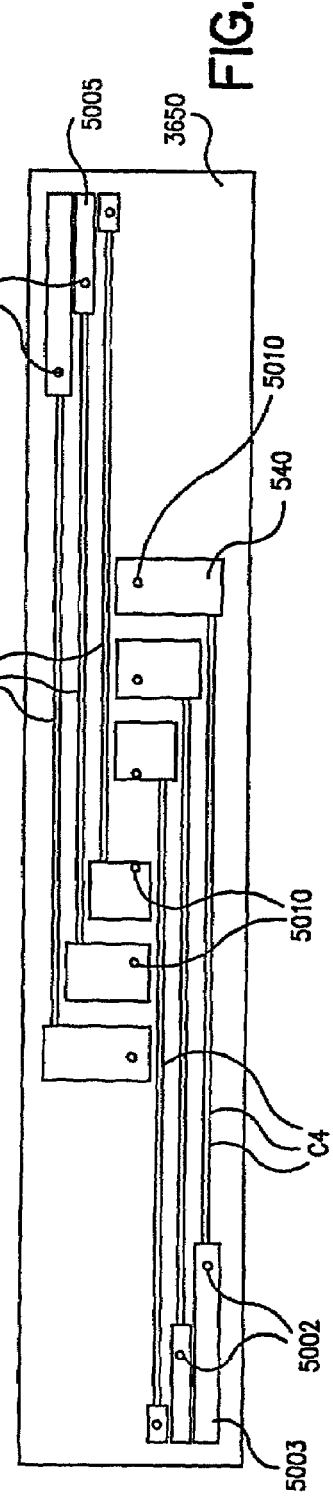

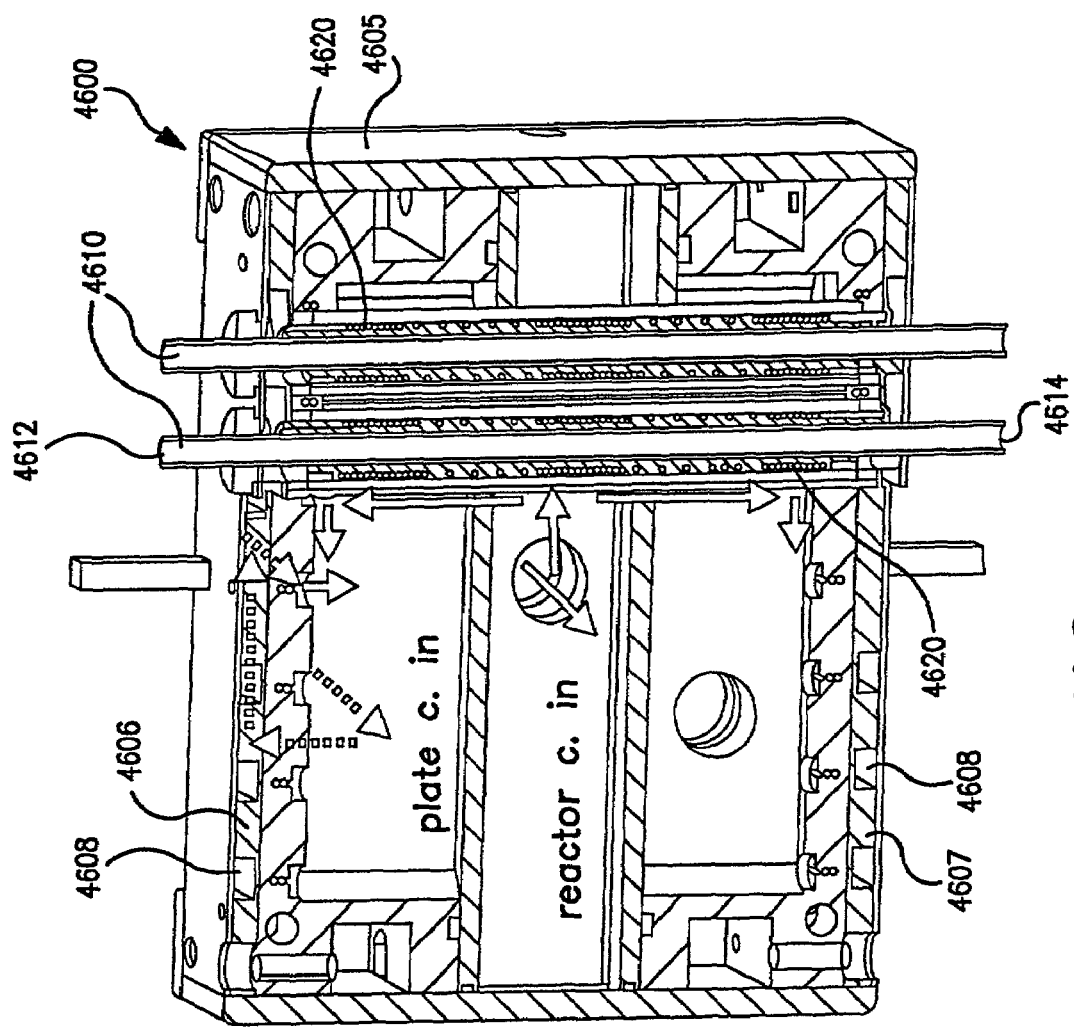
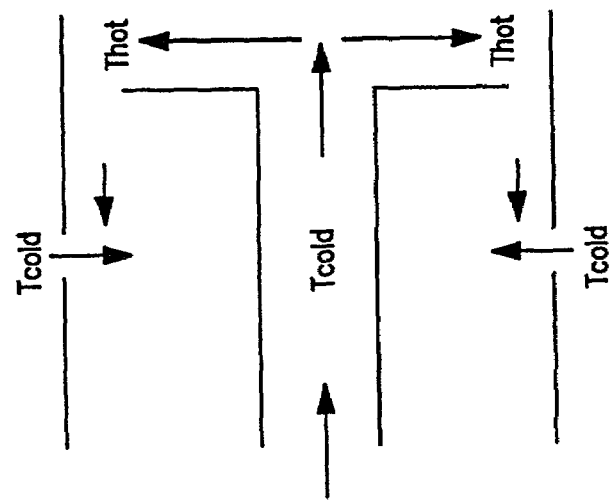
FIG. 110

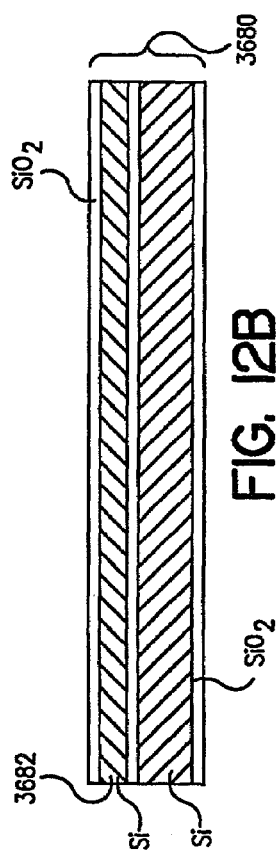
FIG. 12B
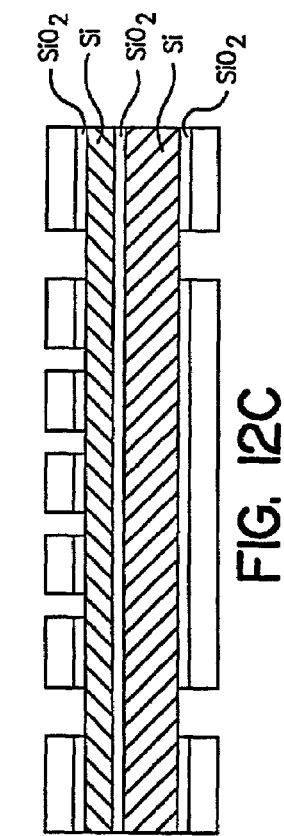
FIG. 12C
FIG. 12D
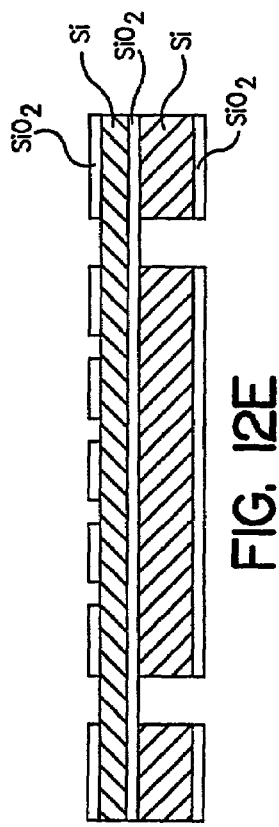
FIG. 12E

PARALLEL FLOW PROCESS OPTIMIZATION REACTOR

This application is a continuation-in-part of co-owned, U.S. patent application Ser. No. 09/518,794, entitled "Chemical Processing Microsystems, Diffusion-Mixed Microreactors and Methods for Preparing and Using Same", filed Mar. 3, 2000 by Bergh et al., now issued as U.S. Pat. No. 6,749,814. The present invention is also related to, and claims priority to co-owned, U.S. patent application Ser. No. 60/187,566 entitled "Apparatus and Methods for Multi-Variable Optimization of Reaction Systems and Other Chemical Processing Microsystems", filed Mar. 7, 2000 by Bergh et al., and to co-owned, U.S. patent application Ser. No. 60/229,984 entitled "Apparatus and Methods for Optimization of Process Variables in Reaction Systems and Other Chemical Processing Systems", filed Sep. 2, 2001 by Bergh et al.

BACKGROUND OF INVENTION

The present invention generally relates to materials science research, and specifically, to combinatorial (i.e., high throughput) materials science research directed toward the identification and/or optimization of new materials. The invention particularly relates, in preferred embodiments, to apparatus and methods for optimizing chemical reaction systems, such as chemical reaction systems involving heterogeneous catalysts.

In recent years, significant efforts have been extended toward developing parallel systems, such as parallel reactors, for the purpose of screening different materials, such as heterogeneous catalysts, for particular properties of interest, such as catalysis. U.S. Pat. No. 5,985,356 to Schultz et al. discloses synthesis and screening arrays of materials in parallel for catalysis, and U.S. Pat. No. 6,063,633 to Willson discloses parallel flow reactors, and parallel screening techniques (e.g., thermography, chromatography, etc.) for evaluating catalysis. A substantial portion of such effort has, however, focussed on apparatus and methods for evaluating compositional space of the materials (e.g., heterogeneous catalysts) of interest, while only a relatively small portion of such effort has been directed toward apparatus and methods for evaluating other parameter spaces—in addition to compositional space. More specifically for example, in the context of heterogeneous catalysis research, only limited attention has been focused on the development of apparatus and methods for high-throughput, parallel optimization of important parameters such as catalyst (or catalyst precursor) processing conditions and reaction conditions.

A number of parallel flow reactors are known in the art. For example, PCT application WO 98/07206 (Hoechst) discloses a parallel flow reactor said to be useful for evaluating chemical reactions using minaturized reactors, but does not address important considerations such as distribution systems for simultaneously delivering reactants to large numbers of flow reactors. U.S. Pat. No. 6,149,882 to Guan et al. discloses, among other facets, a parallel flow reactor for screening of heterogeneous catalysts in which feed flow is controlled using flow restrictors such as capillaries to obtain substantially the same flow in each of the reaction channels. WO 97/32208 (Technology Licensing Co., Ltd.) and DE 19809477 (Schuth) also contemplate parallel flow reactors having uniform flow through each of the reaction channels. WO 99/41005 (BASF) and DE 19806848 (BASF) disclose parallel flow reactor configurations as well. These and other reactor designs known in the art do not, however, specifically address approaches or contemplate apparatus for investigating and/or optimizing process conditions simultaneously in large numbers of reactors. More recently, WO 00/51720 (Symyx Technologies, Inc.) discloses a parallel flow reactor design that addresses several significant technical challenges, including flow distribution challenges for parallel screening of catalysts in very large numbers.

Although controlling reaction conditions is well known for single reaction systems, or even for larger scale (e.g. production scale and/or pilot plant scale) applications, existing approaches would not be well-suited for parallel reaction systems, due to differences in reactor scale and associated effects on reaction parameters (e.g., on mass transfer and/or heat transfer), or due to expense (e.g. of conventional mass flow controllers). Known reactors or microreactors also have common limitations, for example, with respect to a low throughput (e.g., the number of catalysts that can be screened over a given period of time), a narrow distribution of heterogeneous catalyst contact times, a large amount of each (often expensive) candidate catalyst required to effect the chemical conversion, the potential inherent negative influence of microreactor materials on a reaction of interest, a high degree of complexity, a lack of flexibility for analyzing the results of the chemical conversion, in some cases, a lack of scalability of research results to production-scale systems, and a large spatial footprint.

Hence, there remains a need in the art to overcome such deficiencies, and to provide for parallel flow reactors having robust operational capabilities to systematically investigate and/or optimize chemical process conditions such as reaction conditions for a chemical reaction of interest. Significant advances were achieved, in this regard, more recently by Bergh et al., who disclosed in WO 00/51720 (Symyx Technologies, Inc.) a parallel flow reactor design that addresses several of such technical challenges, including flow distribution challenges for parallel screening of catalysts in very large numbers, and for evaluation of process conditions in a parallel flow reactor. The present invention builds on, and offers substantial advances over this most recent work.

SUMMARY OF THE INVENTION

It is therefore an object of the present invention to provide apparatus and methods for more efficient identification and/or optimization of materials and/or conditions in chemical processing systems involving multiple variables (e.g., chemical reaction systems), where each of such variables can be independently significant with respect to performance in the application of interest.

Briefly, therefore, the present invention is directed to parallel (e.g., multi-channel) chemical processing systems, and especially, chemical processing microsystems. Although primarily discussed and exemplified herein in the context of parallel reactors, and especially parallel microreactors, it is to be understood that the invention has applications in other chemical processing systems (e.g., mixing systems, separation systems, material-processing systems, etc.), some of which are discussed in varying detail below.

The invention is directed, in one embodiment, to parallel reaction systems having the capability to simultaneously vary (between separate channels) one or more, and preferably two or more of the following process conditions (in addition to the capability of varying the catalyst composition and time of reaction): flow rates (and, correspondingly, residence time), pressure, temperature and feed composition. In one preferred embodiment, for example, a parallel reaction system has the capability to simultaneously vary feed composition and the temperature in each of four or more reactors. In another preferred embodiment, a parallel reaction system has the capability to simultaneously vary feed composition and either flow rates or pressure. In other preferred embodiments, the parallel reaction systems have the capability to vary three or more, and preferably each of the above-listed four process conditions simultaneously. For example, a parallel reaction system has the capability to simultaneously vary feed composition, temperature and either flow rates or pressure. In a further embodiment, the parallel reaction systems can have the capability to simultaneously vary each of feed composition, temperature, flow rates and pressure. Although one may, from an operational point of view, vary only one or some subset of the aforementioned parameters simultaneously, the capability to vary such parameters simultaneously between separate channels—using a single, integrated reaction system—affords extreme flexibility in optimizing processes involving several process condition variables.

The chemical reaction system of the invention generally comprises four or more reactors and a fluid distribution system. Each of the reactors comprises a surface defining a reaction cavity for carrying out a chemical reaction, an inlet port in fluid communication with the reaction cavity, and an outlet port in fluid communication with the reaction cavity. The reaction cavity has a volume of not more than about 100 ml, preferably not more than about 50 ml, 20 ml, or 10 ml, and in some applications, not more than about 7 ml, 5 ml, 3 ml, 1 ml, 100 $\mu$l, 10 $\mu$l or 1 $\mu$l. The reaction volume can be the same or different for the four or more reactors. The fluid distribution system can simultaneously supply one or more reactants from one or more external reactant sources to the inlet port of the reaction cavity for each of the four or more reactors, and can discharge a reactor effluent from the outlet port of each such reaction cavity to one or more external effluent sinks. As such, the invention generally comprises a four- (or more-) channel parallel flow reactor, preferably of micro-scale (e.g, not more than about 1 ml, for purposes hereof). The reaction system can further comprise a detection system, integral or separate from the reaction system, for detecting one or more reaction products or unreacted reactants in the effluent streams of the four or more reactors.

The distribution system of the chemical reaction system can comprise one or more subsystems, including for example, a flow-partitioning subsystem for providing (i.e. having the operational capability to provide) a different flow rate to each of the four or more reactors, a pressure-partitioning subsystem for providing (i.e. having the operational capability to provide) a different reaction pressure in the reaction cavity of each of the four or more reactors, and a feed-composition subsystem for providing (i.e. having the operational capability to provide) a different feed composition to each of the four or more reactors. In preferred embodiments, the one or more subsystems can comprise at least one set of four or more flow restrictors, each of the four or more flow restrictors having a flow resistance that varies relative to other flow restrictors in the set. The particular nature of the flow restrictors is not narrowly critical, and can include capillaries and microfluidic channels, including microfabricated channels. In a particularly-preferred embodiments, the flow restrictors are integral with a substrate or with one or more microchip bodies mounted—fixedly or detachably—on a substrate. The flow restrictors are especially advantageous when applied as modular microfluidic chips comprising one or more microchip bodies detachably mounted on a substrate, and a releasable seal (e.g., one or more gaskets or o-rings) situated between the one or more microchip bodies and the substrate. The various distribution subsystems can be physically separate and or integrated, and can in some embodiments, include common (shared) components (e.g., flow restrictors). The distribution system (as a whole), and/or subsystems thereof preferably comprise an essential absence of reactor components (e.g., components having one or more surfaces that define the reaction cavity). The distribution system, or subsystems thereof can, however, include reactor components in some embodiments.

The flow-partitioning subsystem preferably comprises a set of four or more inlet flow restrictors, where each of the four or more inlet flow restrictors provides fluid communication between at least one reactant source and one of the four or more reactors. Each of the four or more inlet flow restrictors has a flow resistance that varies relative to other inlet flow restrictors in the set. The flow-partitioning subsystem can alternatively, or additionally, comprise a set of four or more outlet flow restrictors, where each of the four or more outlet flow restrictors provides fluid communication between one of the four or more reactors and at least one effluent sink. Each of the four or more outlet flow restrictors can have a flow resistance that varies relative to other outlet flow restrictors in the set.

The pressure-partitioning subsystem can comprise a set of four or more inlet flow restrictors, where each of the four or more inlet flow restrictors provides fluid communication between at least one reactant source and one of the four or more reactors. Each of the four or more inlet flow restrictors has a flow resistance that varies relative to other inlet flow restrictors in the set. Additionally, or alternatively, the pressure-partitioning subsystem can comprise a set of four or more outlet flow restrictors. Each of the four or more outlet flow restrictors provides fluid communication between one of the four or more reactors and at least one effluent sink. The flow resistance of each of the four or more outlet flow restrictors varies relative to other outlet flow restrictors in the set.

The flow-partitioning and pressure-partitioning subsystems can be integral with each other, such that each of such subsystems are inherently effected by the same set of inlet flow restrictors and outlet flow restrictors. Alternatively, separate sets of inlet and outlet flow restrictors can be employed to effect the flow-partitioning and the pressure-partitioning subsystems. Various specific configurations are specifically contemplated, including for example, where the set of inlet flow restrictors and the set of outlet flow restrictors are adapted to provide for a different flow rate to each of the four or more reactors, while maintaining substantially the same pressure in each of the four or more reactors. Alternatively, the set of inlet flow restrictors and the set of outlet flow restrictors can be adapted to provide for a different pressure in each of the four or more reactors, while maintaining substantially the same flow-rate to each of the four or more reactors. In a further approach, the set of inlet flow restrictors and the set of outlet flow restrictors can be adapted to provide for a different flow-rate to each of the four or more reactors, and additionally, a different pressure in each of the four or more reactors.

The flow-partitioning and/or pressure-partitioning subsystems of the chemical reaction systems can be configured in a number of ways to provide a substantial degree of operational flexibility for simultaneously, and variably controlling the flow rate and/or the pressure in each of the four or more reactions. In particular, significant flexibility is realized by configurations that allow, for each of the four or more reactors (and for both the inlet and outlet side), selection from among pluralities of flow restrictors for each one of the reactors, and/or selection from among sets of flow restrictors. More specifically, in one preferred approach, the flow-partitioning and/or pressure-partitioning subsystem can include a first plurality, a second plurality, a third plurality and a fourth plurality of selectable dedicated inlet flow restrictors (and/or outlet flow restrictors) having, in each case, different flow resistances. The first, second, third and fourth plurality of selectable dedicated inlet (outlet) flow restrictors can comprise two or more inlet (outlet) flow restrictors that provide selectable fluid communication between the reactant source (or effluent sink) and the first, second, third and fourth reactor, respectively. In another approach, flow-partitioning and/or pressure-partitioning subsystems can include a series of selectable sets of inlet (and/or outlet) flow restrictors. Such a series can comprise a first set of four or more inlet (outlet) flow restrictors and a second set of four or more inlet (outlet) flow restrictors. Each of the sets comprises first, second, third and fourth flow restrictors providing fluid communication between a reactant source (or effluent sink) and the first, second, third and fourth reactors, respectively. The first, second, third and fourth flow restrictors of the first (or second) set have a different flow resistance relative to other within that set. Various valves and/or valve configurations can be used to select from among different pluralities of flow restrictors in dedicated fluid communication with a particular reactor, or from among the series of sets of flow restrictors, including selection valves, individual isolation valves, sets of isolation valves and/or arrays of isolation valves, among others. The flow restrictors can, as noted above, be microfabricated and/or microfluidic channels, and can be integral with a substrate or with one or more microchip bodies mounted on a substrate. The isolation valves can likewise be microvalves, such as microfluidic valves or microfabricated microvalves, and can be integral with a substrate or with one or more microchip bodies mounted on a substrate.

The reaction system can, in addition to, or alternatively to, having the capability to independently or jointly vary reactant flow rate and/or pressure, include embodiments in which the feed composition can be simultaneously varied in the four or more reactors for the systematic evaluation of the effect of feed composition on the particular reaction of interest.

A preferred feed composition subsystem can generally comprise four or more mixing zones with each of the four or more mixing zones being in fluid communication with one of the four or more reactors. First and second feed component sources are in fluid communication with each of the four or more mixing zones. The first feed component source is supplied to the various mixing zones through a set of four or more first-feed-component flow restrictors (i. e., each of the four or more first-feed-component flow restrictors provides fluid communication between the first feed component source and one of the four or more mixing zones). Each of the four or more first-feed-component flow restrictors have a flow resistance that varies relative to other first-feed-component flow restrictors in the set. The second feed component source can also be supplied to the various mixing zones through a set of four or more second-feed-component flow restrictors (having substantially the same or different flow resistances).

Various specific configurations are specifically contemplated, with substantial operational flexibility achieved by selecting from among various entities of flow restrictors to achieve one or more sets of feed-component flow restrictors. For example, with consideration to providing the first feed component from its source—a first-feed-component flow restrictor can be selected for each mixing zone from each of a first plurality, second plurality, third plurality and fourth plurality of selectable, dedicated first-feed-component flow restrictors—each of which have different flow resistances within the plurality, and as such, provide selectable fluid communication between the first feed component source and the respective mixing zone. Alternatively, and also with respect to supplying the first feed component, a series of sets of first-feed-component flow restrictors can be provided, with selection between sets. Considering now the case where selection is made to include flow restrictors for both the first and second feed components, such selection is preferably made between groups of feed-component flow restrictors (each group comprising at least one first-feed-component flow restrictor and at least one second-feed-component flow restrictor). As such, selection is essentially made between different ratios of first and second feed components for the mixing zone associated with that group. In a further extrapolation, selection is made between a series of sets of groups of feed-component flow restrictors, such that a combination of feed-component ratios are selected for all of the mixing zones. Various valves and/or valve configurations can be used to select from among different pluralities, groups and/or sets of feed-component flow restrictors, including selection valves, individual isolation valves, groups of isolation valves, series of groups of isolation valves, sets of isolation valves and/or arrays of isolation valves, among others. The feed-component flow restrictors can, as noted above, be microfabricated and/or microfluidic channels, and can be integral with a substrate or with one or more microchip bodies mounted on the substrate. The isolation valves can likewise be microvalves, such as microfluidic valves or microfabricated microvalves, and can be integral with a substrate or with one or more microchip bodies mounted on the substrate.

The feed-composition subsystem can be used independently, or alternatively, in conjunction with the flow-partitioning and/or pressure-partitioning subsystems (e.g., with flow-partitioning and/or pressure-partitioning subsystems being positioned between the feed-composition subsystem and the reactors, to operate on the feed streams having variably controlled feed composition). If the feed-composition subsystem is used with one or both of the flow- and/or pressure-partitioning subsystems, these systems can be integral with each other (e.g., such that such subsystems may be inherently effected by the same set of flow restrictors), or alternatively, completely independent of each other.

Methods are also contemplated as being part of the invention. Briefly, for example, the invention is directed to methods for evaluating a chemical processes, and especially, chemical reaction processes. One or more reactants are simultaneously supplied to each of four or more reactors under reaction conditions to effect a chemical reaction of interest. The reactors preferably have a volume of not more than about 1 liter, preferably not more than about 100 ml, and most preferably not more than about 10 ml. Regardless of volume, the one or more reactants can be supplied to the reactors through a fluid distribution system. A set of reaction conditions are controllably varied between the four or more reactors, including at least one of the reaction conditions selected from flow rate, pressure and feed composition. Preferably, only one of the reaction conditions are varied, while other are maintained substantially constant during the course of the reaction. In other embodiments, two or more of the reaction conditions selected from the group consisting of flow rate, pressure, feed composition and temperature are varied between the four or more reactors. In additional embodiments, three or more, or alternatively, four or more, of the reaction conditions selected from the group consisting of flow rate, pressure, feed composition and temperature are varied between the four or more reactors. In some method embodiments, the fluid distribution system can comprise one or more subsystems selected from the group consisting of a flow-partitioning subsystem, a pressure-partitioning subsystem, and a feed-composition subsystem, where in each case, the one or more subsystems comprise at least one set of four or more flow restrictors, each of the four or more flow restrictors having a flow resistance that varies relative to other flow restrictors in the set. Following the reaction of interest, the reactor effluent is discharged from each of the four or more reactors.

In a another method for evaluating a chemical process, the method can include feeding a first feed component from a first feed component source to four or more mixing zones, where each of the four or more mixing zones arein fluid communication with one of four or more reactors. The first feed component is fed from a first feed component source, through a set of four or more first-feed-component flow restrictors, to one of the four or more mixing zones. Each of the four or more first-feed-component flow restrictors has a flow resistance that varies relative to other first-feed-component flow restrictors in the set. A second feed component from a second feed component source is also fed to the four or more mixing zones, whereby four or more feed compositions having varying relative amounts of the first and second feed components are formed. The four or more varying feed compositions are simultaneously supplied to the four or more reactors, and the reaction conditions in each of the four or more reaction cavities are controlled to effect a chemical reaction of interest. Reactor effluent can be discharged from each of the four or more reactors.

The invention is also directed to other reaction systems, involving only a single-channel reactor, together with a flow-resistor based feed-composition subsystem.

The invention is directed, as well, to fluid distribution systems comprising the flow-partitioning and/or pressure-partitioning and/or feed-composition subsystems.

The inventions disclosed herein, as well as various permutations and combinations thereof, can be advantageously and flexibly employed in optimizing processing conditions for chemical systems of interest, and especially for optimizing post-synthesis, pre-reaction processing/treatment conditions and/or reaction systems for potential heterogeneous catalysts for a particular reaction of interest. The capability to simultaneously vary several reaction parameters (e.g., feed composition, flow rate, pressure, and temperature), in addition to catalyst loading, reaction time and catalyst candidate composition in a multi-channel (i.e., parallel), flow reactor, provides an extremely powerful tool for catalyst research. In particular, such a flow reactor is especially well-suited to various optimization approaches—including the use of optimization algorithms. The chemical processing systems of the invention provide, among other advantageous features, for the capability for multiplexing with respect to feed (in temporal and spatial domains), processing/treatment (in temporal and spatial domains), reaction screening (in temporal and spatial domains), and catalyst form (discussed in greater detail below).

Other features, objects and advantages of the present invention will be in part apparent to those skilled in art and in part pointed out hereinafter. All references cited in the instant specification are incorporated by reference for all purposes. Moreover, as the patent and non-patent literature relating to the subject matter disclosed and/or claimed herein is substantial, many relevant references are available to a skilled artisan that will provide further instruction with respect to such subject matter.

BRIEF DESCRIPTION OF THE DRAWINGS

FIGS. 2A through 2F are schematic views of variously configured flow-distribution schemes for a four-channel parallel flow reactor.

FIGS. 3A through 3I are schematic views (FIGS. 3A, 3B, 3C, 3D), exploded perspective views (FIGS. 3E, 3G, 3I) and perspective view (FIG. 3F), of one or more microchip bodies mounted on a substrate (FIGS. 3A, 3B, 3C, 3D, 3I) and of an exemplary single-channel legislation.

Figure 1A:
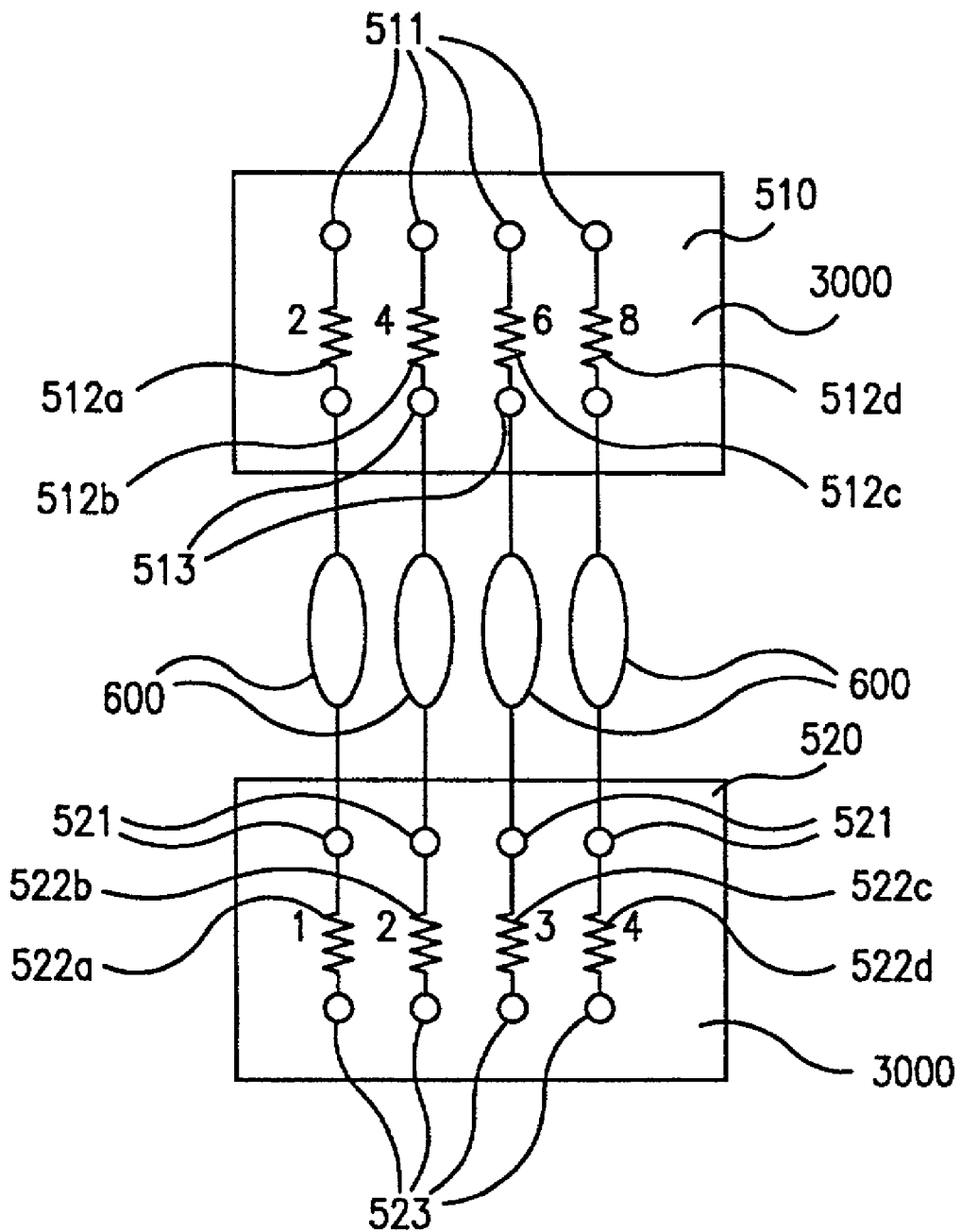
FIGS. 1A through 1C are schematic views of four-channel parallel flow reactor adapted for flow partitioning (FIG. 1A), pressure partitioning (FIG. 1B) or both flow-partitioning and pressure partitioning (FIG. 1C).

11H, 11I), a split restrictor/mass-flow-sensor block (FIGS. 11J, 11K), a mass flow sensor (FIGS. 11L, 11M, 11N) and a reactor module (FIG. 11O).

FIGS. 12A through 12F are schematic, cross-sectional views showing various stages of one microfabrication approach for forming a microfabricated set of flow restrictors integral with a substrate or with a microchip body.

DETAILED DESCRIPTION OF PREFERRED EMBODIMENTS

The present invention is related to the following patents and/or patent applications, each of which is hereby incorporated by reference for all purposes, including for the purpose of combination of various features disclosed in the various related applications to various features disclosed herein, to the highest extent practical, based on the knowledge in the art, and coupled with the guidance of this application and the related applications: (1) co-owned, co-pending U.S. patent application Ser. No. 60/187,566 entitled "Apparatus and Methods for Multi-Variable Optimization of Reaction Systems and Other Chemical Processing Microsystems", filed Mar. 7, 2000 by Bergh et al., (2) co-owned, U.S. patent application Ser. No. 60/229,984 entitled "Apparatus and Methods for Optimization of Process Variables in Reaction Systems and Other Chemical Processing Systems", filed Sep. 2, 2001 by Bergh et al, (3) co-owned, co-pending U.S. patent application Ser. No. 09/093,870, entitled "Parallel Fixed-Bed Reactor and Fluid Contacting Apparatus and Method", filed Jun. 9, 1998 by Guan et al, and now issued as U.S. Pat. No. 6,149,882; (4) to co-owned, co-pending U.S. patent application Ser. No. 09/518,794, entitled "Chemical Processing Microsystems, Diffusion-Mixed Microreactors and Methods for Preparing and Using Same", filed Mar. 3, 2000 by Bergh et al., issued as U.S. Pat. No. 6,749,814; (5) U.S. Ser. No. 60/274,065, entitled "Parallel Flow Reactor Having Improved Thermal Control" filed on Mar. 7, 2001 by Bergh et al., filed as non-provisional application U.S. Ser. No. 10/094,257 (pending and published as US 2002-0170976); (6) U.S. Ser. No. 60/274,022, entitled "Gas Chromatograph Injection Valve Having Microvalve Array" filed on Mar. 7, 2001 by Berg et al., later filed as non-provisional applications U.S. Ser. No. 10/092,364 (pending and published as US 2002-0127146) and U.S. Ser. No. 10/092,035 (issued as U.S. Pat. No. 6,742,544); and (7) U.S. Ser. No. 09/801,430 entitled "Parallel Gas Chromatograph With Microdetector Array" filed on Mar. 7, 2001 by Srinivasan et al. (issued as U.S. Pat. No. 6,701,774). Further reference to several of these applications is made below, in the context of the present invention.

In a preferred embodiment of the present invention, a chemical processing system is a reaction system that comprises a plurality of reactors, a fluid distribution system, and optionally, a detection system. The fluid distribution system can comprise an inlet subsystem for providing reactants to the reactors, and an outlet subsystem for discharging effluents from the reactors. A feed-composition subsystem—for providing different feed compositions to the reactors can be included in the inlet subsystem. A flow-partitioning subsystem—for providing different flow rates to the reactors, and/or a pressure-partitioning subsystems—for providing different pressures in the reactors, can be included as part of the inlet subsystem and/or in the outlet subsystem. A temperature control subsystem can also be included in the reaction system, for control of reaction temperature and feed temperature. The detection system can be a separate, stand-alone system, or can be integral with the reaction system.

The invention is described in further detail below with reference to the figures, in which like items are numbered the same in the several figures.

Overview

Figure 7A:
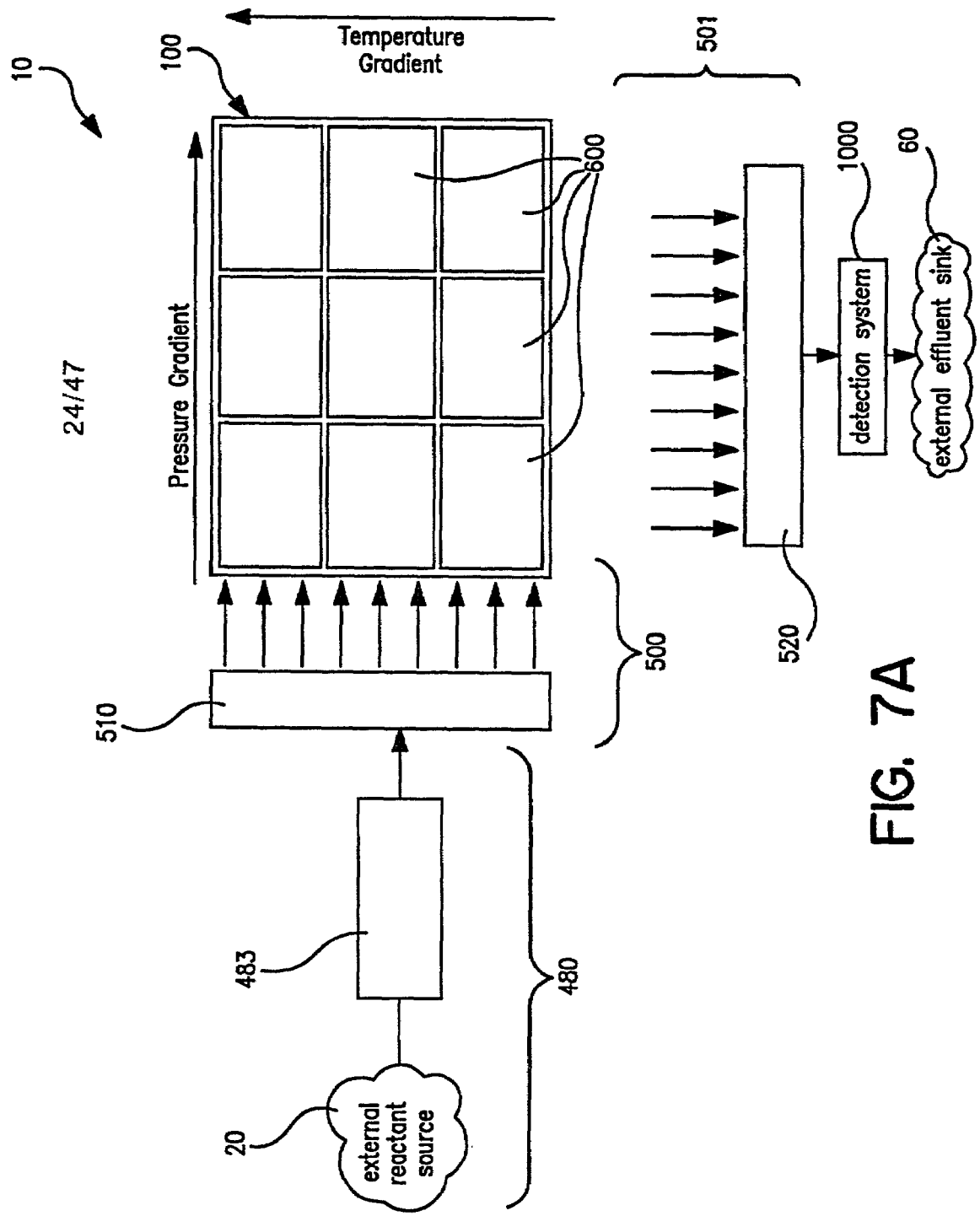
FIGS. 7A through 7C are schematic views illustrating an integrated chemical reaction system that includes multi-channel parallel flow reactors.

With reference to FIG. 7A, one or more reactants are fed from an external reactant source 20 through the external distribution system 480 and the internal distribution system 500 to an array 100 of reactors 600. Feed compositions are varied for two or more, preferably four or more of the reaction feed channels, preferably as part of the internal distribution system 500. The varied feed-compositions can be sent to dedicated reactors 600, or can be split into two or more streams to serve two or more reactors 600. The varied feed compositions can be sent to the reactors 600 directly, or through a flow-partitioning and/or pressure-partitioning subsystems, for obtaining different flow rates and/or pressures (e.g., through inlet and outlet flow restrictors 510, 520). The reaction conditions are controlled to effect the chemical reaction of interest, and reactor effluents are simultaneously discharged through the outlet distribution system 501, to an external effluent sink 60 (e.g. to an external environment, controlled or not controlled, including for example to the atmosphere, to a hooded vent, to a pressure-controlled region, etc.). A detection system 1000 can be used to sample the reactor effluent.

A preferred plurality of reactors can include an array 100 of reactors 600. The array 100 of reactors 600 can be formed in a common substrate, and the common substrate can include a plurality of laminae. The array 100 of reactors 600 can alternatively be formed in a plurality of separate modules, with each module comprising two or more, and preferably four or more reactors. The modules can each include at least one common substrate, and such substrates can include a plurality of laminae. In the embodiment shown in FIG. 7A, the plurality of reactors is an array 100 of nine reactors 600 arranged in a 3 reactor by 3 reactor (3×3) configuration.

The flow distribution system can comprise an inlet distribution subsystem 500 for providing fluid communication between an external distribution system 480 (including one or more external reactants sources 20 or treatment agent sources) and the plurality of reactors 600. The flow distribution system further comprises an outlet distribution subsystem 501 for providing fluid communication between the plurality of reactors 600 and one or more external effluent sinks 60 (or treatment agent sinks), optionally via a detection system 1000. The flow distribution system can comprise one or more of a flow partitioning subsystem, a pressure partitioning subsystem, and/or a feed-composition subsystem.

In a flow distribution system comprising a flow and/or pressure partitioning subsystem, the inlet and outlet distribution subsystems 500, 501 preferably comprise a first inlet set 510 of flow restrictors and a second outlet set 520 of flow restrictors such that the total resistance $R_{total}$ between each of the channels of the reactor system and the ratio of resistances, $R_{inlet}:R_{outlet}$, between each of the channels are selected, configured or selectively configured to provide for varied flowrates (flow partitioning), varied pressure (pressure partitioning) or both varied flowrates and varied pressure (flow/pressure partitioning) between the flow channels for the plurality of reactors 600, each as generally described above. The flow and/or pressure can vary in any manner, including as a flow gradient or as a pressure gradient across the various reactors.

In a flow distribution system comprising a feed-partitioning subsystem, the inlet distribution system 500 can also include a set of feed-component flow restrictors. The feed-component flow restrictors can be the same flow restrictors used as for flow- and/or pressure-partitioning (e.g. first set of inlet flow restrictors 510), or alternatively, the feed-composition flow-restrictors can be a separate, independent set of flow restrictors. In some embodiments, the feed-composition subsystem can be part of the external distribution system 480 of the reaction system.

In general, the particular nature, type, design and/or configuration of the flow restrictor is not narrowly critical. The inlet flow restrictors, outlet flow restrictors and/or feed-composition flow restrictors are a portion of a fluid distribution path that provides a resistance to flow, and typically, provides a greater resistance to flow than the immediately upstream portion of the fluid distribution path of the chemical processing system. For chemical reaction systems, the flow restrictors can provide a resistance to flow between a reactant source and the reactors, or between the reactors and an effluent sink. For a feed distribution system (or subsystem) the flow restrictors can provid a resistance to flow between a feed component source and a mixing zone (e.g., mixing cavity, combined channel, reaction cavity, etc.). Preferred flow restrictors include passive flow restrictors such as capillaries, microcapillaries, small channels, channels having orifices, and microfluidic channels (e.g., including microfabricated channels), among others. In preferred embodiments of the invention, discussed in further detail below, the flow restrictors are microfluidic channels, typically formed using microfabrication techniques, and can be integral with a substrate or with one or more microchip bodies mounted—fixedly or detachably—on a substrate. A further description of preferred flow restrictors is provided below, as well as in each of the aforementioned co-pending patent applications of Guan et al. (now U.S. Pat. No. 6,149,882) and of Bergh et al. (U.S. Ser. No. 09/518,794, issued as U.S. Pat. No. 6,749,814). Although flow control is preferably effected with flow restrictors, in some embodiments of the invention, it is contemplated that active flow-control elements can be used to control flow. The use of such active flow-control elements can be advantageously effected, for example, in reaction system embodiments in which the active flow-control elements are microfabricated or are integral with a substrate or with one or more micro-bodies mounted on the substrate.

Flow/Pressure Partitioning

Flow-partitioning and/or pressure-partitioning is preferably effected using a first set of inlet flow restrictors and additionally or alternatively, using a second set of outlet flow restrictors. Hence, the fluid distribution system preferably comprises a first set of four or more inlet flow restrictors, where each of the four or more inlet flow restrictors provides fluid communication between at least one reactant source and one of the four or more reactors. The reactant source can be an external reactant source, or an internal reactant source (e.g. coming from a plurality of mixing zones of the feed-composition subsystem). The fluid distribution system preferably further comprises a second set of four or more outlet flow restrictors, each of the four or more outlet flow restrictors providing fluid communication between one or more of the four or more reactors and at least one external effluent sink. The sets of inlet and/or outlet flow restrictors can effect both flow- and pressure-partitioning; alternatively, these could be effected using separate sets of inlet and/or outlet flow restrictors.

As such, the invention can generally comprise a four- (or more-) channel flow reactor, (e.g. microreactor), where each channel comprises at least one inlet flow restrictor, a reactor, and at least one outlet flow restrictor. The flow resistance of the first set of inlet flow restrictors—and additionally, or alternatively—the flow resistance of the second set of outlet flow restrictors, varies between each of the four or more channels. The total flow resistance for each of the channels, $R_{total}$, defined as the sum of the resistances of the inlet flow restrictor(s) and outlet flow restrictor(s), $R_{inlet}+R_{outlet}$, can be substantially the same between channels or can vary between channels, depending on the desired flow and pressure characteristics. Likewise, the relative ratio of the resistances of the inlet flow restrictors to the resistances of the outlet flow restrictors, $R_{inlet}:R_{outlet}$, can be substantially the same between channels or can vary between channels, depending on the desired flow and pressure characteristics.

In one embodiment, the chemical reaction system of the invention comprises the four or more reactors and a fluid distribution system that provides for a different flow-rate to each of the four or more reactors, while maintaining substantially the same pressure in each of the four or more reactors. The volume of the reaction cavity of the four or more reactors can be substantially the same or different, but is preferably the same, such that the residence times for reactants is related to the flowrates independently of reactor volume, and likewise varies. In some embodiments, however, the volume of the reaction cavity can be varied between different reactors, such that contact time can be varied in consideration of both varying flow rates and/or varying reaction cavity volumes.

In particular, for example, the fluid distribution system can comprise a first set of inlet flow restrictors and a second set of outlet flow restrictors such that the total resistance $R_{total}$ varies between each of the four or more channels of the reactor system (thereby providing for different flowrates through each of the four or more channels), and such that the ratio of resistances, $R_{inlet}:R_{outlet}$, is substantially the same pressure between each of the four or more channels (thereby providing for substantially the same pressure in each of the four or more reactors). This "flow-partitioning/constant pressure" embodiment is exemplified and discussed in connection with FIG. 1A, below.

In another embodiment, the chemical reaction system of the invention comprises the four or more reactors and a fluid distribution system that provides for a different pressure in each of the four or more reactors, while maintaining substantially the same flow-rate to each of the four or more reactors. The volume of the reaction cavity of the four or more reactors can be substantially the same or different, but is preferably the same, such that the residence times for reactants is likewise substantially the same in each of the four or more reactors. For example, the fluid distribution system can comprise a first set of inlet flow restrictors and a second set of outlet flow restrictors such that the total resistance $R_{total}$ is substantially the same between each of the four or more channels of the reactor system (thereby providing for substantially the same flowrates through each of the four or more channels), and such that the ratio of resistances, $R_{inlet}:R_{outlet}$, varies between each of the four or more channels (thereby providing for varying pressure in each of the four or more reactors). This "pressure partitioning/constant flow" embodiment is exemplified and discussed in connection with FIG. 1B, below.

In an additional embodiment, the chemical reaction system of the invention comprises the four or more reactors and a fluid distribution system that provides for a different flow-rate to each of the four or more reactors, and additionally, a different pressure in each of the four or more reactors.

The volume of the reaction cavity of the four or more reactors can be substantially the same or different, but is preferably the same, such that the residence times for reactants is related to the flowrates independently of reactor volume, and likewise varies. For example, the fluid distribution system can comprise a first set of inlet flow restrictors and a second set of outlet flow restrictors such that the total resistance $R_{total}$ varies between each of the four or more channels of the reactor system (thereby providing for varying flowrates through each of the four or more channels), and such that the ratio of resistances, $R_{inlet}$:$R_{outlet}$, also varies between each of the four or more channels (thereby also providing for varying pressure in each of the four or more reactors). This "flow partitioning/pressure partitioning" embodiment is exemplified and discussed in connection with FIG. 1C, below.

The fluid distribution system of any of the aforementioned chemical reaction systems can, as applicable, include a first set of four or more inlet flow restrictors, and additionally, or alternatively—a second set of four or more outlet flow restrictors where the respective resistances of the inlet and/or outlet flow restrictors varies for each of the four or more channels by a common factor (e.g., each of the resistances of the four or more inlet restrictors and/or outlet restrictors varies by a factor of 2, a factor of 3, or some other common factor. Flow restrictors within a set of first and/or second flow restrictors preferably vary by a factor of 2, and are herein alternatively referred to as "binary-ratioed flow restrictors."

Figure 1B:
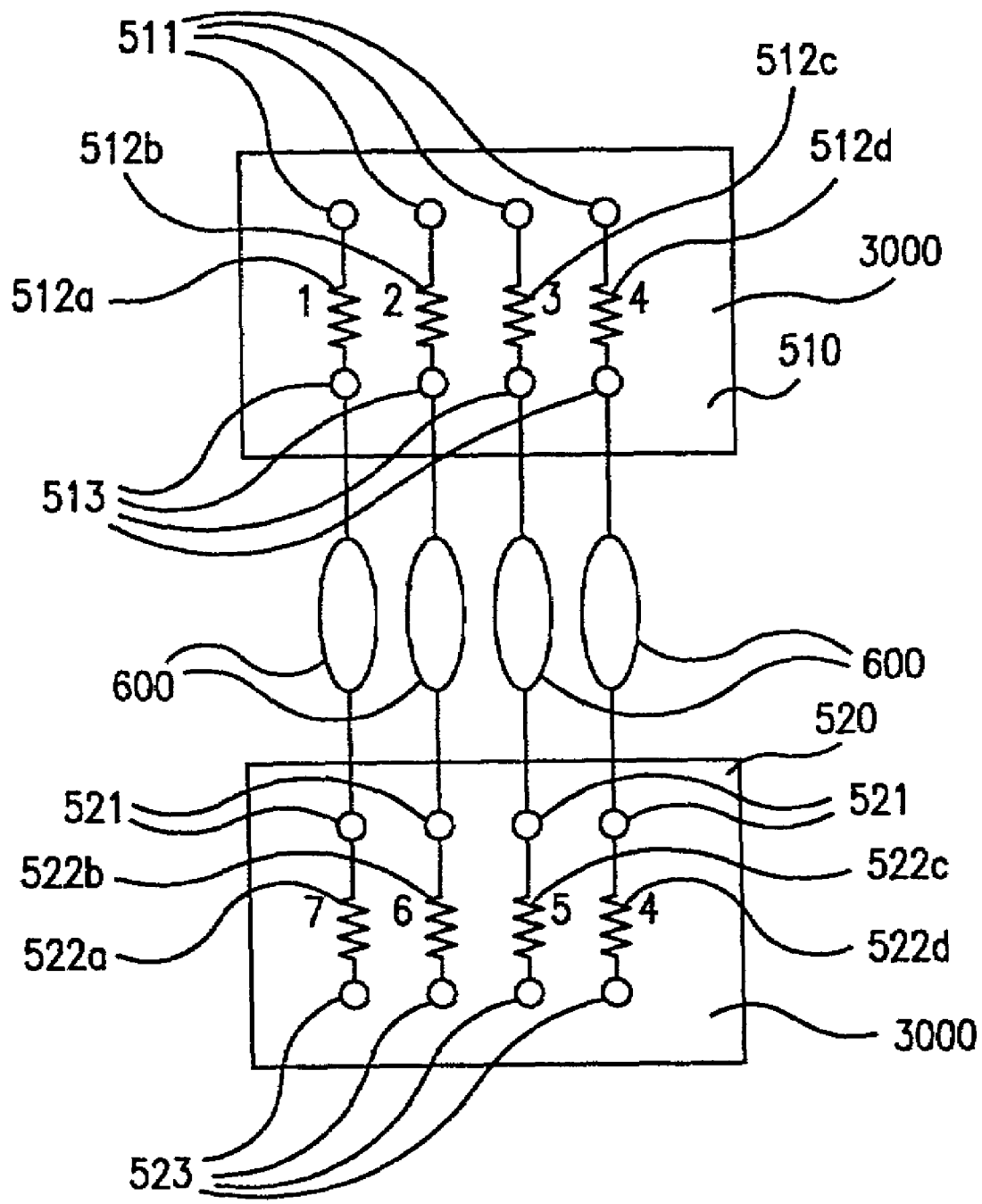
Figure 1C:
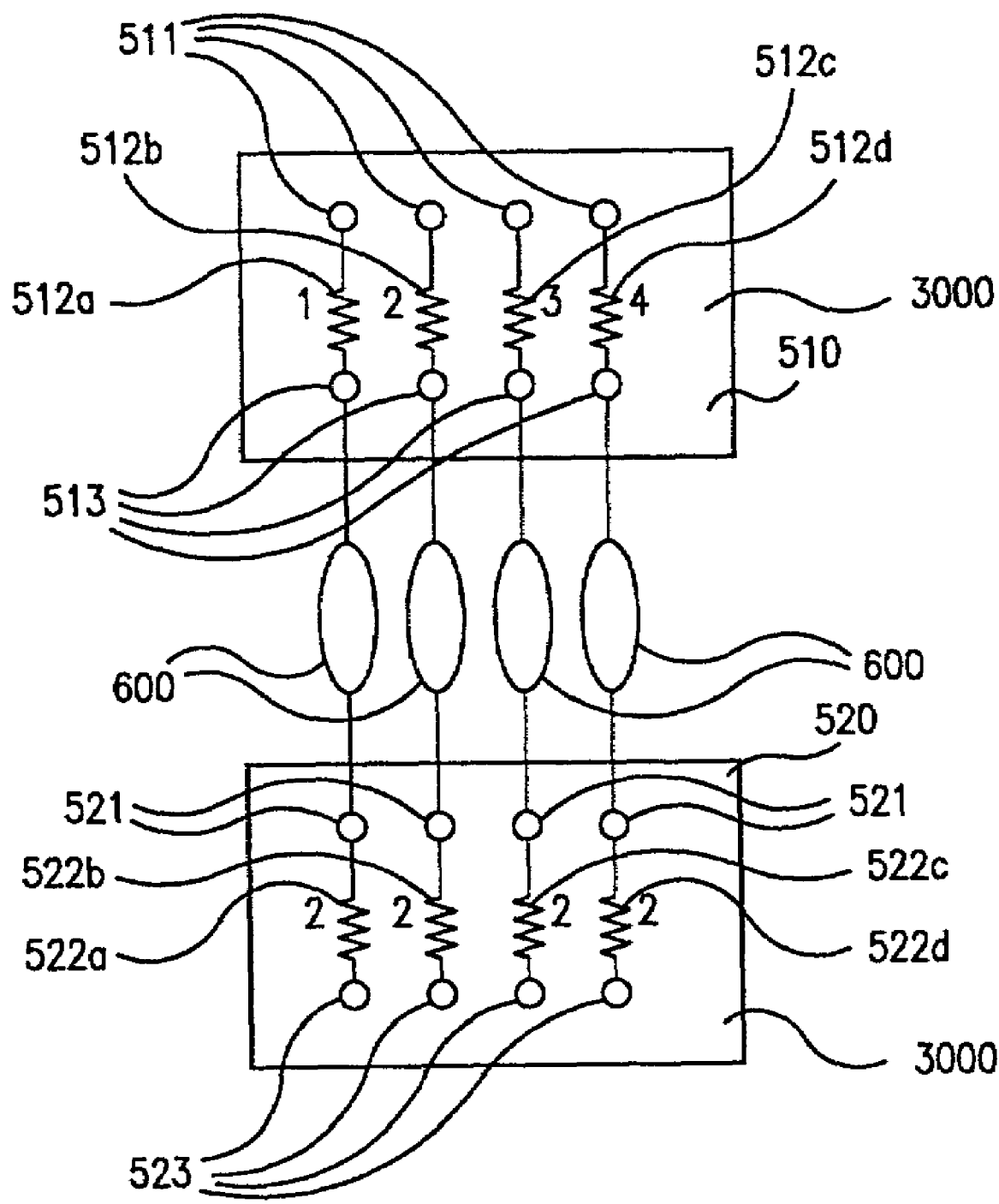

With reference to FIGS. 1A through 1C, the first set 510 of flow restrictors comprises a plurality of inlet flow restrictors 512a, 512b, 512c, 512d, each of which provides fluid communication between an inlet port 511 (that is in fluid communication with an external fluid distribution system 480, directly or via a feed-composition subsystem) and an outlet port 513 (that is in fluid communication with one of the plurality of reactors 600). The resistance to flow of the inlet flow restrictors 512a, 512b, 512c, 512d can be varied as described above (shown in FIG. 1A, for example, with relative resistance values of 2, 4, 6 and 8, respectively). The second set 520 of flow restrictors comprises a plurality of outlet flow restrictors 522a, 522b, 522c, 522d, each of which provides fluid communication between an inlet port 521 (that is in fluid communication with one of the plurality of reactors 600) and an outlet port 523 (that is in fluid communication with a detection system 1000, and ultimately with an external effluent sink 60). The resistance to flow of the outlet flow restrictors 522a, 522b, 522c, 522d can be varied as described (shown in FIG. 1A, for example, with relative resistance values of 1, 2, 3 and 4, respectively). FIG. 1A schematically represents a flow-partitioning subsystem that illustrates the aforementioned flow-partitioning/constant pressure embodiment. FIG. 1B represents a pressure-partitioning subsystem that depicts the aforementioned flow-partitioning/constant pressure embodiment. FIG. 1C represents both flow-partitioning and pressure-partitioning subsystems that shows the aforementioned flow-partitioning/pressure-partitioning embodiment. In each of the embodiments depicted in FIGS. 1A through 1C, the set of inlet flow restrictors 510 and the set of outlet flow restrictors 520 are illustrated as being provided as modular fluidic chips 3000, such that the inlet flow restrictors 510 and/or outlet flow restrictors 520 are integral with a substrate or with one or more microchip bodies mounted on a substrate, as discussed in further detail below.

The fluid distribution system of any of the aforementioned chemical reaction systems can be configured in a number of ways to provide a first set of four or more inlet flow restrictors, optionally together with a second set of four or more outlet flow restrictors. The following embodiments are, therefore, to be considered exemplary and non-limiting.

Generally, a valving configuration can be employed in combination with various flow-restrictor configurations to provide a particular embodiment of interest. The valving configuration can include one or more selection valves, for example, for providing controlled selection between a plurality of inlet flow restrictors and a particular reactor—and additionally, or alternatively—between one of the reactors and a plurality of outlet flow restrictors. Selection valves can also be used to provide selective fluid communication between a reactant source and two or more sets of flow restrictors—referred to herein as a series of selectable sets of flow restrictors. The selection valves can single-input/multiple-output selection valves, multiple-input/single-output selection valves and/or multiple-input/multiple-output selection valves, and can be dedicated, for example, to a particular flow restrictor and/or to a particular reactor. Alternatively, or in addition, individual flow isolation valves, series of isolation valves, and/or arrays of isolation valves can be employed. In some embodiments, described hereinafter, pluralities of individual isolation valves can be adapted for common actuation, to simultaneously open or close to effect coordinated operation of various aspects of the fluid distribution system. In one approach, an array of valves can be employed comprising individually actuated, or commonly actuated microvalves, such as, for example, the array described in connection with FIGS. 9A and 9B.

Figure 2A:
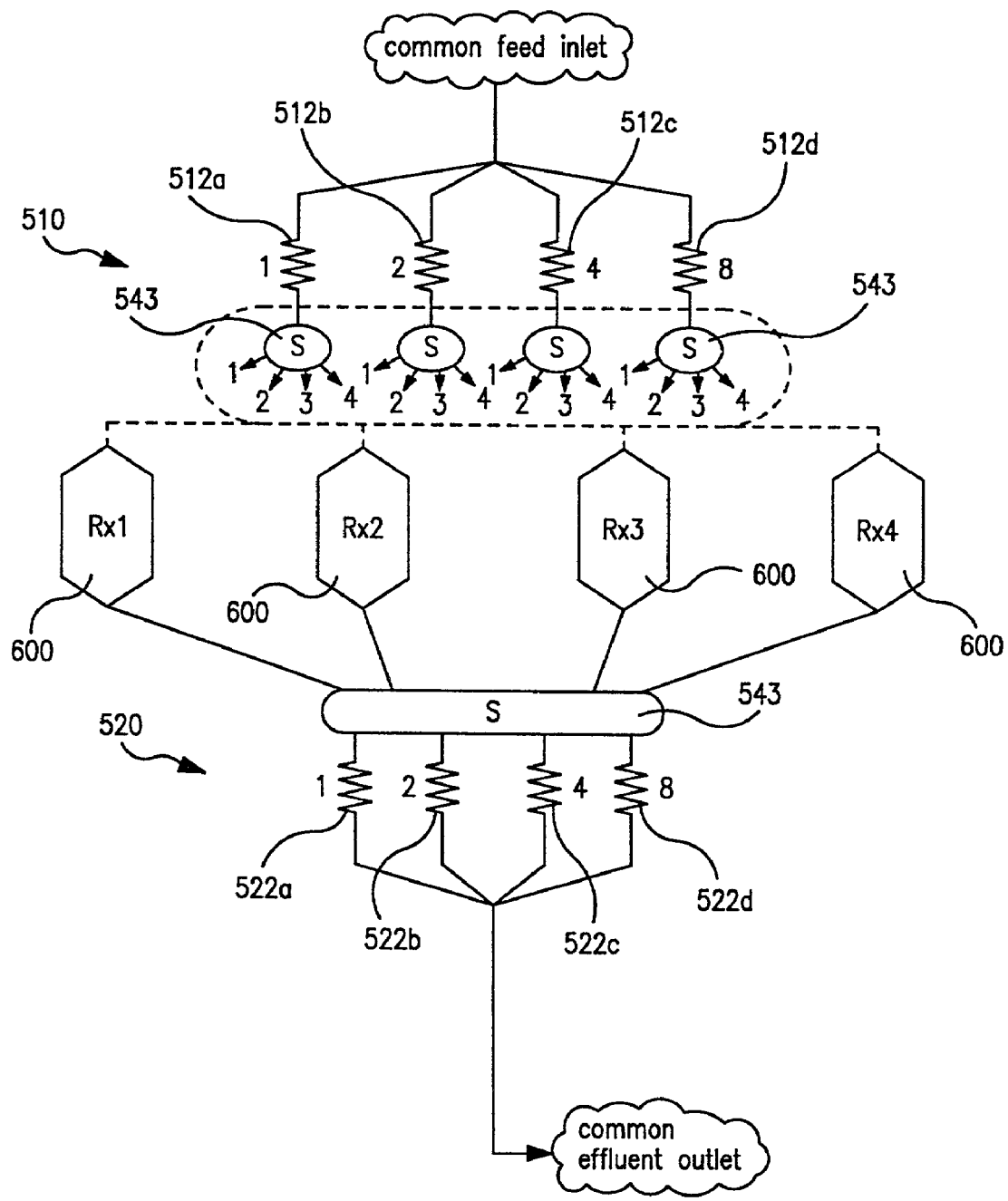
Figure 2B:
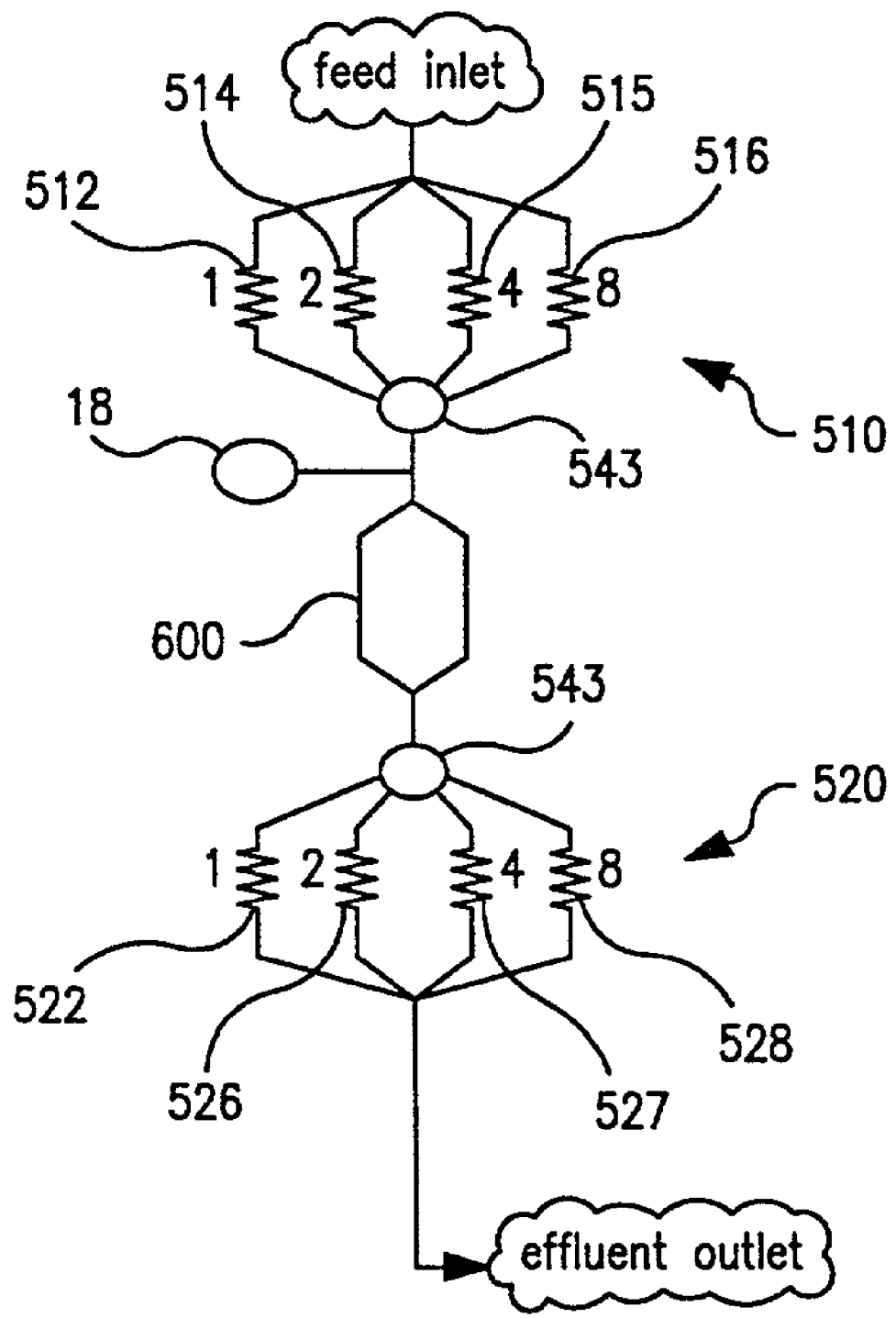
Figure 2C:
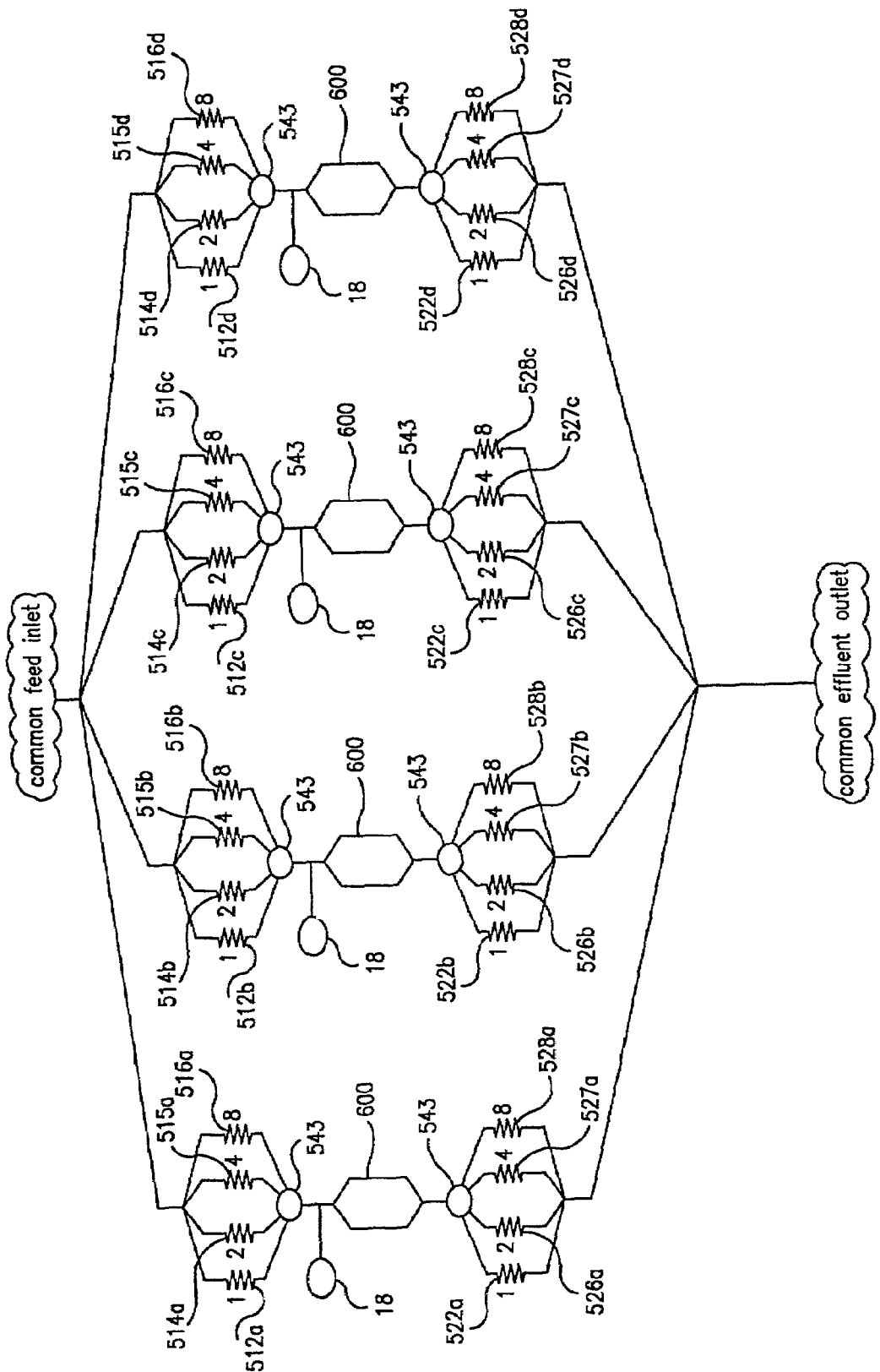

Preferred configurations using one or more selection valves are described with reference to FIGS. 2A through 2C. As shown in FIG. 2A, for example, a set of inlet flow restrictors 510 can be selectively coupled to four or more reactors 600 through four or more selection valves 543 (e.g. single-input, multiple output selection valves as illustrated). The effluents from the four or more reactors 600 can be selectively discharged to the set of outlet flow restrictors 520 via selection valve 543 (e.g. illustrated as a multiple input-multiple output selection valve). As shown, the flow resistances 512a, 512b, 512c, 512d of the inlet set 510, and the flow resistances 522a, 522b, 522c, 522d of the outlet set 520 are binary ratioed flow resistances.

In another configuration, a plurality of selectable dedicated inlet flow restrictors having different resistances can provide fluid communication between a feed inlet source and one of the four or more reactors. Additionally or alternatively, a plurality of selectable dedicated outlet flow restrictors having different resistances can likewise provide fluid communication between one of the four or more reactors and an effluent outlet sink. Selection valves can provide for automated and/or manual selection of the particularly desired restrictor for that particular reactor. FIG. 2B represents a single-reaction-channel version of this embodiment, and shows a plurality of selectable dedicated inlet flow restrictors 512, 514, 515, 516—each of which are dedicated for selectable connection to the single, particular reactor 600, through an inlet selection valve 543. Similarly, on the outlet side, a plurality of selectable dedicated outlet flow restrictors 522, 526, 527, 528 are each dedicated to the reactor 600, and provide selectable fluid communication to the effluent outlet through an outlet selection valve 543. A pressure sensor 18 is also shown. As shown, the flow resistances of the inlet set 510, and the outlet set 520 are binary-ratioed flow resistances. FIG. 2C represents a multi-channel version of the configuration described in connection with FIG. 2B. Briefly, a first plurality of selectable dedicated inlet flow restrictors 512a, 514a, 515a, 516a (having different flow resistances relative to each other) provides selectable fluid communication between at least one reactant source and a first reactor 600 of the four or more reactors. Inlet selection valves 543 provide selection between the plurality of inlet flow restrictors associated with each reactor. Similarly, a second plurality, third plurality and fourth plurality of selectable dedicated inlet flow restrictors provides selectable fluid communication between the reactant source and a second reactor, a third reactor and a fourth reactor, respectively. As such, the set of four or more inlet flow restrictors in operation can be selected to include at least one flow restrictor from each of the first plurality, the second plurality, the third plurality and the fourth plurality of selectable dedicated inlet flow restrictors.

In an alternative approach, individual valves (e.g. pneumatically actuated valves) can be employed instead of selection valves, for selection of a plurality of dedicated inlet flow restrictors and/or outlet flow restrictors. FIG. 2D shows a single-channel configuration that is analogous to that shown in FIG. 2B, but which employs a plurality of inlet isolation valves 487 rather than a selection valve, to select from among a plurality of dedicated selectable inlet flow restrictors 512a, 514a, 515a, 516a, 517a, 518a. The inlet isolation valves 487 can be actuated (e.g. pneumatically actuated) using actuation lines 490. As shown, the plurality of inlet flow restrictors 512a, 514a, 515a, 516a, 517a, 518a is provided as a microfluidic chip 3000 having a dedicated channel 16 providing fluid communication between each of the inlet flow restrictors and at least one of the reactors (or more reactors, if down-stream flow-splitting is used, as discussed below) via interface 541, interface 555 and feed channel 545. A similar plurality of inlet flow restrictors can be provided for each of the four or more reactors. With reference to FIG. 2F, for example, an array of inlet flow restrictors 512a,b,c,d, 514a,b,c,d, 515a,b,c,c, 516a,b,c,d, 517a,b,c,d, 518a,b,c,d—together with an array of corresponding inlet isolation valves 487 can provide for substantial operational flexibility with respect to selecting various combinations of flow restrictors. Also, a similar plurality of selectable dedicated outlet flow restrictors (not shown) can likewise be provided (for example, in a manner analogous to that shown in FIG. 2D or 2F).

In a particularly preferred embodiment, a series of selectable sets of inlet flow restrictors and additionally or alternatively, selectable sets of outlet flow restrictors can be configured and selected. Generally, selection is made between two or more sets of flow restrictors. With respect to the inlet side, for example, a first set inlet of flow restrictors can comprise first, second, third and fourth inlet flow restrictors that provide fluid communication between a reactant source and first, second, third and fourth reactors, respectively. Each of the first, second, third and fourth inlet flow restrictors of the first set have a different flow resistance relative to each other. A second set of inlet flow restrictors can likewise first, second, third and fourth inlet flow restrictors providing fluid communication between the reactant source and the first, second, third and fourth reactors, respectively. Each of the first, second, third and fourth inlet flow restrictors of the second set have a different flow resistance relative to each other. The flow resistance of at least one of the four or more inlet flow restrictors of the second set varies from the flow resistance of the corresponding inlet flow restrictor of the first set. As such, the first set or the second set of inlet flow restrictors can be selected to provide fluid communication between the at least one reactant source and the four or more reactors. A similar configuration can be effected for the outlet side.

Figure 2E:
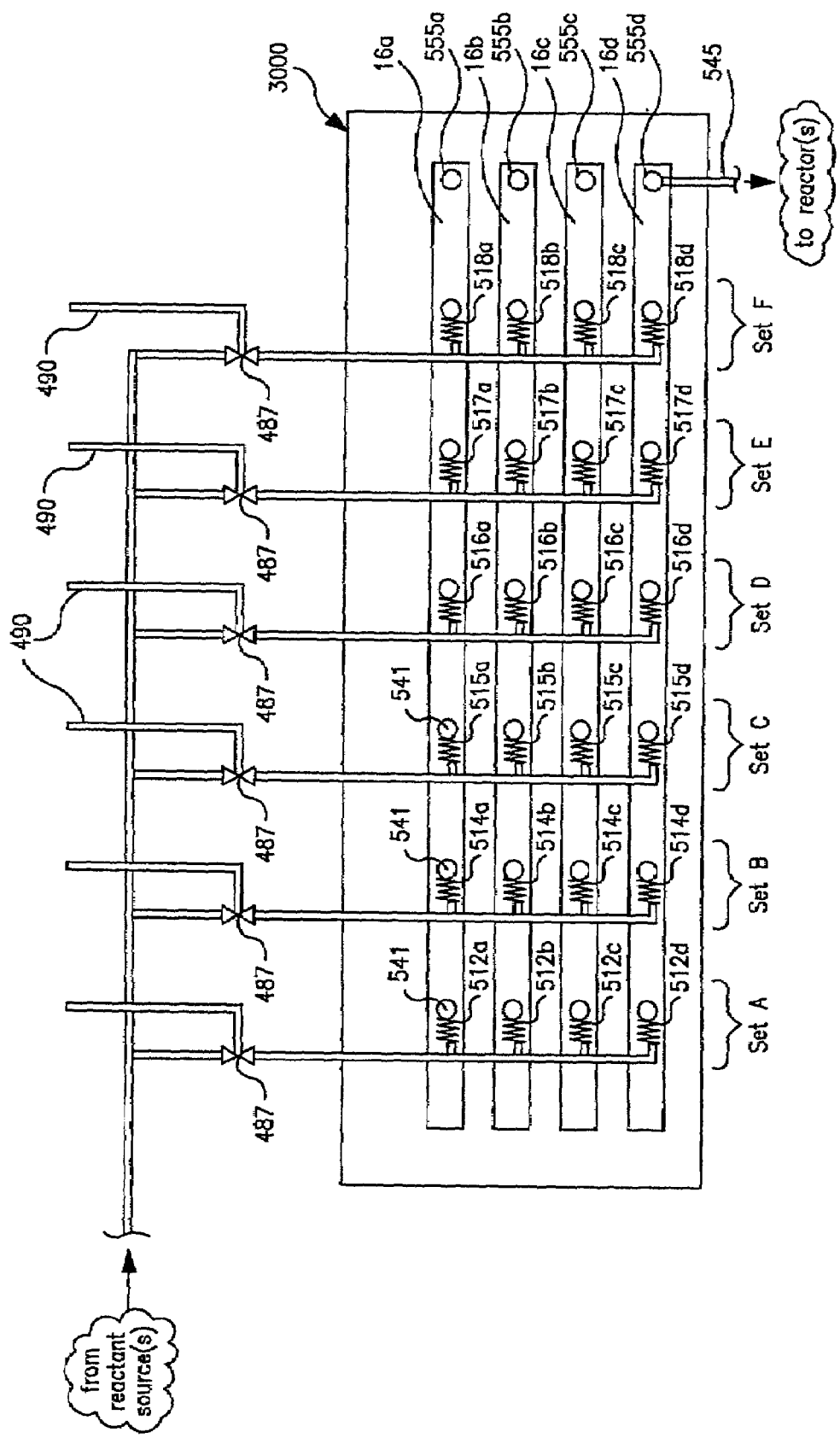
Figure 2F:
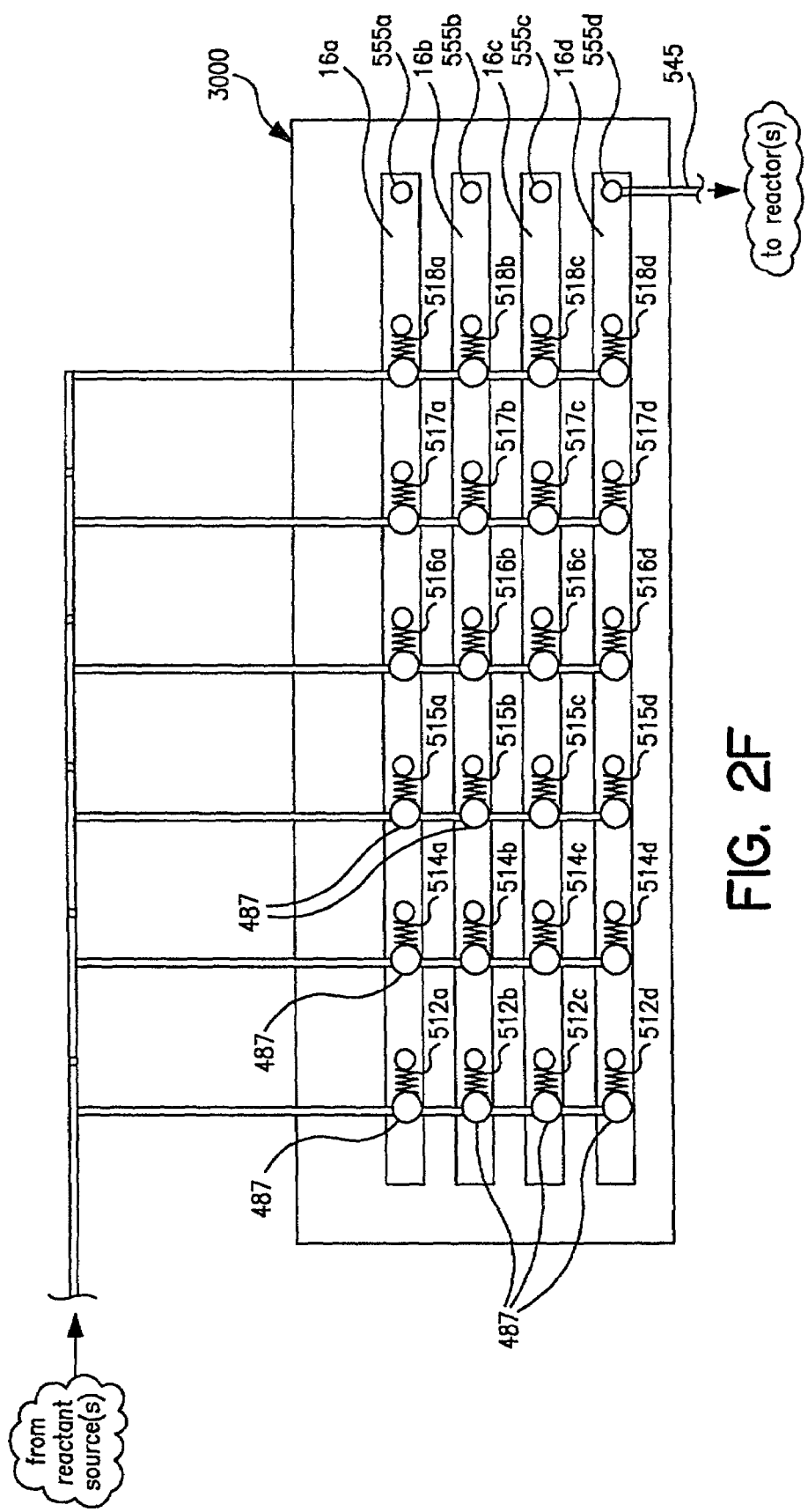

With reference to FIG. 2E, for example, the flow and/or pressure can be selectably and controllably varied using a series of selectable sets of inlet (as shown) or outlet (not shown) flow restrictors, indicated in FIG. 2E as SET A, SET B, SET C, SET D, SET E and SET F. Each of the sets (A–F) of feed-component flow restrictors comprises a set of inlet flow restrictors (e.g., A512a–d for SET A, 514a–d for SET B, 515a–d for SET C, etc.) Inlet isolation valves 487 can be automatically and remotely actuated—each individually—via feed-component-isolation-valve actuating lines 490. Selective actuation of the feed-component isolation valves for a particular set (e.g., SET A, SET B, SET C, etc.) provides for flow through the flow restrictors associated with that particular set and into the associated reactors. It can be appreciated this embodiment provides extreme operational flexibility and control over flow and pressure for each of the reaction channels. Operationally, the added flexibility of selectably switching between various sets of flow restrictors, such that, for example, each of the four or more reactors can be screened under each of the six sets of varied flow and pressure conditions is particularly advantageous. The relative values of the flow restrictors of each set (e.g., SET A, SET B, SET C, etc.) is not narrowly critical, and can be selected based on design choice of the operator. In a preferred approach, the relative values are "rotated" from one set to another set with respect to the associated reactor, such that in operation, one can selectably obtain the same six variations in feed and/or pressure through each of the six reactors, merely by selecting each of the sets (i.e., SET A through SET F) in turn. Various preferred sets of such "rotating" relative flow-resistance values include binary ratioed or other values. Some values are shown and discussed for the analogous configuration used in connection with feed-composition subsystems, below.

As noted, and as described in greater detail below, the first or second sets 510, 520 of flow restrictors can be provided to the fluid distribution system as modular units, such as modular fluidic chips in which the flow restrictors are integral with a substrate or with one or more microchip bodies mounted on a substrate. Selection valves and/or isolation valves, together with other components (e.g., flow sensors, pressure sensors, etc.) can also be provided as such as modular fluidic chips—an integrally formed in a substrate or one or more microchip bodies mounted on a substrate.

Referring again to FIG. 7A, the particular configuration of the external fluid distribution system 480 is not critical, but can preferably comprise an active flow control element 483 (shown as a mass flow controller (MFC)) configured to be in series with the first set 510 of flow restrictors. The use of two flow control elements in series is advantageous to effect control, and preferably also to measure, flow rate and pressure to each reactor 600. The first flow control element (e.g., MFC) can provide for an overall general or "rough" flow control for a group of reactors 600, with the second flow control element (e.g., first set of inlet flow restrictors 510) providing more specific or "fine" flow control for a subgroup of reactors 600 or for individual reactors 600.

Feed-Composition Subsystem

In addition to, or alternatively to, having the capability to independently or jointly vary reactant flow rate and/or pressure, the reaction system of the invention also includes embodiments in which the feed composition can be simultaneously varied in the four or more reactors for the systematic evaluation of the effect of feed composition on the particular reaction of interest.

In one embodiment, the chemical reaction system of the invention comprises the four or more reactors and a fluid distribution system for simultaneously varying the composition of reactor feed for the four or more reactors. For each of the four or more reactors, at least two and preferably at least three feed components are simultaneously supplied from external sources thereof to a mixing zone. Each of the four or more mixing zones is in fluid communication with at least one of the four or more reactors—directly, or through flow partitioning and/or pressure partitioning subsystems of the fluid distribution system. The particular nature or configuration of the mixing zone is not critical, and generally, the mixing zone can be a mixing chamber (e.g., suitable for static mixing and/or active mixing), a fluid distribution channel, a fluid-distribution flow restrictor, a reaction cavity, etc. Generally, at least one of the feed components (e.g. a first feed component) is provided to each of the four or more mixing zones through a set of four or more feed-component flow restrictors having varying flow resistances, such that the relative amount of the at least one feed component is varied between each of the four or more reactors. (The set of feed-component flow restrictors can be considered a third set of flow-restrictors, if the distributions system also comprises independent and separate first sets of inlet-flow restrictors an second sets of outlet flow restrictors, as described above in connection with flow- and/or pressure-partitioning). The particular nature of each feed component is not narrowly critical. For example, each feed component can be a homogeneous or a heterogeneous fluid (e.g., gas or liquid), and can comprise one or more different species (e.g., molecular reactants, inert diluents, etc.).

In preferred embodiments, the set of four or more feed-component flow restrictors comprises two or more subsets of feed-component flow restrictors, with each subset corresponding to a particular feed component. Specifically, for example, a first feed component is provided to each of the four or more mixing zones through a first subset of four or more first-feed-component flow restrictors, with each of the four or more first-feed-component flow restrictors providing fluid communication between an external source for the first feed component and one of the four or more mixing zones. The flow resistance of at least two of the four or more first-feed-component flow restrictors varies relative to each other, and preferably, the flow resistance of each of the four or more first-feed-component flow restrictors varies relative to the resistance of the other such restrictors in the set. Additionally, a second feed component can be provided to each of the four or more mixing zones directly, or through a second subset of second-feed-component flow restrictors. Optionally, a third feed component can be provided to each of the four or more mixing zones directly, or through a third subset of third-feed-component flow restrictors. Optionally, additional feed components can be provided to each of the four or more mixing zones directly, or through additional subsets of additional-feed-component flow restrictors. The resistances of the flow restrictors included in the second subset of second-feed-component flow restrictors, in the third subset of third-feed-component flow restrictors, and/or in the additional subsets of additional-feed-component flow restrictors can be substantially the same as the other restrictors within that subset, or can vary relative to the other restrictors within that subset.

Referring further to FIG. 7A, the external fluid distribution system 480—and additionally or alternatively—the internal inlet distribution subsystem 500 can further comprise a feed-composition control system (not shown in FIG. 7A). The feed-composition control system can be of any suitable design. In a preferred embodiment, however, the feed-composition control system can be provided as discussed above. Reference is made to FIGS. 4A through 4E, together with 5A through 5C, for example, as discussed below.

Figure 4A:
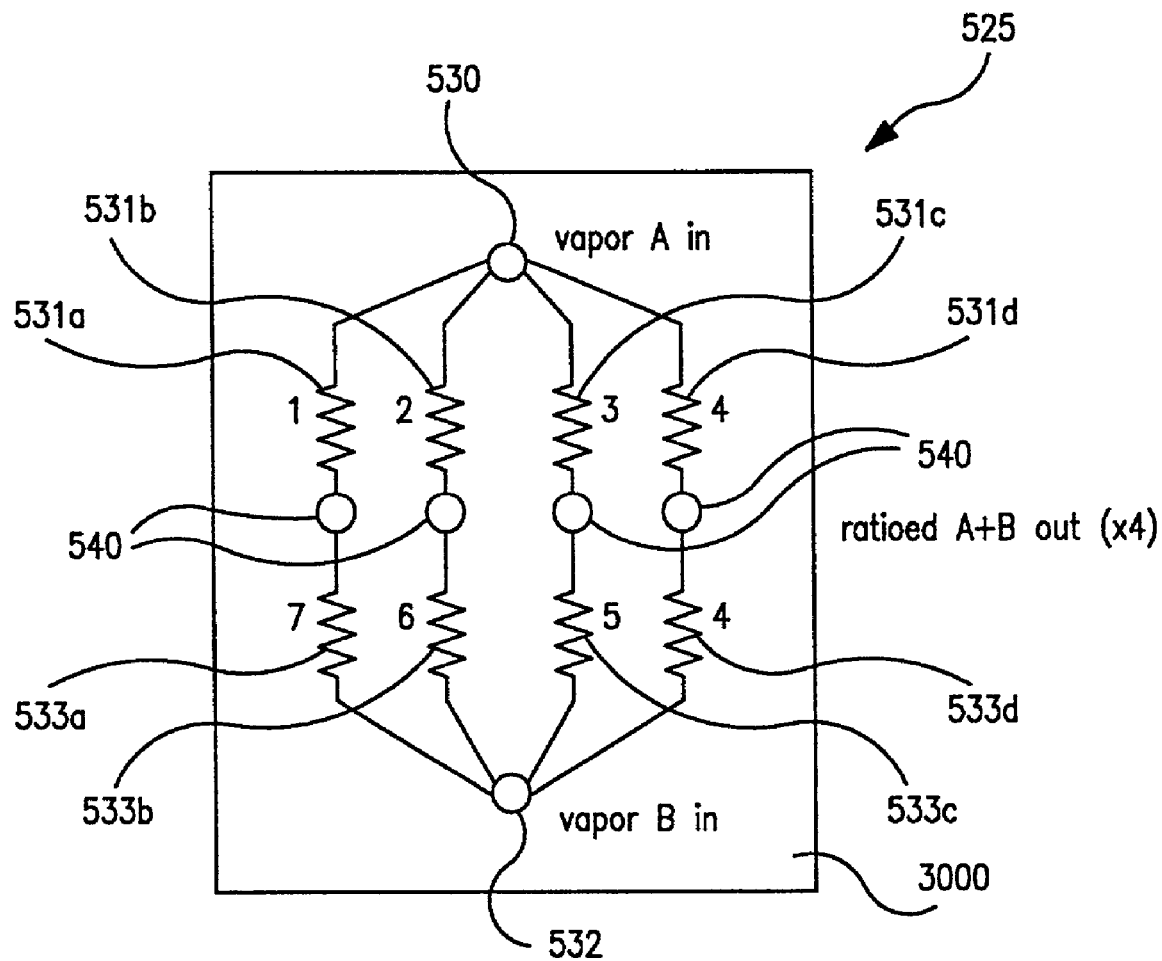
FIGS. 4A through 4F are schematic views of variously configured flow-distribution schemes for a four-channel parallel flow reactor.

One embodiment for achieving a varied feed composition simultaneously in or through four or more mixing zones is exemplified by FIG. 4A. A feed control subsystem 525 (included as part of the external fluid distribution system 480 or as part of an internal fluid distribution system 500) can comprise a set of four or more feed-component flow resistors that comprises a first subset 531 (a, b, c, d, considered collectively) and a second subset 533 (a, b, c, d, considered collectively) of feed-component flow restrictors corresponding to a first feed component and a second feed component, respectively. Specifically, a first feed component is provided from a first-feed-component source 530 to each of four mixing zones 540 through a first subset 531 comprising four first-feed-component flow restrictors 531a, 531b, 531c and 531d. A second feed component is provided from a second-feed-component source 532 to each of the four mixing zones 540 through a second subset 533 of second-feed-component flow restrictors 533a, 533b, 533c and 533d. The flow resistance of each of the first-feed-component flow restrictors 531a, 531b, 531c and 531d varies relative to each other. The flow resistance of each of the second-feed-component flow restrictors 533a, 533b, 533c and 533d can be substantially the same as each other, or can vary relative to each other. As shown in FIG. 4A, for example, the relative flow resistances for the first feed-component flow restrictors 531a, 531b, 531c and 531d and the second feed-component flow restrictors 533a, 533b, 533c and 533d are selected to vary across each set, and further, are selected such that the total sum of the flow resistances for the group of flow restrictors associated with a particular mixing zone (e.g. a first group comprising feed-component flow restrictors 531a and 533a; a second group comprising feed-component flow restrictors 531b and 533b, etc.) are substantially the same, such that substantially the same flow rate can be achieved through each of the four mixing zones 540. The feed-component flow resistances are illustrated as being included in the flow distribution system as a microfluidic chip 3000.

For clarity, reference herein to "sets" or "subsets" of flow restrictors (e.g., feed-component flow restrictors) relates to a collection of flow restrictors that comprises two or more, preferably four or more flow restrictors, each of which provides fluid communication between the same one, particular feed source (e.g. a first feed source) and two or more, preferably four or more separate and independent mixing zones (e.g. reactors) or flow channels. In contrast, reference herein to "groups" of flow restrictors relates to a collection of flow restrictors that comprises two or more flow restrictors providing fluid communication between two or more different feed sources (e.g., a first feed source and a second feed source) and the same, one particular mixing zone or flow channel.

In a particularly preferred embodiment, the resistance values for the flow restrictors included in a first subset and a second subset of flow restrictors (as well as in a third subset or additional subsets of flow restrictors) can be designed or selected such the the relative proportions (e.g., partial pressure of gaseous feed components) of the first component and the second component varies between each of the four or more mixing zones, but such that the total flow to, and through each mixing zone is substantially the same.

For example, varied amounts of the first component (e.g., a first gaseous reactant) could be sent to each of the mixing zones, together and simultaneously with complementarily-varied amounts of the second component (e.g., an inert "make-up" gas), with the resistances of the first and second subsets of feed-component flow-restrictors set being designed or selected such that the total flow rate through each of the mixing zones is substantially the same, thereby providing for substantially equal feed with varied compositions.

Figure 4B:
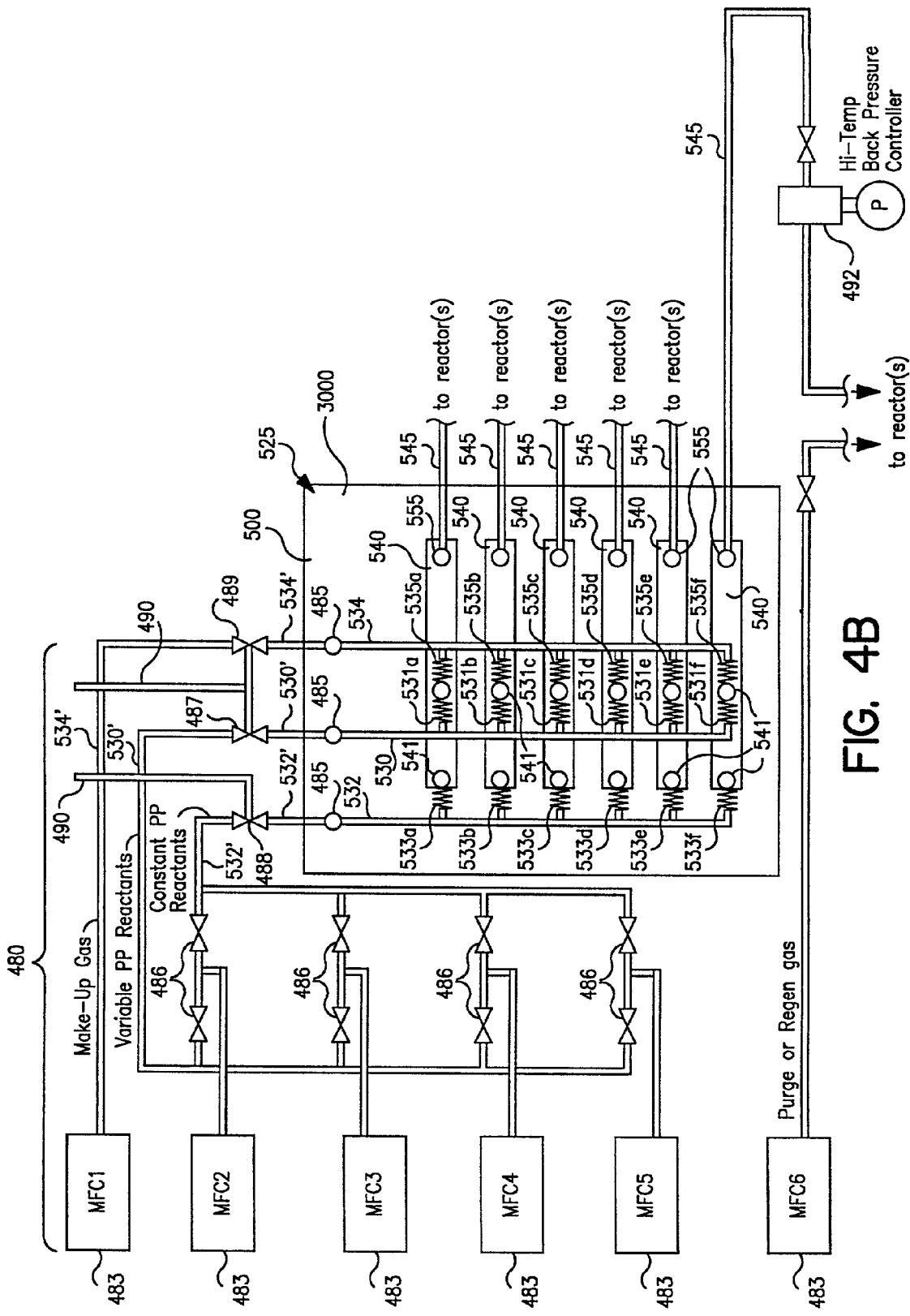

One embodiment for achieving a such varied feed composition with substantially the same flow rate simultaneously in or through four or more mixing zones is exemplified by FIG. 4B and discussed further below in connection therewith. FIG. 4B shows a feed control subsystem 525 formed, for example, as a modular fluidic chip 3000 as part, for example, of an internal fluid distribution system 500. The internal fluid distribution system 500 comprises feed control subsystem 525 and is interfaced with an external fluid distribution system 480 through a plurality of internal-external-interface ports 485.

As shown in FIG. 4B, the feed control subsystem 525 of the internal fluid distribution system 500 can comprise a set of four or more feed-component flow resistors that comprises a first subset 531 ($a$, $b$, $c$, $d$, $e$, $f$ considered collectively), a second subset 533 ($a$, $b$, $c$, $d$, $e$, $f$ considered collectively) and a third subset 535 ($a$, $b$, $c$, $d$, $e$, $f$ considered collectively) of feed-component flow restrictors corresponding to a first feed component, a second feed component and a third feed component, respectively. Specifically, a first feed component is provided from a first-feed-component source 530 to each of six mixing zones 540 through a first subset 531 comprising six first-feed-component flow restrictors 531$a$, 531$b$, 531$c$, 531$d$, 531$e$ and 531$f$. A second feed component is provided through a second-feed-component source 532 to each of the six mixing zones 540 through a second subset 533 of second-feed-component flow restrictors 533$a$, 533$b$, 533$c$, 533$d$, 533$e$ and 533$f$. A third feed component is provided through a third-feed-component source 534 to each of the six mixing zones 540 through a third subset 535 of third-feed-component flow restrictors 535$a$, 535$b$, 535$c$, 532$d$, 532$e$ and 532$f$. The flow resistance of each of the first-feed-component flow restrictors 531$a$, 531$b$, 531$c$, 531$d$ 531$e$ and 531$f$ varies relative to each other. The flow resistance of each of the second-feed-component flow restrictors 533$a$, 533$b$, 533$c$, 533$d$, 533$e$ and 533$f$ can be substantially the same as each other, or can vary relative to each other. The flow resistance of each of the third-feed-component flow restrictors 535$a$, 535$b$, 535$c$, 535$d$, 535$e$ and 535$f$ can be substantially the same as each other, or can vary relative to each other.

In a preferred embodiment, in which the feed-composition subsystem is fabricated as a modular fluidic chip comprising a plurality of laminae, the various flow restrictors 531$a$–$f$, 533$a$–$f$, 535$a$–$f$ can be formed (e.g., fabricated) in a first laminate, and the various mixing zones 540 formed (e.g., fabricated) in a second laminae. The feed component sources 530, 532, 534 can be formed (e.g., fabricated) in the first laminae, or alternatively, in a third laminae. Fluid communication between the various flow restrictors 531$a$–$f$, 533$a$–$f$, 535$a$–$f$, and the various mixing zones 540 can be effected through vertically-oriented inter-laminae-passages 541.

The six (or more) mixing zones 540, as shown in FIG. 4B, can be in fluid communication with reactor feed channels 545 through a plurality of internal-internal interface ports 555 for internal feed channels 545 (or alternatively, through internal-external-interface ports 485 (not shown) for external feed channels 545). Each of the six feed channels 545 can be in fluid communication with one or more reactors (not shown).

The external fluid distribution system 480, as shown in FIG. 4B, can comprise, for example, a plurality of flow-control elements such as a plurality of mass flow controllers 483 designated in the figures as MFC1, MFC2, MFC3, MFC4, MFC5 and MFC6. Each of the mass flow controllers 483 can be in fluid communication with a gas supply system 481 (FIG. 7C; not shown in FIG. 4B) or from a liquid supply system 482 (FIG. 7C; not shown in FIG. 4B) and can provide controlled flow of individual fluids—reactants, inert diluent fluids, inert purge gasses, etc.—from the fluid sources to the first, second and third feed component sources 530, 532, 534, respectively through the external feed component sources 530', 532', 534' and the external-internal interfaces 485. A valving arrangement comprising a plurality of source fluid feed valves 486 can provide for selective mixing of various individual fluids to form various mixtures as the feed component sources 530', 532', 534'. The first, second, and third feed components can be selectively fed or isolated from the composition-control subsystem 535 by operation of first, second and third feed-component-isolation valves 487, 488 and 489, respectively. The feed component isolation valves 487, 488, 489 can be automatically and remotely actuated—each individually (not shown), all collectively (not shown), or two collectively and one individually (as shown in FIG. 4B)—via feed-component-isolation-valve actuating lines 490. Pressure control can be effected for each of the channels as desired, and preferably using a high-temperature back-pressure controller 492 each of the channels (shown in FIG. 4B for only one of the six feed channels 545). With reference briefly to FIG. 4D, the fluid distribution can also comprise (externally or internally) an overflow passage 542 in fluid communication with the first-feed component source 530' such that some portion of the first feed component is allowed to vent through vertically-oriented inter-laminae-passages 541, 541', for example, to waste, optionally through an overflow flow restrictor 544.

Referring again to FIG. 4B, the combined feed control subsystem 525 and external distribution system 480, as shown in FIG. 4B, provides substantial flexibility for variably controlling the feed composition provided to each of the four or more reactors of the chemical reaction system. In a preferred method of operation, the first feed component source 530 is provided as a feed component to be controllably varied between the six feed compositions (and as such, is labeled in FIG. 4B as the variable partial pressure reactants ("Variable PP Reactants")). Controlled variation thereof is provided by flowing the first feed component from source 530 to each of the six mixing zones 540 through the first subset 531 of first-feed-component flow restrictors 531$a$, 531$b$, 531$c$, 531$d$, 531$e$ and 531$f$, each of which has a resistance that varies relative to each other. The second feed component source 532 is provided as a feed component controlled to be of substantially constant proportion (e.g., partial pressure for gaseous feed component) in the feed compositions (and as such, is labeled in FIG. 4B as the constant partial pressure reactants ("Constant PP Reactants")). Substantially the same proportion of the second feed component is provided to each of the mixing zones by flowing the second feed component from source 532 to each of the six mixing zones 540 through the second subset 533 of second-feed-component flow restrictors 533$a$, 533$b$, 533$c$, 533$d$, 533$e$ and 533$f$, each of which has a flow resistance that is substantially the same relative to each other. The source fluid feed valves 486 can be controlled to selectively align particular source fluids from particular mass flow controllers 483 to either the first (variable partial pressure) feed component source 530 or the second (constant partial pressure) feed component source 532.

In a preferred embodiment, with further reference to FIG. 4B, the third feed component source 534 is provided as an inert make-up fluid (e.g., make-up gas) feed component controlled to be complimentarily varied between the six feed compositions—by flowing the third feed component from its source 534 to each of the six mixing zones 540 through the third subset 535 of third-feed-component flow restrictors 535a, 535b, 535c, 535d, 535e and 535f, each of which has a flow resistance that varies relative to each other—such that the combined flow of the first and third feed components is substantially the same through each of the mixing zones 540. In a preferred operational embodiment, where the mass flow controllers 483 (or other fluid flow-control device) provide balanced flowrates (i.e., substantially the same total flowrate) for the first and third feed components through the first and third feed component sources, 530, 534, respectively, the third subset of third-feed-component flow restrictors is complementary to the first subset of corresponding first-feed-component flow restrictors where the sum of the group of the first-feed-component flow resistance and the third-feed-component flow resistance associated with a particular mixing zone (e.g., the mixing zone associated with flow restrictors 531a and 535a) is substantially the same as compared to such sum for the other mixing zones.

The relative values of the first feed-component flow restrictors 531a–f of the first (e.g., variable partial pressure) subset is not narrowly critical, and can be selected based on design choice of the operator. Various preferred sets of such relative flow-resistance values are shown in Table 1, together with the corresponding flow resistance values for the third (e.g., make-up gas) subset of third feed-component flow restrictors 535a–f.

TABLE 1

Various Sets of Relative Resistance Values

| Flow Restrictors | Relative Flow Resistance | | |
|---|---|---|---|
| | Linear | Symmetric | Binary-Ratioed |
| 531a:535a | 1:6 | 1:9 | 1:32 |
| 531b:535b | 2:5 | 2:8 | 2:16 |
| 531c:535c | 3:4 | 4:6 | 4:8 |
| 531d:535d | 4:4 | 6:4 | 8:4 |
| 531e:535e | 5:2 | 8:2 | 16:2 |
| 531f:535f | 6:1 | 9:1 | 32:1 |

In an alternative embodiment, the flow distribution subsystem shown in FIG. 4B can be operated without use of the third (make-up) feed component by selectively isolating the make-up feed component from the third component source 534 by shutting the corresponding third-feed-component isolation valve 489. In such a case, assuming, as described above, that the first subset 531 of first-component flow restrictors 531a–f have a flow resistance that varies relative to each other, and that the second subset 533 of second-component flow restrictors 533a–f have a flow resistance that is substantially the same relative to each other, then: (1) the total flowrate though each of the mixing zones 540 (and ultimately, each of the reactor feed flowrates) will vary between each of the six channels; and (2) the feed composition through each of the mixing zones 540 (and ultimately into each of the reactors) will also vary between each of the six channels (e.g., with varying relative proportions of the first feed component and the second feed component). Hence, such embodiments represents and integrated flow-partitioning subsystem and feed-composition control subsystem. Depending on the relative values of a second set of outlet flow restrictors (if any are present in the system), such embodiment can also comprise an integrated pressure-partitioning subsystem. Significantly, such embodiment also provides for controlled variation of contact time and space velocity through the four or more reactors.

In yet a further operational embodiment, the flow distribution subsystem shown in FIG. 4B can be operated without use of the first (variable partial pressure) feed component by selectively isolating the make-up feed component from the first component source 530 by shutting the corresponding first-feed-component isolation valve 487. In such a case, assuming, as described above, that the second (constant partial pressure) subset 533 of second-component flow restrictors 533a–f have a flow resistance that is substantially the same relative to each other, and that the third (inert make-up) subset 531 of third-component flow restrictors 535a–f have a flow resistance that varies relative to each other, then: (1) the total flowrate though each of the mixing zones 540 (and ultimately, each of the reactor feed flowrates) will vary between each of the six channels; and (2) the relative concentration of the second feed composition through each of the mixing zones 540 (and ultimately into each of the reactors) will also vary between each of the six channels (e.g., with varying relative proportions of the first feed component and the second feed component). Significantly, such embodiment provides for controlled variation of contact time, with substantially the same space velocity through the four or more reactors.

A number of other operational embodiments in the flow distribution subsystem shown in FIG. 4B can also be effected, with specific embodiments being selected according to the desired variation or substantial equivalence of feed composition, flowrates (and relatedly, contact time and/or space velocity), and/or pressure. Selection of an appropriate and/or desired operation embodiment is, in view of the guidance provided herein, within the skill in the art. In addition to the aforementioned embodiments, for example, the subsystem can be operated without use of the second (constant partial pressure) feed component by selectively isolating the make-up feed component from the second component source 532 by shutting the corresponding first-feed-component isolation valve 488. Additionally or alternatively, and/or in combination with other various embodiments, the mass flow controllers 483 (or other flow-control device) can be operated to effect unbalanced flow (i.e., unequal total flow) as compared between the first, second and third feed-component sources 530, 532, 534.

The feed composition portion of the fluid distribution system can be configured in a number of ways to provide a set of feed-composition flow restrictors for variably controlling the composition of components supplied to the four or more mixing zones. The following embodiments are, therefore, to be considered exemplary and non-limiting, even though particularly described herein.

Figure 4C:
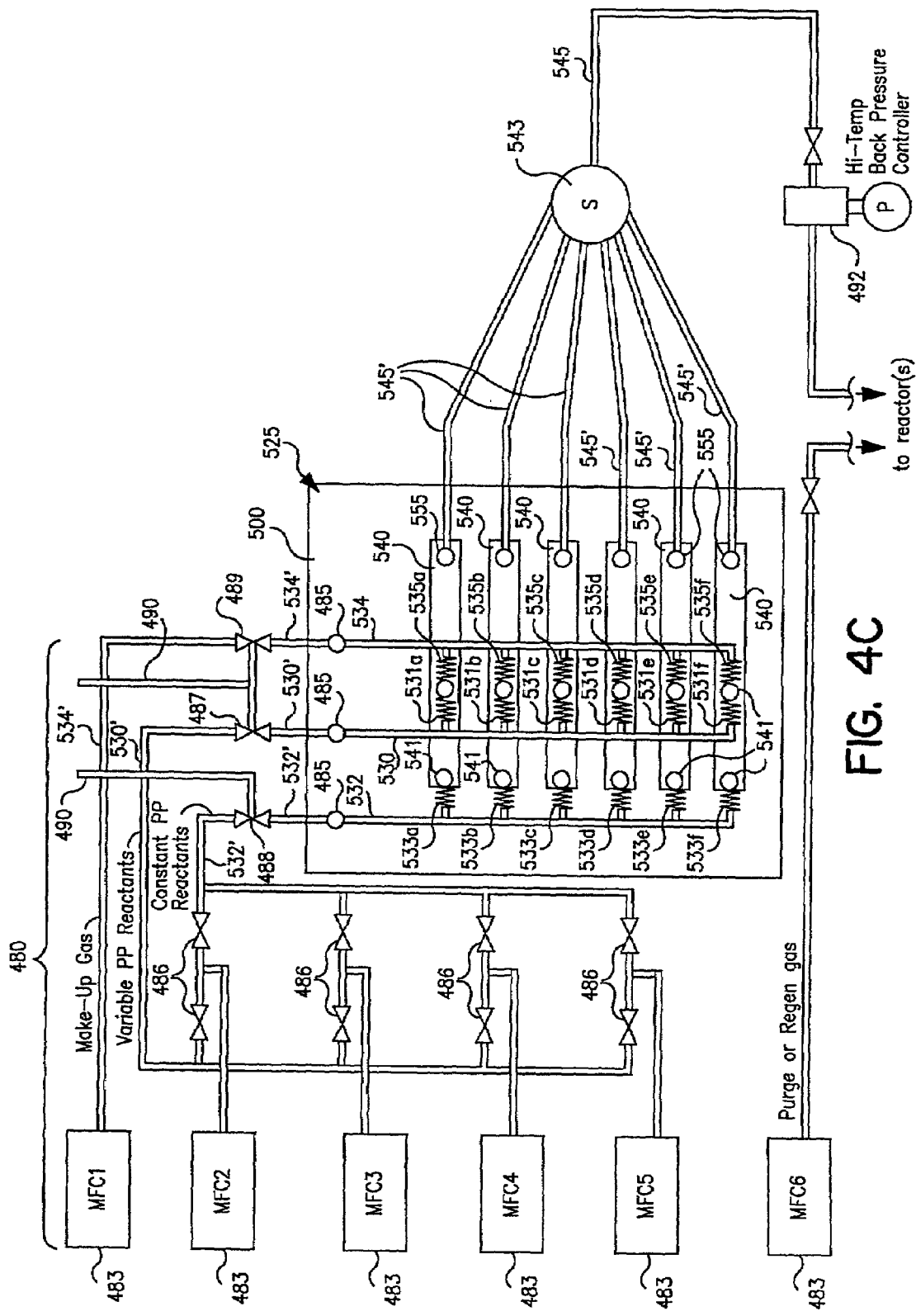
Figure 4D:
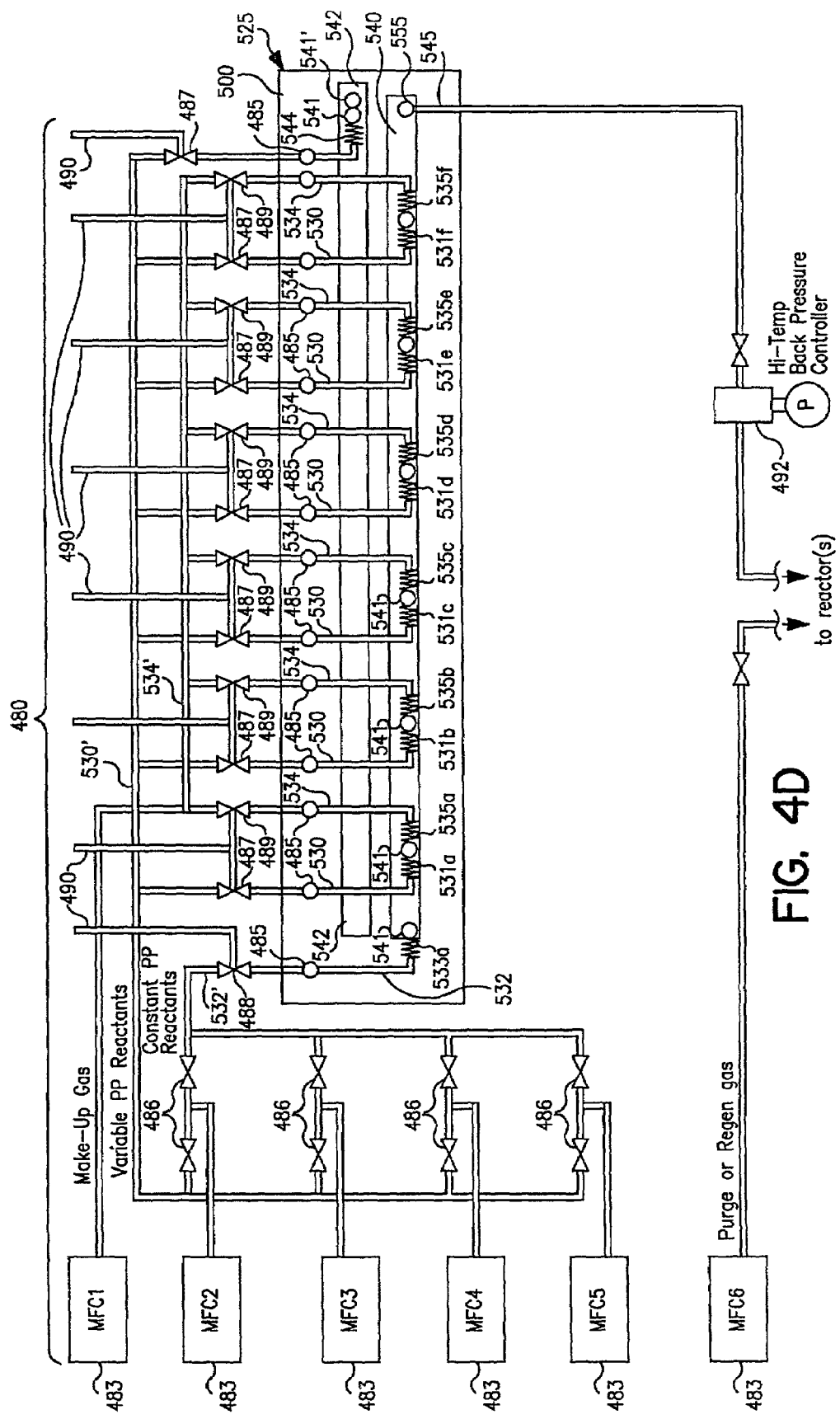

In one such embodiment, exemplified in FIGS. 4C and 4D for a single channel of the chemical reaction system, the feed composition subsystem (e.g, portion) of the distribution system can be configured to provide a plurality of selectable dedicated groups of feed-composition flow restrictors, each of the feed-composition flow restrictor groups comprising two or more feed-component flow restrictors, and each of the feed-composition flow restrictor groups providing fluid communication between two or more external sources of feed components and a common mixing zone. The resistance of the flow restrictors within a particular dedicated group of feed-composition flow restrictors can be the same or can vary relative to each other. The resistance of the flow restrictors between different selectable dedicated groups of feed-composition flow restrictors preferably vary relative to each other with respect to the restrictors providing fluid communication with at least one of the feed components, such that each of the plurality of groups provides different ratios of feed components to the mixing zones relative to other groups within the plurality. Selection of the dedicated feed-composition flow restrictor groups can be effected downstream of the plurality of feed-composition flow restrictor groups—for example with a selection valve (FIG. 4C), or alternatively, upstream of the plurality of feed-composition flow restrictor groups—for example with a series of individual valves (FIG. 4D).

With reference to FIGS. 4C and 4D for a single feed channel 545 of the chemical reaction system, the feed composition subsystem 525 of the distribution system 500 can be configured to provide a plurality of selectable dedicated groups of feed-composition flow restrictors (e.g, a first group comprising flow restrictors 531a, 533a, 535a;, a second group comprising flow restrictors 531b, 533b, 535b;, a third group comprising flow restrictors 531c, 533c, 535c, etc.). Each of the plurality of feed-composition-flow-restrictor groups (e.g., group a) provides fluid communication between a feed component sources (e.g., 530, 532, 533) and a common mixing zone 540. The resistance of the flow restrictors within a particular dedicated group of feed-composition flow restrictors (e.g, 531a, 533a, 535a) can be the same or can vary relative to each other. The resistance of the flow restrictors between different selectable dedicated groups of feed-composition flow restrictors (e.g, group "a" (531a, 533a, 535a) versus group "b" (531b, 533b, 535b)) preferably vary relative to each other with respect to the restrictors providing fluid communication with at least one of the feed components (e.g. 531a versus 531b), such that each of the plurality of groups provides different ratios of feed components to the mixing zones 540 relative to other groups within the plurality. Selection of the dedicated feed-composition flow restrictor groups can be effected downstream of the plurality of feed-composition flow restrictor groups—for example with a selection valve 543 (FIG. 4C), or alternatively, upstream of the plurality of feed-composition flow restrictor groups—for example with a series of individual valves 487, 488, 489 (FIG. 4D). Other components shown in FIGS. 4C and 4D are substantially as described in connection with FIG. 4B.

In a multi-channel version of the immediately aforementioned embodiment, the feed-composition subsystem of the fluid distribution system can be configured to be selectably and controllably varied for each of two or more, preferably four or more mixing zones. Specifically, a plurality of selectable dedicated feed-composition flow restrictor groups can provide selectable fluid communication between two or more external feed component sources and the mixing zone for each of the four or more channels of the reaction system, such that a set of feed-component flow restrictors can be selected from among such particularly dedicated selectable flow restrictor groups. An exemplary configuration (not shown) could employ a plurality of dedicated selectable feed-composition flow restrictor groups (e.g., as shown in FIG. 4C) arranged in a manner analogous to the manner shown in FIG. 2C for selectable-dedicated inlet flow restrictors. Selection between a plurality of groups for a multi-channel mixing zones can also be effected using an array of isolation valves, such as shown in FIG. 4F and discussed in connection therewith.

In an especially preferred embodiment for selectably and controllably varying the feed composition provided to each of the four or more reactors of the chemical reaction system through four or more mixing zones, the feed-composition subsystem of the fluid distribution system comprises a series of selectable sets of feed-component flow restrictors. The series comprises two or more, preferably three or more, more preferably four or more sets of feed-component flow restrictors. Each of the two or more sets of feed-component flow restrictors comprises a first subset of four or more first-feed-component flow restrictors, each of the four or more first-feed-component flow restrictors providing fluid communication between an external source for the first feed component and one of the four or more mixing zones. Optionally, but preferably, the flow resistance of at least two of the four or more first-feed-component flow restrictors varies relative to each other. More preferably, the flow resistance of each of the four or more first-feed-component flow restrictors varies relative to the resistance of the other such restrictors in the set. Each of the two or more sets of feed-component flow restrictors can (optionally, but preferably) further comprise a second subset of four or more second-feed-component flow restrictors, each of the four or more second-feed-component flow restrictors providing fluid communication between an external source for the second feed component and one of the four or more mixing zones. The flow resistance of the four or more second-feed-component flow restrictors can vary or be substantially the same relative to each other. Optionally, but preferably, each of the two or more sets of feed-component flow restrictors further comprises a third subset of four or more third-feed-component flow restrictors, each of the four or more third-feed-component flow restrictors providing fluid communication between an external source for the third feed component and one of the four or more mixing zones. The flow resistance of the four or more third-feed-component flow restrictors can vary or be substantially the same relative to each other. This especially preferred feed-composition subsystem of the fluid distribution system can further comprise one or more valves for selecting between the two or more sets of feed-component flow restrictors. The particular nature of the valve or valves is not critical. The valves can, for example, be rotary-type selection valves, a series of separate and individual valves, each valve being actuated individually, in groups or collectively, or alternatively an array of valves as described herein in connection with FIGS. 9A and 9B. A specific embodiment exemplifying this embodiment of the invention is shown in FIG. 4E and discussed further below in connection therewith.

Figure 4E:
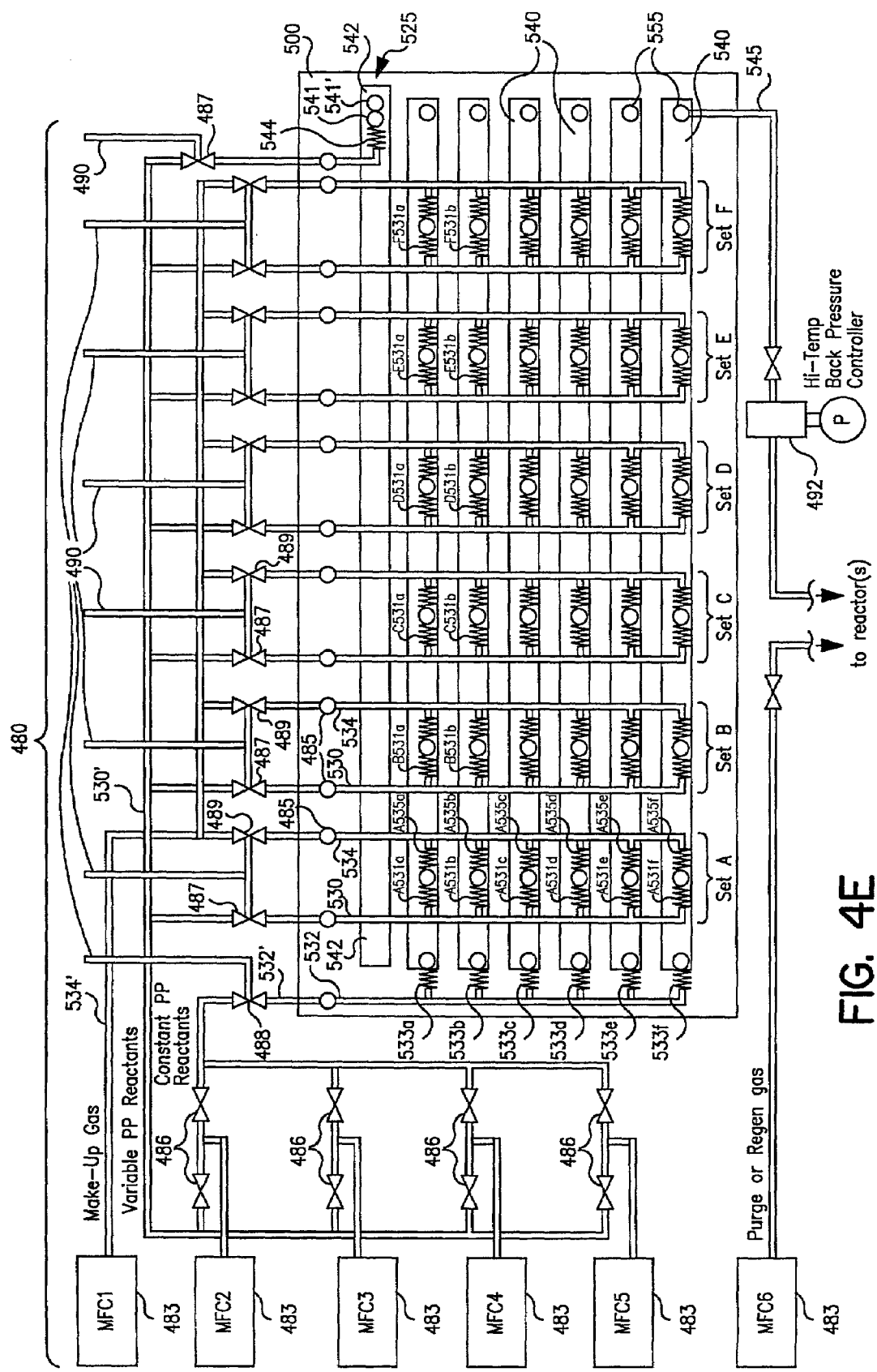
Figure 4F:
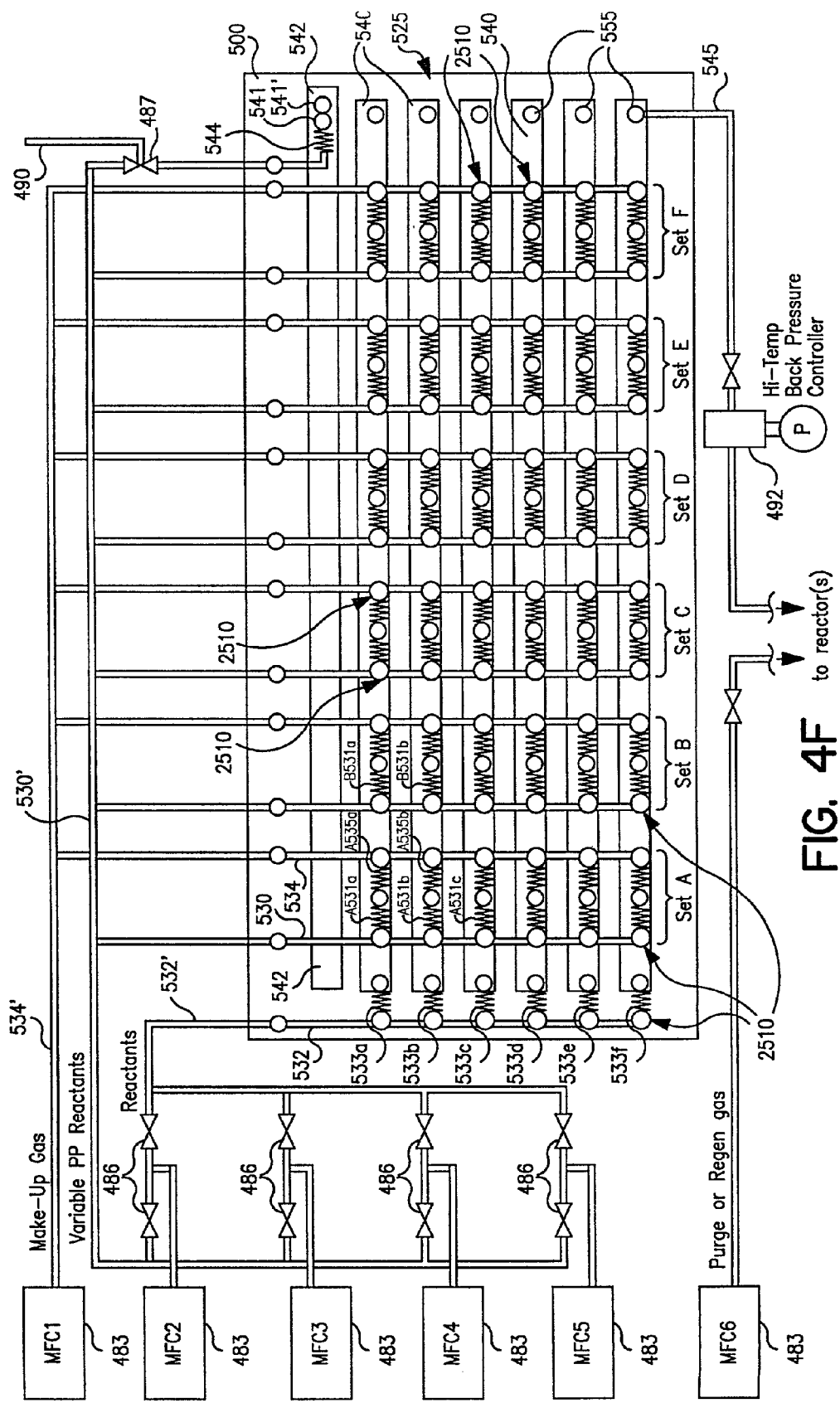

In an especially preferred embodiment, represented schematically in FIG. 4E, the feed composition provided to each of the four or more reactors of the chemical reaction system can be selectably and controllably varied. In this embodiment, the feed-composition subsystem 525 of the fluid distribution system 500 comprises a series of selectable (third) sets of feed-component flow restrictors, indicated in FIG. 4E as SET A, SET B, SET C, SET D, SET E and SET F. Each of the sets (A–F) of feed-component flow restrictors comprises a first subset of first-feed-component flow restrictors (e.g., A531a–f for SET A, B531a–f for SET B, C531a–f for SET C, etc.) and a third subset of third-feed-component flow restrictors (e.g. A535a–f for SET A, B535a–f for SET B, C535a–f for SET C, etc.), with each such subset and set being substantially as described in connection with FIG. 4B above. The feed-control subsystem 525 can further comprise a second subset of second feed-component flow restrictors 533a–f, substantially as described in connection with FIG. 4B above. This especially preferred feed-composition subsystem 525 of the fluid distribution system 500 can further comprise first, second and third feed-component-isolation valves 487, 488 and 489, respectively that can be automatically and remotely actuated—each individually (not shown), all collectively (not shown), and preferably one valve 488 individually and sets of the two feed component isolation valves 487 and 489 collectively with respect to each set (as shown in FIG. 4B)—via feed-component-isolation-valve actuating lines 490. Selective actuation of the feed-component isolation valves for the first and third feed-component sources 530, 534 associated with a particular set (e.g., SET A, SET B, SET C, etc.) provides for the first and third feed components to flow through the flow restrictors associated with that particular set and into the mixing zones 540. Other components shown in FIG. 4E are substantially as described in connection with FIG. 4B. It can be appreciated this embodiment provides extreme operational flexibility and control over feed compositions to go to each of the four or more particular feed channels 545. Operational aspects such as those discussed in connection with FIG. 4B are applicable as well with respect to the embodiment shown in FIG. 4E, with the added flexibility of selectably switching between various sets of flow restrictors, such that, for example, each of the four or more reactors can be screened under each of the six sets of varied feed composition (and/or varied flowrate and/or varied pressure) conditions.

The relative values of the first feed-component flow restrictors 531a–f of the first (e.g., variable partial pressure) subset and/or the values of the second feed-component flow restrictors of third (e.g., make-up gas) subset employed in connection with each set (e.g., SET A, SET B, SET C, etc.) is not narrowly critical, and can be selected based on design choice of the operator. In a preferred approach, the relative values are "rotated" from one set to another set with respect to the associated mixing zone 540/feed channel 545, such that in operation, one can selectably obtain the same six variations in feed composition through each of the six mixing zones/feed channels 545, merely by selecting each of the sets (i.e., SET A through SET F) in turn. Various preferred sets of such "rotating" relative flow-resistance values are shown in Tables 2A through 2C based on linearly-varying values (Table 2A), symetrically-varying values (Table 2B) or binary-ratioed-varying values (Table 2C) or summing-resistance values (Table 2D).

TABLE 2A

Sets of Linearly-Varying Relative Resistance Values

| Flow Restrictors | Relative Flow Resistance (Linear Sets) | | | | | |
|---|---|---|---|---|---|---|
| | Set A | Set B | Set C | Set D | Set E | Set F |
| 531a:535a | 1:6 | 2:5 | 3:4 | 4:3 | 5:2 | 6:1 |
| 531b:535b | 2:5 | 3:4 | 4:3 | 5:2 | 6:1 | 1:6 |
| 531c:535c | 3:4 | 4:3 | 5:2 | 6:1 | 1:6 | 2:5 |
| 531d:535d | 4:3 | 5:2 | 6:1 | 1:6 | 2:5 | 3:4 |
| 531e:535e | 5:2 | 6:1 | 1:6 | 2:5 | 3:4 | 4:3 |
| 531f:535f | 6:1 | 1:6 | 2:5 | 3:4 | 4:3 | 5:2 |

TABLE 2B

Sets of Symmetrically-Varying Relative Resistance Values

| Flow Restrictors | Relative Flow Resistance (Symmetrical Sets) | | | | | |
|---|---|---|---|---|---|---|
| | Set A | Set B | Set C | Set D | Set E | Set F |
| 531a:535a | 1:9 | 2:8 | 4:6 | 6:4 | 8:2 | 9:1 |
| 531b:535b | 2:8 | 4:6 | 6:4 | 8:2 | 9:1 | 1:9 |
| 531c:535c | 4:6 | 6:4 | 8:2 | 9:1 | 1:9 | 2:8 |
| 531d:535d | 6:4 | 8:2 | 9:1 | 1:9 | 2:8 | 4:6 |
| 531e:535e | 8:2 | 9:1 | 1:9 | 2:8 | 4:6 | 6:4 |
| 531f:535f | 9:1 | 1:9 | 2:8 | 4:6 | 6:4 | 8:2 |

TABLE 2C

Sets of Binary-Ratioed-Varying Relative Resistance Values

| Flow Restrictors | Relative Flow Resistance (Binary-Ratioed Sets) | | | | | |
|---|---|---|---|---|---|---|
| | Set A | Set B | Set C | Set D | Set E | Set F |
| 531a:535a | 1:32 | 2:16 | 4:8 | 8:4 | 16:2 | 32:1 |
| 531b:535b | 2:16 | 4:8 | 8:4 | 16:2 | 32:1 | 1:32 |
| 531c:535c | 4:8 | 8:4 | 16:2 | 32:1 | 1:32 | 2:16 |
| 531d:535d | 8:4 | 16:2 | 32:1 | 1:32 | 2:16 | 4:8 |
| 531e:535e | 16:2 | 32:1 | 1:32 | 2:16 | 4:8 | 8:4 |
| 531f:535f | 32:1 | 1:32 | 2:16 | 4:8 | 8:4 | 16:2 |

TABLE 2D

Sets of Summing Resistance Values

| Flow Restrictors | Relative Flow Resistance (Binary-Ratioed Sets) | | | | | |
|---|---|---|---|---|---|---|
| | Set A | Set B | Set C | Set D | Set E | Set F |
| 531a:535a | 1:63 | 2:62 | 4:60 | 8:56 | 16:48 | 32:32 |
| 531b:535b | 2:62 | 4:60 | 8:56 | 16:48 | 32:32 | 1:63 |
| 531c:535c | 4:60 | 8:56 | 16:48 | 32:32 | 1:63 | 2:62 |
| 531d:535d | 8:56 | 16:48 | 32:32 | 1:63 | 2:62 | 4:60 |
| 531e:535e | 16:48 | 32:32 | 1:63 | 2:62 | 4:60 | 8:56 |
| 531f:535f | 32:32 | 1:63 | 2:62 | 4:60 | 8:56 | 16:48 |

With reference to FIG. 4F, depicting a further embodiment of the invention, each of the flow restrictors included within an array of flow restrictors—such as, for example, an array of flow restrictors comprising a series of sets (e.g., SET A, SET B, SET C, etc.) of (third) feed-component flow restrictors, as described above, can be variably and controllably individually selected by fluidically coupling the array of flow restrictors with an array of valves. In a preferred embodiment, the array of valves can be a microvalve array 2500 that comprises an array of microvalves 2510 (not shown schematically) in operational communication with an array of microvalve actuators 2515 substantially as described in connection with FIGS. 9A and 9B. Other components shown in FIG. 4F are substantially as described in connection with FIGS. 4B or 4E. It can be appreciated this embodiment also provides extreme operational flexibility and control over feed compositions to go to each of the four or more particular feed channels 545. Operational aspects such as those discussed in connection with FIG. 4B are applicable as well with respect to the embodiment shown in FIG. 4E, with the added flexibilty of selectably switching between individual flow restrictors. As such, selection permutations can include, for example, both groups of flow restrictors providing feed components to a particular mixing zones 540, as well as sets of flow restrictors providing feed components in varied fashion between mixing zones 540. That is, in operation, one can individually select particular flow restrictors in various combinations to form both: (1) varied groups for each of the mixing zones 540 associated with a particular flow channel; and (2) sets of such varied groups (considered between different mixing zones 540/feed channels 545).

In a preferred embodiment, in which the feed-composition subsystem is fabricated as a modular fluidic chip comprising a plurality of laminae, the various flow restrictors 531a–f, 533a–f, 535a–f can be formed (e.g., fabricated) in a first laminate, and the various mixing zones 540 formed (e.g., fabricated) in a second laminate situated, for example, under the first laminae. An array 2500 of selectable microvalves 2510 can be formed in a third laminae situated, for example, above the first laminate. The feed component sources 530, 532, 534 can be formed (e.g., fabricated) in a forth laminate, situated, for example, above the third laminae, such that a feed-component can flow through feed component sources 530, 532, 524, through selected valves 2510, through selected flow restrictors 231a–f, 233a–f, 235a–f associated with the selected valves 2510, to form various feed compositions within the mixing zones 540. Fluid communication between the various components of adjacent laminae (e.g., between flow restrictors 531a–f, 533a–f, 535a–f, and the various mixing zones 540) can be effected through vertically-oriented inter-laminae-passages (not shown in FIG. 4F, due to overlaying valves 2510).

Table 3 provides an exemplary, non-limiting relative flow-resistance values for an array comprising individually selectable flow restrictors shown in FIG. 4F. A skilled artisan can, of course deviate from such values and remain within the scope of the invention.

TABLE 3

Sets of Resistance Values for Array of Individually Selectable Restrictors

| Flow Restrictors | Relative Flow Resistance | | | | | |
|---|---|---|---|---|---|---|
| | Set A | Set B | Set C | Set D | Set E | Set F |
| 531a:535a | 1:1 | 2:2 | 3:3 | 4:4 | 5:5 | 6:6 |
| 531b:535b | 1:1 | 2:2 | 3:3 | 4:4 | 5:5 | 6:6 |
| 531c:535c | 1:1 | 2:2 | 3:3 | 4:4 | 5:5 | 6:6 |
| 531d:535d | 1:1 | 2:2 | 3:3 | 4:4 | 5:5 | 6:6 |
| 531e:535e | 1:1 | 2:2 | 3:3 | 4:4 | 5:5 | 6:6 |
| 531f:535f | 1:1 | 2:2 | 3:3 | 4:4 | 5:5 | 6:6 |

With respect to each of the aforementioned fluid distribution feed-composition subsystems, feed components can be provided from an external source through a primary flow-control system prior to interfacing with the feed-composition subsystems of the invention. Primary flow control to or through each of the mixing zones is preferably effected, for example for gaseous fluids, using mass-flow controllers with back-pressure regulation (e.g., using a high-temperature back-pressure controller). For liquid flow control, pumps such as syringe pumps, HPLC pumps, etc. could be employed in combination with appropriate flow-sensing and flow-control systems. For further variation between the at least two feed components supplied to each of the mixing zones, the pressure and/or total flow of the external sources for the first and second feed components can be varied relative to each other.

The feed-composition subsystem, whether provided as modular units, whether provided in microfluidic chips, and/ or whether provided using conventional or micro-scale components, can have the four or more mixing zones in fluid communication with one or more reactors, either directly, through one or more flow-splitters, through one or more selection valves, and additionally or alternatively through flow partitioning and/or pressure partitioning subsystems. Generally, a variable feed-composition subsystem of the fluid distribution system can comprise at least one set or subset of four or more feed-component flow restrictors, as described above, to provide first and preferably also second feed components to each of the four or more mixing zones such that four or more feed compositions (each varying relative to each other) are formed. The resulting four or more varying feed compositions are then fed from the four or more mixing zones to the four or more reactors (such that each of the four or more mixing zones, or a further space in fluid communication therewith, is functional as an "external" reactant source for, and is in fluid communication with, at least one of the four or more reactors). In one embodiment, each of the four or more mixing zones can be a dedicated mixing zone in fluid communication with only one of the four or more reactors. In other embodiments, however, each of the four or more mixing zones can be in fluid communication with a plurality of the four or more reactors, or alternatively, with each of the four or more reactors. In either of such cases, a flow and/or pressure partitioning first inlet flow restrictors, and/or second outlet flow restrictors, can provide fluid communication between the four or more mixing zones and the four or more reactors. The embodiments shown in FIGS. 5A and 5B (shown with flow and/or pressure partitioning) are exemplary, and are discussed in greater detail below. The specific embodiment shown in FIG. 5C and discussed further below in connection therewith, is especially preferred.

Figure 5B:
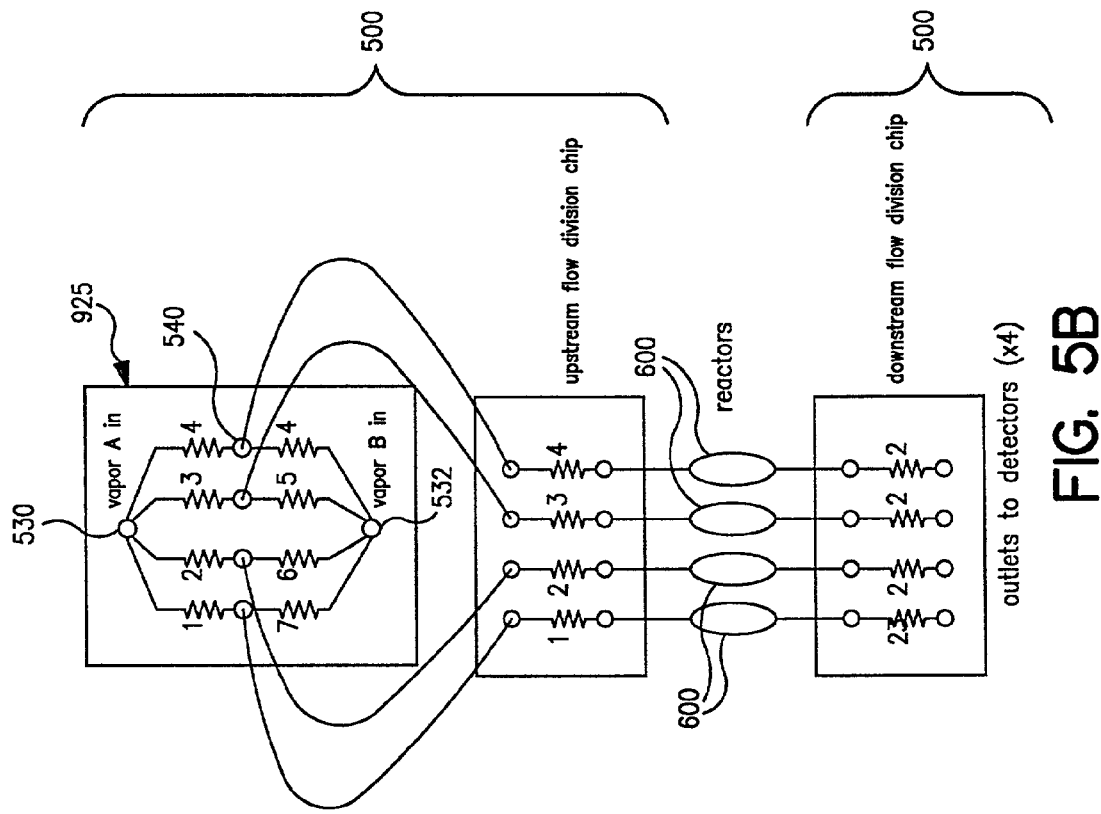
FIGS. 5A through 5C are schematic views showing various alternative embodiments for integrated multi-channel parallel reactors having one or more of a flow-partitioning subsystem, a pressure-partitioning subsystem or a feed-composition subsystem.
Figure 5A:
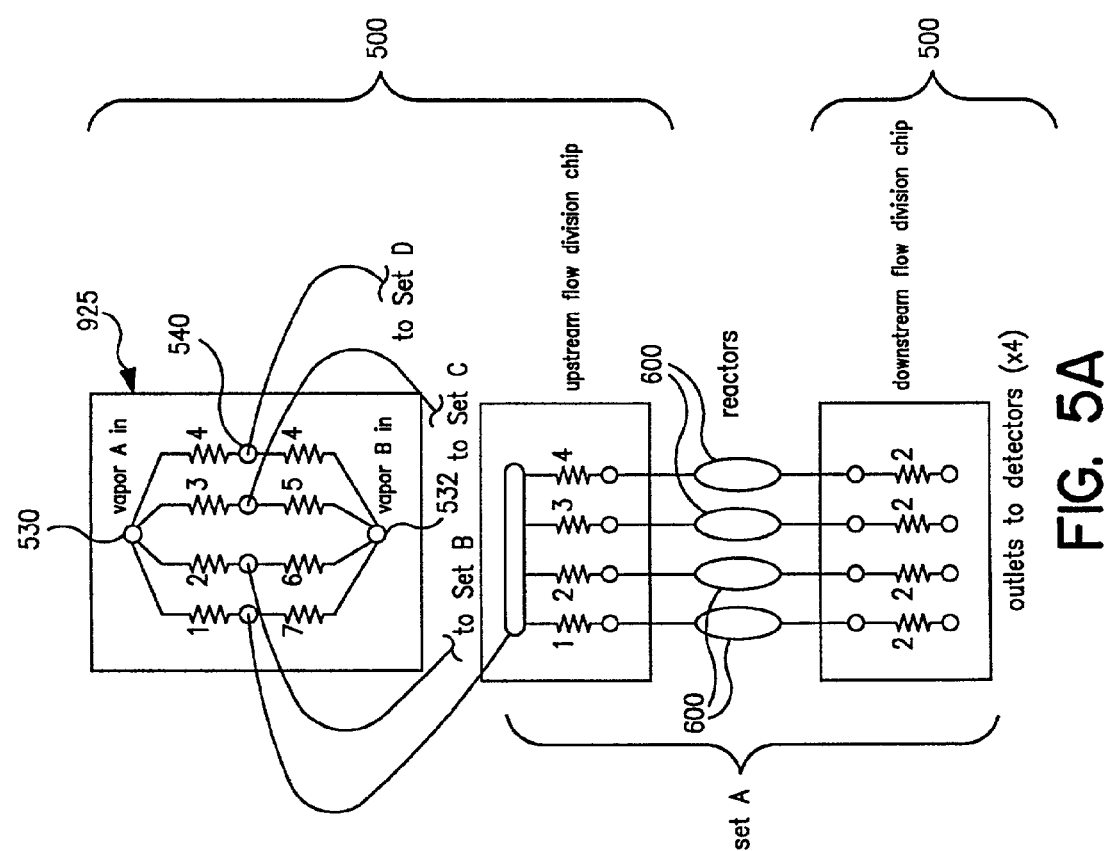
Figure 5C:
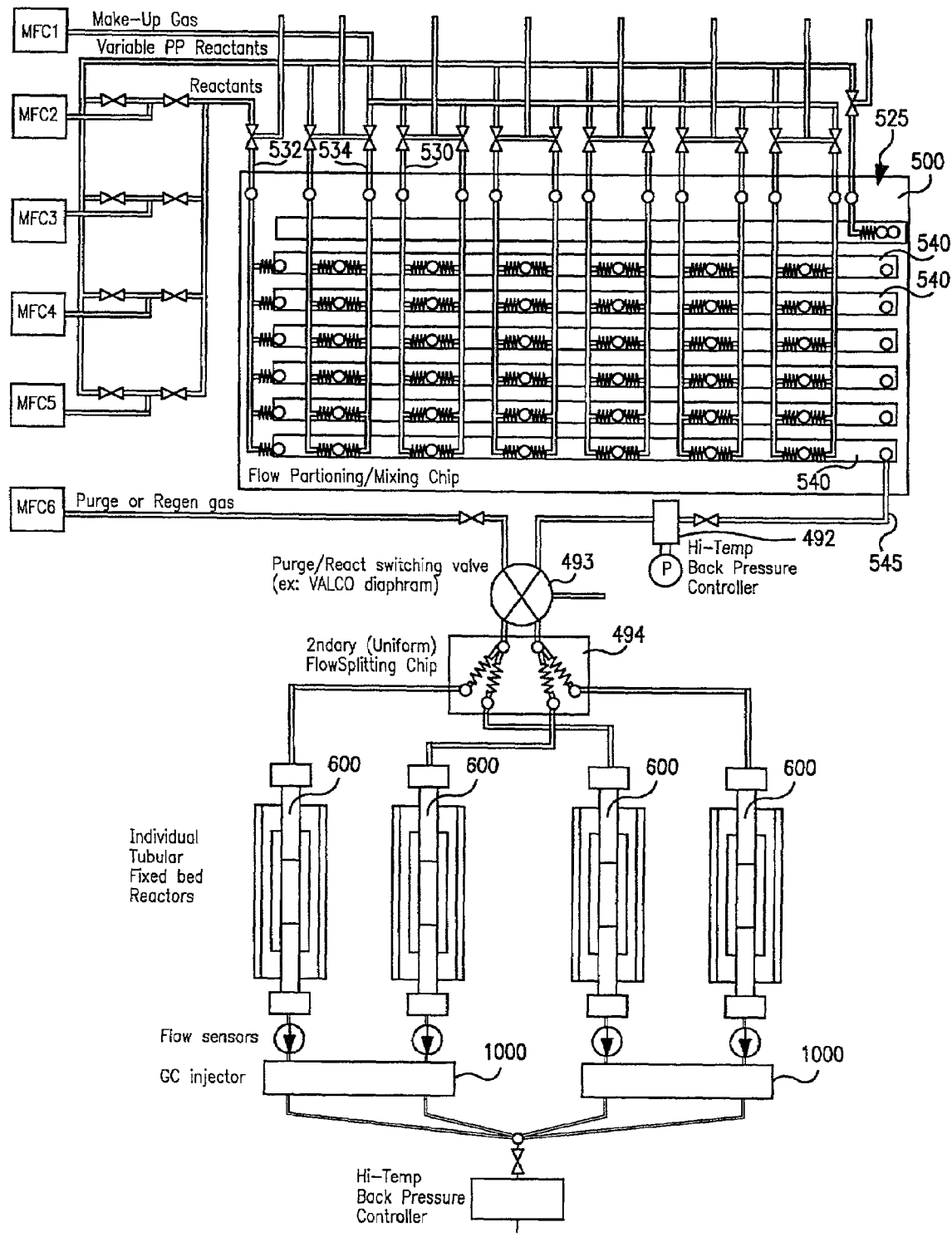

With reference to FIGS. 5A through 5C, a variable feed-composition subsystem of the fluid distribution system 500 can comprise at least one set or subset of four or more feed-component flow restrictors, as described above in connection with FIG. 4A (for FIGS. 5A and 5B) and in connection with FIG. 4E (for FIG. 5C). First and preferably also second feed components can be provided to each of the four or more mixing zones 540 such that four or more feed compositions (each varying relative to each other) are formed. The resulting four or more varying feed compositions are then fed from the four or more mixing zones 540 to the four or more reactors 600 (such that each of the four or more mixing zones, or a further space in fluid communication therewith, is functional as an "external" reactant source for, and is in fluid communication with, at least one of the four or more reactors). In one embodiment (e.g. FIG. 5B), each of the four or more mixing zones 540 can be a dedicated mixing zone in fluid communication with only one of the four or more reactors 600. In other embodiments (e.g. FIG. 5A, FIG. 5C), each of the four or more mixing zones 540 can be in fluid communication with a plurality of the four or more reactors 600, or alternatively, with each of the four or more reactors.

In either of such cases, a flow and/or pressure partitioning first inlet flow restrictors, and/or second outlet flow restrictors, can provide fluid communication between the four or more mixing zones 540 and the four or more reactors 600 (FIGS. 5A and 5B). Alternatively, the four or more mixing zones 540 can be in fluid communication with the reactors directly—without flow and/or pressure partitioning. (FIG. 5C). The array of reactors 600 as shown in FIG. 5C can be substantially as shown and described in connection with FIG. 8B, and can be in fluid communication with the four or more mixing zones 540 through one or more switching valves 493 and/or flow splitters 494.

Integrated Variable Feed-Composition, Flow Partitioning and/or Pressure Partitioning The aforementioned approaches for controlling reactor feed compositions can be combined with the aforementioned approaches for controlling reactant flow rates and reactor pressure. In one such embodiment, independently variable flow rates, pressures and reactor feed compositions are achieved in a single integrated fluid distribution system of the reaction system. As appropriate (e.g., where a mixing zone is dedicated as a reactant source to a particular reactor), a feed-component flow resistance can also be, or can be considered as part of, the resistance for the inlet-flow restrictor for that reactor. See, for example, discussion provided in connection with FIGS. 4B and 4E, below.

Flow Restrictors and/or Valves Provided as Modular Units

In a further embodiment, a set of four or more inlet flow restrictors, four or more outlet flow restrictors, and/or four or more feed-component flow restrictors (depending on the subsystem of interest), or a portion thereof, can be provided to the reactor system as a modular unit comprising one or more flow restrictors. The modular unit preferably comprises an essential absence of reactor components (e.g., components having one or more surfaces that define the reaction cavity), but can in some embodiments, include such reactor components (e.g. See, for example, the aforementioned related U.S. patent application to Bergh et al. (U.S. Ser. No. 09/518,794, issued as U.S. Pat. No. 6,749,814). The modular unit can, in either case, also include other components of the fluid distribution system or subsystems, including for example valves (e.g., selection valves, isolation valves) pressure sensors, flow sensors, interface connections, etc.).

In a preferred embodiment, the modular unit can be a modular fluidic chip comprising a substrate and one or more flow restrictors integral therewith (e.g. formed at least partially at, on or in the substrate). The substrate having integral flow restrictors can be the modular fluidic chip substrate itself, or alternatively, can be one or more microchip bodies mounted, fixedly or detachably, onto the microfluidic chip substrate (i.e., where the microfluid chip is a primary substrate, with secondary substrates comprising the flow restrictors being mounted thereon). In general, both of such embodiments can be considered to be within the scope of the characterization of the flow restrictors as being integral with either a substrate or with one or more microchip bodies mounted on a substrate. The modular fluidic chip is preferably a plate-type substrate or block-type unit, and can comprise, for example, one or more substrates having one or more channels of controlled geometry operating as flow restrictors integral therewith or with one or more microchip bodies mounted thereon. The substrate or one more microchip bodies can comprise a plurality of laminae in which one or more flow restrictors are formed. Methods for producing such modular fluidic chip devices are generally known in various arts (e.g., circuit manufacturing), and are described below in connection with preferred embodiments of the invention. Such methods are also described in some detail in connection with related fluid distribution applications in the above-referenced co-pending application of Bergh et al. (U.S. Ser. No. 09/518,794, issued as U.S. Pat. No. 6,749,814). The modular fluidic chip can include other components, in addition to the one or more flow restrictors, including for example, microvalves (e.g., isolation valves), thermal conductivity detectors, flow-rate detectors, pressure sensors, and temperature sensors, among others. Such other components can be integral with a substrate or with one or more microchip bodies mounted on a substrate—either the same substrate/microchip bodies as the flow restrictors or different substrates/microchip bodies as the flow restrictors.

Modular fluidic chips can be employed as a single modular fluidic chip (including, for example, a plurality of flow restrictors for use as described above in connection with a plurality of reactors), or alternatively as a plurality of modular fluidic chips. Moreover, such modular fluid chips can be integrated with other, microscale reaction system components (e.g., microreactors, microsensors, etc.), as described below and/or as described in, or varied from, the co-pending application of Bergh et al. (U.S. Ser. No. 09/518, 794, issued as U.S. Pat. No. 6,749,814) and/or the co-pending application of Guan et al. (now U.S. Pat. No. 6,149,882). Such modular fluid chips can also be integrated with larger scale reaction system components.

In embodiments relating to flow- and/or pressure-partitioning subsystems, for example, a modular unit can comprise a plurality of flow restrictors, preferably having varying resistances to flow, to serve as either a first or second set of inlet or outlet flow restrictors, respectively. In an additional embodiment thereof, the modular unit can comprise a series of two or more selectable sets of such flow restrictors. In another embodiment thereof, the modular unit can comprise a plurality of dedicated flow-restrictors for a single particular reactor, from which a first or second set of flow restrictors can be selected (e.g., with a selection valve provided as part of the modular unit, or resident within the system). In still another embodiment thereof, the modular unit can comprise a single flow restrictor dedicated for a single particular reactor, and set of such modular units can be used to form the set of first inlet or second outlet flow restrictors.

In embodiments for feed-composition subsystems that provide for selectably and controllably varied feed compositions in multiple mixing zones/feed channels, one or more of the following, or a portion thereof, can be provided to the reactor system as a modular unit comprising: pluralities of selectable, dedicated feed-component flow restrictors, a set of four or more feed-component flow restrictors (e.g., with subsets, as described above), groups of feed-composition flow-restrictors, pluralities of feed-composition flow-restrictor groups, and/or a series of selectable sets of feed-component flow-restrictor groups. Specifically, in one embodiment, the modular unit comprises a plurality of flow restrictors, preferably having varying resistances to flow, to serve as a set of feed-component flow restrictors. In another embodiment, the modular unit can comprise a plurality of selectable groups of feed-component flow-restrictors, each of the groups within the plurality being dedicated to a single particular mixing zone (e.g., feed channel), from which a set of flow restrictors can be selected (e.g., with appropriate valving, as described, provided as part of the modular unit, or otherwise resident within the system). In still another embodiment thereof, the modular unit can comprise a single group of feed-composition flow restrictors for a single particular mixing zone (e.g. feed channel), and a set of such modular units can be used to form the set of feed-component flow restrictors, or alternatively, a plurality of such modular units can be used to form a plurality of groups of feed-composition flow restrictors. In a further embodiment, the modular unit can comprise a series of two or more selectable (third) sets of feed-component flow restrictors, as described above. In any case, the modular unit preferably comprises an essential absence of reactor components (e.g., components having one or more surfaces that define the reaction cavity), but can in some embodiment, include such reactor components.

In any case, the particular design of the flow restrictors or sets of flow restrictors is not critical. For example, the sets of flow restrictors can be fabricated as microfluidic channels having varying flow resistances connected between appropriate inlet and outlet plenums. Alternatively, pluralities of flow restrictors can be fabricated as microfluidic channels having substantially the same flow resistances connected between appropriate inlet and outlet plenums, with the outlet interfaces of such channels being cross-connected with other similarly fabricated pluralities, to form the sets of flow restrictors with varying resistances to flow. Regardless of the design, the shape and/or dimensions the channels are not limiting, except as specifically recited in the claims. The cross-sectional shape of a channel can be, for example, approximately square, rectangular, circular, oval, etc., or even irregular in shape, and may be determined primarily by the fabrication techniques employed. Approximately square or rectangular channels are typical, and the aspect ratio (width/depth) can be greater than 1, equal to 1 or less than 1. See, for example, U.S. Pat. No. 5,842,787 to Kopf-Sill et al. Because, however, the shape and/or dimensions of the channel will affect the flow rate of reactants through each cavity (e.g. reactor), these factors should be considered in connection with the overall chemical processing microsystem design. In general, the channels can have dimensions, for an approximately square cross-section, of not more than about 1 cm×1 cm, preferably of not more than about 5 mm×5 mm, more preferably not more than about 2 mm×2 mm, even more preferably of not more than about 1 mm×1 mm, and still more preferably of not more than about 100 µm×100 µm. Smaller dimensions can also be suitably employed in some applications, including dimensions of not more than about 10 µm×10 µm, not more than about 1 µm×1 µm, and not more than about 0.5 µm×0.5 µm. The channel can have a rectangular cross-section with an aspect ratio of greater or less than one, and dimensions adjusted to as to provide the same general ranges of cross-sectional flow area as described for a square cross-sectional channel. For an approximately circular cross-section, the diameter can be not more than about 1 cm, preferably not more than about 5 mm, more preferably not more than about 2 mm, even more preferably not more than about 1 mm, and still more preferably not more than about 100 µm. Smaller dimensions can also be suitably employed in some applications, including a diameter of not more than about 10 µm, not more than about 1 µm, and not more than about 0.5 µm. Described in terms of hydraulic radius, the distribution channel can have a hydraulic radius of not more than about 2.5 mm, more preferably not more than about 1.25 mm, even more preferably of not more than about 0.5 mm, yet more preferably of not more than about 0.25 mm, and most preferably not more than about 25 µm. Smaller hydraulic radii can also be suitably employed in some applications, including a hydraulic radius of not more than about 2.5 µm, not more than about 0.25 µm, and not more than about 0.125 µm. Hence, the hydraulic radius of the distribution channel preferably ranges from about 2.5 mm to about 0.125 µm, more preferably from about 1.25 mm to about 0.25 µm, and most preferably from about 2 mm to about 2.5 µm. The shape and dimensions of the cross-section of the distribution channel can be constant along the entire length of a distribution path or, if desired, can be varied along such length. If shape and/or dimensions of the channel are varied along the fluid-distribution path, however, the symmetry is, in some applications, preferably maintained to provide for appropriate conductances along each flow-resistance channel. The length of the distribution path, for example, between a common inlet or outlet plenum port and each terminal plenum is not generally limiting. In preferred embodiments, however, the length of each of the flow paths is designed such that the conductance is appropriate (i.e., substantially the same or purposefully varied, depending on the overall design scheme) for each of the flow paths.

Figure 3A:
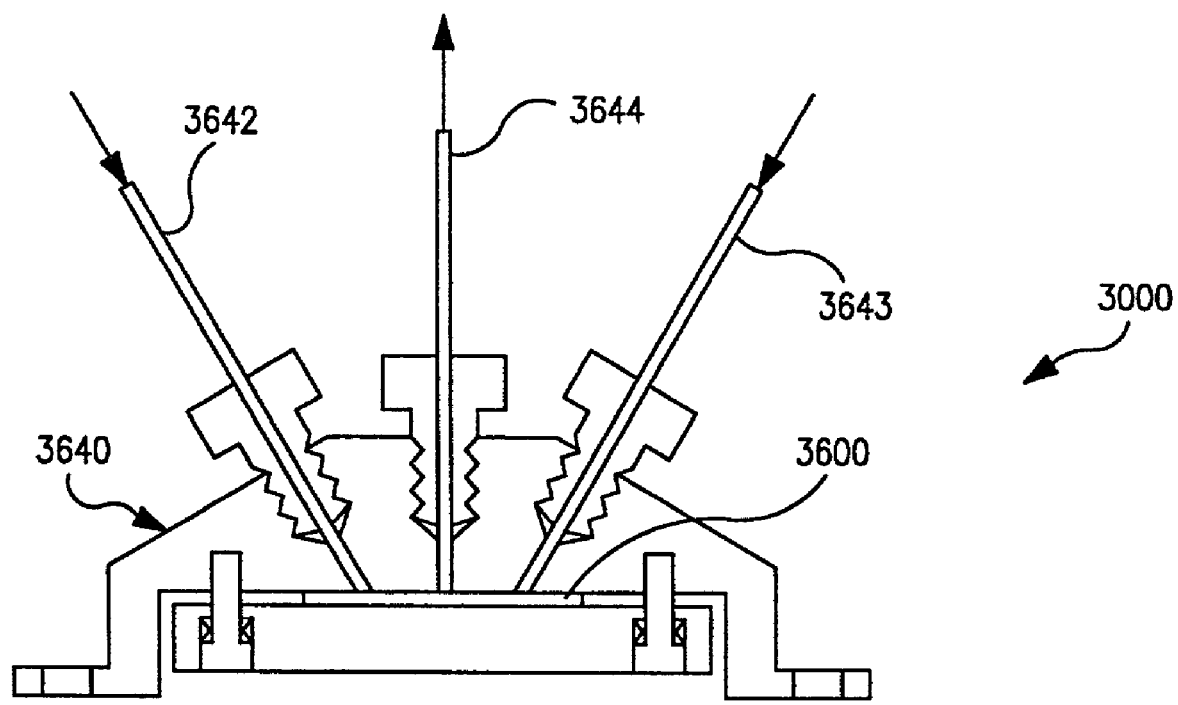
Figure 3B:
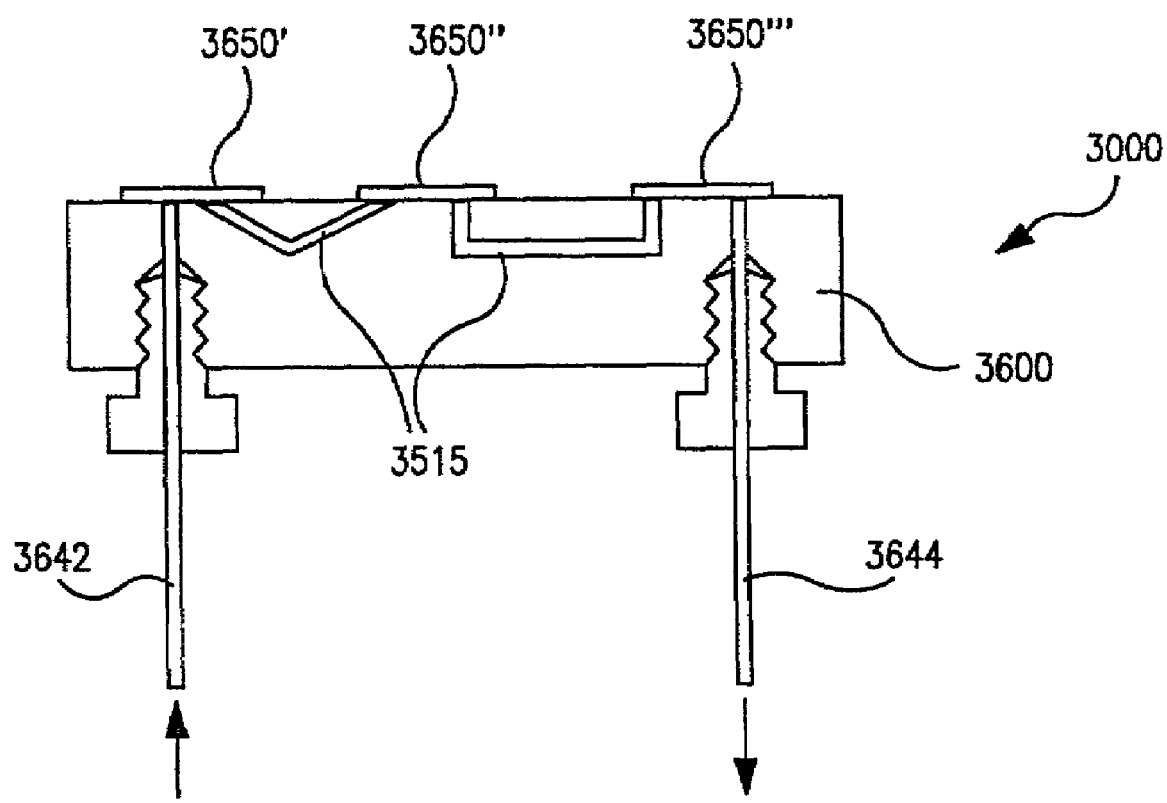
Figure 3C:
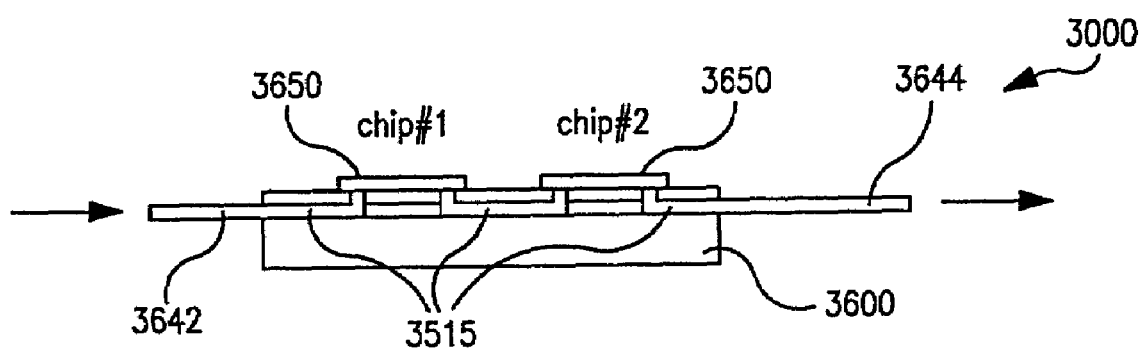
Figure 3D:
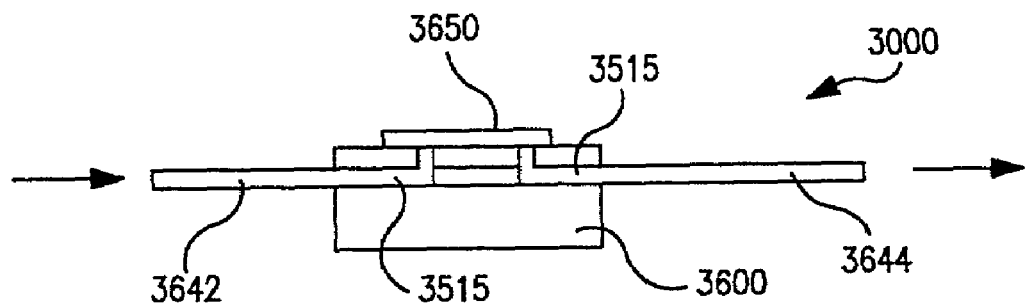

Embodiments exemplifying modular fluidic chips, together with associated embodiments for interfacing such chips with external reaction system components or external portions of a fluid distribution system thereof are shown in FIGS. 3A through 3D. With reference to FIG. 3A, a modular fluidic chip can comprise a substrate 3600 comprising one or more flow passages comprising the flow restrictors (not shown). External fluid connectors 3642, 3643, 3644 can provide fluid communication with the flow passages on the substrate 3600. For a feed-composition subsystem, for example, the fluid connectors can include first and second inlet fluid connectors 3642, 3643 providing fluid communication between first and second feed component sources, respectively, and a mixing zone, and can also include an outlet fluid connector 3644 providing fluid communication between the mixing zone and a downstream application (e.g a flow reactor, or a flow- and/or pressure-partitioning subsytem). FIGS. 3B, 3C and 3D show an alternative embodiment, in which the modular fluidic chip 3000 comprises one or more microchip bodies 3650 mounted on a substrate 3600. The substrate 3600 can include one or more fluidic passages 3515 providing fluid communication between the microchip bodies 3650 and external fluid connectors 3642, 3644, and/or between two or more microchip bodies 3650. FIG. 3B could be representative of a flow- and/or pressure-partitioning subsystem, where a reactant source enters through inlet connector 3642 to a set of inlet flow restrictors (not shown) included in a microchip body 3650', through a passage 3515 to another microchip body 3650" that includes one or more microreactors (not shown), and is subsequently discharged through a passage 3515 and through a set of outlet flow restrictors (not shown) integral with a third microchip body 3650''', and then ultimately through outlet connector 3644. FIGS. 3C and 3D show alternative variations on the general concept.

The substrate can generally be any body in which a flow restrictor (and/or other devices, such as valves, pressure detectors, mass flow sensors, etc., as desired) can be integrally formed, or any body having a surface on which a flow restrictor (and/or other devices) can be mounted, directly (e.g. by itself) or within another distinct body such as a microchip body. The substrate is preferably a substantially planar body having at least two substantially parallel opposing surfaces. In some embodiments (e.g., where the flow restrictors are integral with the substrate), the substrate can be a plate-type substrate such as a wafer. In the embodiments in which an array of four or more flow restrictors are integral with the substrate, the substrate is preferably a machinable material, and most preferably a micromachinable material (i.e., a material suitable for microfabrication techniques)—such as single crystal silicon. Although other suitable materials are known in the art for integral microfabrication of flow restrictors (e.g. gallium arsenide, quartz, ceramic, glass) silicon offers advantages of scale, availability, well-established fabrication foundries, expense and acceptable material properties. Some plastics can also be used for some applications. The substrate can advantageously comprise a plurality of laminae into which various components of the flow restrictors (and/or other devices) can be fabricated before assembly of the laminae to form the unified substrate. In other embodiments, in which the array of four or more flow restrictors are mounted on the substrate—either fixedly mounted (e.g. bonded) or detachably mounted (e.g. with a releasable seal)—the substrate can be of any material consistent with the required mechanical strength, operational conditions (e.g. temperature) and mounting approach. Materials having a relatively high thermal conductivity may be used in some applications, for example, to provide for efficient heat transfer and a large thermal mass. Copper, stainless steel or other metals are exemplary suitable materials for this embodiment, and may be coated with one or more other materials (e.g. nickel-coated copper) to provide additionally desired properties (e.g., chemical inertness) in combination. Materials that are at least machinable (on a macro-scale) are likewise preferred, to provide for assembly and other features (e.g. thermocouples, etc., as described below. In this embodiment, the substrate can have a mounting surface, and preferably an exposed mounting surface adapted to receive a corresponding mounting surface of the flow restrictors or of the microchip bodies comprising the flow restrictors.

In either of such embodiments (i.e., whether the flow restrictors are integral with the substrate or mounted thereon), the substrate can further comprise other features. For example, the substrate can comprise multiple passageways for providing fluid communication between the flow restrictors and components (or additional components) of the fluid distribution system that are external to the substrate (e.g. to the external reactant sources, or to exhaust ports or exhaust manifolds for discharging samples). In one preferred embodiment, for example, the substrate can further comprise four or more pairs of passages formed in the substrate for fluid communication with the four or more flow restrictors, respectively. Each pair of passages can comprise a first inlet passage for fluid communication with the inlet port of one of the flow restrictors, and a second outlet passage for fluid communication with the outlet port of the one of the flow restrictors. Moreover, the substrate can generally comprise additional components for system operational control, including for example: temperature-measuring devices (e.g., thermocouples, RTD's); heating blocks in thermal communication with a heat source (e.g., a fluid heat exchanger and/or resistive heating elements such as cartridge heaters); sensors (e.g. pressure sensors, flow sensors); and/or one or more exhaust manifolds.

In an embodiment in which the four or more flow restrictors are integral with the substrate, the substrate preferably comprises a plurality of laminae into which into which various components of the flow restrictors can be microfabricated before assembly of the laminae to form the unified substrate. With reference to FIGS. 3E and 3F, for example (showing a single set of flow restrictors, for simplicity of illustration), a set of flow restrictors (e.g., inlet flow restrictors 510, as illustrated) can be integrally microfabricated with a substrate 3600 comprising a first central laminate 3610 (also referred to herein as a "flow-restrictor wafer"), a second bottom wafer 3620 (also referred to herein as a "capillary wafer"), and a third top wafer 3630 (also referred to herein as a "capping wafer"). Although relative orientations are described as drawn (i.e., top, central and bottom), these orientations are intended for illustration purposes only, and should not be read as limiting on the scope of the invention. In fact, the orientation between top and bottom could be reversed, without change in the principle thereof.

The first central laminate 3610 comprises a first surface 3611, a substantially parallel, opposing second surface 3612, and a pair of microchannels 3516 having different resistances to flow and formed in the first surface 3611. Inlet port 3512 and outlet port 3514 are situated at opposing ends of the microchannels 3516, and extend from the microchannels 3516 through the central laminate 3610 to the second surface 3612 thereof. In the illustrated embodiment, the inlet and outlet ports 3512, 3514 are defined by interior cylindrical walls that extend substantially normal to the second surface 3612 of the central laminate 3610. The second bottom laminate 3620 comprises a first surface 3621, a substantially parallel, opposing second surface 3622, and apertures—specifically first aperture 3512' and a pair of second apertures 3514' in substantially alignment with the inlet and outlet ports 3512, 3514, respectively of the central laminate 3610. When assembled, the first and second apertures 3512', 3514' are essentially an extension of the inlet port and outlet ports 3512, 3514, respectively, and define interior cylindrical walls that extend substantially normal to the exposed, exterior second surface 3622 of the bottom capillary laminate 3620. The third top laminate 3630 comprises a first surface 3631, and a substantially parallel, opposing second surface 3632. The first, second and third laminates 3610, 3620, 3630 can be bonded—with a high-temperature glue (e.g. epoxy or polyimide), via anodic bonding or via fusion bonding to form a unitary substrate 600 comprising the flow restrictors 3516. Although illustrated for a single set of flow restrictors 510 comprising two flow restrictors 3516, a skilled artisan would readily appreciate that an array of flow restrictor sets (or pluralities or groups, etc.), with each set comprising four or more flow restrictors could be integrally fabricated with a substrate substantially as described for the single flow restrictor case. In one embodiment for providing flow to and from the microdetector, the apertures 3512', 3514' of the bottom laminate 3620 are sized to correspond to the outside diameter of a pair of capillaries—specifically a first inlet capillary 3642 (e.g. in fluid communication with a reactant source) and a pair of second outlet capillaries 3644 (e.g., in fluid communication with two or more reactors). The inlet capillary 3642 and outlet capillaries 3644 can each be bonded (e.g. with a high-temperature glue such as an epoxy or polyimide, or anodically bonded or fusion bonded) to the corresponding apertures 3512', 3514' of the bottom laminate 3620, to create a macro-scale to micro-scale flow transition having substantially minimal, if any, dead volume. The bottom laminate 3620 serves to support, as well as align the external capillaries 3642, 3644 to the inlet and outlet ports 3612, 3614, respectively, of the flow-detector laminate 3610.

In embodiments in which the four or more flow restrictors of the array are mounted on a substrate, the flow restrictors are preferably integrally formed in one or more microchip bodies, and the one or more microchip bodies are mounted on the substrate. A microchip body can comprise a single flow restrictor or a single set of four or more flow restrictors. Advantageously, individually-packaged flow restrictors or sets of flow restrictors provides greater flexibility with respect to selecting appropriate flow restrictors. For example, the performance characteristics (e.g., conductance, leak testing) can be evaluated for each set of flow restrictors, and selection based on the results of the evaluation (e.g., including only flow restrictors that satisfy performance specifications). Alternatively, a series of sets of flow restrictors or a plurality of groups of flow restrictors can be integral with a common microchip body.

The microchip body can generally be any body in which a flow restrictor can be integrally formed, that is mountable on a substrate—either fixedly mounted or detachably mounted. Preferably, the microchip body has at least one mounting surface for mounting on a substrate, the mounting surface being adapted for reception with a corresponding mounting surface of the substrate. The microchip body is preferably a substantially planar body having at least two substantially parallel opposing surfaces. In some embodiments, the microchip body can be a plate-type substrate such as a wafer. The microchip body is preferably a micromachinable material (i.e., a material suitable for microfabrication techniques)—such as single crystal silicon. The microchip body material should generally be suitable for use under the conditions required in operation (e.g., with respect to temperature, etc.). Other suitable materials known in the art for integral microfabrication of flow restrictors (e.g. gallium arsenide, quartz, ceramic, glass) can also be employed. Some plastics can also be used for some applications. The microchip body can advantageously comprise a plurality of laminae into which various components of the flow restrictors can be fabricated before assembly of the laminae to form the unified microchip body. The particular size of the microchip body is not narrowly critical, and will depend on design considerations and applications. including for example, the number of flow restrictors integrally formed in the microchip body, required spacing between flow restrictors (where the microchip body comprises two or more flow restrictors), etc. Typically, a microchip body of a plate-type (e.g., wafer) configuration and comprising a series of sets of flow restrictors, where each set includes four or more flow restrictors integral therewith (e.g., such as shown in FIG. 4E), can range in size from about 100 cm$^2$ to about 10 μm$^2$, preferably from about 25 cm$^2$ to about 1 mm$^2$, and more preferably from about 10 cm$^2$ to about 1 cm$^2$ surface area, and from about 1 cm to about 100 μm (thickness), preferably from about 7 mm to about 200 μm, and from about 5 mm to about 500 μm, with a most preferred thickness of about 1 mm or about 2 mm. Typical and preferred sizes of a microchip body of a plate-type configuration that is mounted on the substrate as a module comprising two or more flow restrictors can be the above-recited sizes multiplied by the number of flow restrictors, with accounting for the required spacing between flow restrictors or sets thereof. Preferred spatial densities of flow restrictors on the microchip body is not critical, and can be consistent with the requirements of the reactors (or other applications) with which the fluid distribution system will be used (i.e., whether integral with a substrate or with a microchip body).

The microchip body can also include one or more other structural features in addition to the structural features of the flow restrictor. For example, a flow restrictor integral with microchip body can include (in addition to one or more inlet ports, one or more outlet ports, and one or more microchannels) one or more integral temperature-measuring devices (e.g. thermocouples), active temperature-control devices (e.g. fluid-type heat exhangers), passive temperature-control devices (e.g. thermal insulating regions—such as between microdetctors), microfabricated valves, microfabricated pumps, microfabricated flow sensors, microfabricated pressure sensors, etc.

In some applications, however, the preferred microchip bodies of the invention consist essentially of one or more flow restrictors or sets of flow restrictors—and have an essential substantial absence of other active microcomponents (but can include passive microcomponents such as flow channels, capillaries, thermal insulating regions, etc).

Such microchip bodies with integral flow restrictors advantageously allow for simplicity in design and fabrication, reduced manufacturing costs, greater modularity and associated operational flexibility. The substrate on which such microchip bodies can advantageously provide, in addition to a mechanical support for the microchip body, other integrated functionality such as flow distribution, temperature control, process monitoring, etc. Specifically preferred features are discussed in connection with the general substrate discription (above) and in connection with preferred embodiments with microchip bodies (below).

The microchip body can be mounted on the substrate—individually, or as one or more modules (with each module comprising two or more flow restrictors)—by any suitable method. In some embodiments, the microchip body can be fixedly mounted by bonding an exposed mounting surface of the microchip body to an exposed mounting surface of the substrate. The bonding can be chemical bonding using adhesives or glues, preferably high-temperature adhesives or glues such as epoxies or polyimides. Alternatively, the bonding can be anodic bonding, diffusion bonding, or other bonding methods known in the art or later developed. In other embodiments, the microchip body can be detachably mounted on the substrate. Preferably, in such embodiments, the microdetector array can further comprise one or more releasable films situated between the mounting surface of the substrate and the mounting surface of the microchip body. The releaseable film can advantageously be a releaseable seal, with dual functionality of providing releasability between the substrate and the microchip body, as well as providing a seal around component features providing fluid communication between the substrate and the microchip body (e.g., inlet and outlet flow paths in fluid communication therebetween). The releasable seal could include o-rings around flow conduits or one or more gaskets (substantially flat, typically flexible, sheets of sealing material). The releasable film can also provide other features, including for example, features affecting thermal conduction paths or electrical conduction paths, and as such, can be a releasable thermal insulator or a releasable electrical insulator.

Generally, the microchip body can comprise one or more sets of flow restrictors, preferably microfabricated flow restrictors, and one or more microchip bodies can be mounted on the same common substrate. Advantageously, an array comprising individually mounted microchip bodies affords significant flexibility with respect to operational flexibility for the application of interest. When the individually-mounted microchip bodies are detachably mounted (rather than fixedly mounted), the array offers the further advantage of flexibility with respect to replacement of single microchip bodies. The microchip body can, however, also be a module comprising two or more sets of flow restrictors, preferably microfabricated flow restrictors. In any case, the separate microchip bodies, each comprising any configuration of flow restrictors, as discussed above, can be formed separately, but are preferably formed collectively on a common wafer using batch microfabrication, and subsequently divided, as necessary, into separate microchip bodies as is common in the microfabrication art for circuit board components and other microfabricated devices. Hence, a skilled artisan would appreciate that the inventions described herein could be manufactured on a relatively large scale on a common wafer.

Figure 3G:
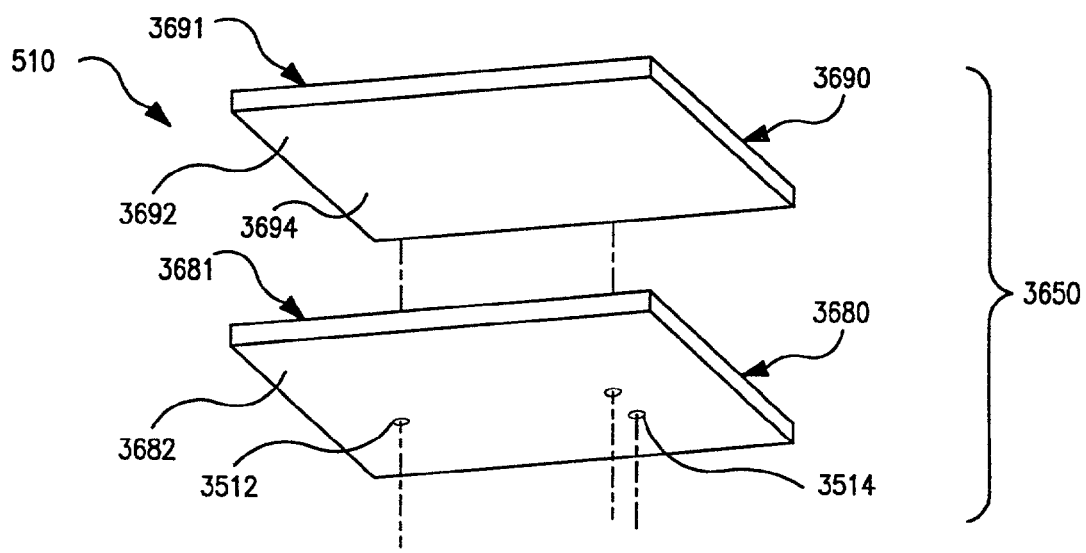
Figure 3H:
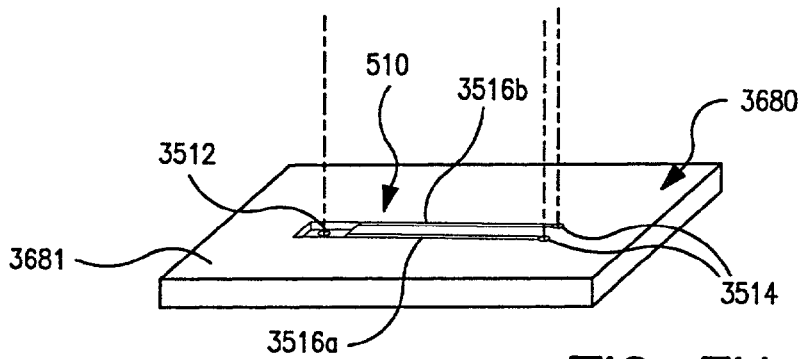

With reference to FIGS. 3G and 3H, for example (showing two flow restrictors, for simplicity of illustration), a set of flow restrictors 510 can be integrally microfabricated with a microchip body 3650 comprising a first bottom laminate 3680 (also referred to herein as a "flow-restrictor wafer") and a second top wafer 3690 (also referred to herein as a "capping wafer"). Although relative orientations are described as drawn (i.e., top, central and bottom), these orientations are intended for illustration purposes only, and should not be read as limiting on the scope of the invention. In fact, the orientation between top and bottom could be reversed, without change in the principle thereof. The first bottom laminate 3680 comprises a first surface 3681, a substantially parallel, opposing second surface 3682, and a pair of microchannels 3516a, 3516b. Inlet port 3512 and a pair of outlet ports 3514 are situated at opposing ends of the microchannels 3516, and extend from the microchannels 3516 through the flow-restrictor laminate 3680 to the second surface 3682 thereof. In preferred embodiments, and as shown, the inlet and outlet ports 3512, 3514 are defined by interior cylindrical walls that extend substantially normal to the second surface 3682 of the bottom laminate 3680. The second top laminate 3690 comprises a first surface 3691, and a substantially parallel, opposing second surface 3692. The first and second laminates 3680, 3690 can be bonded (as described above) to form to form a unitary microchip body 3650 comprising the set of flow restrictors 510.

Figure 3I:
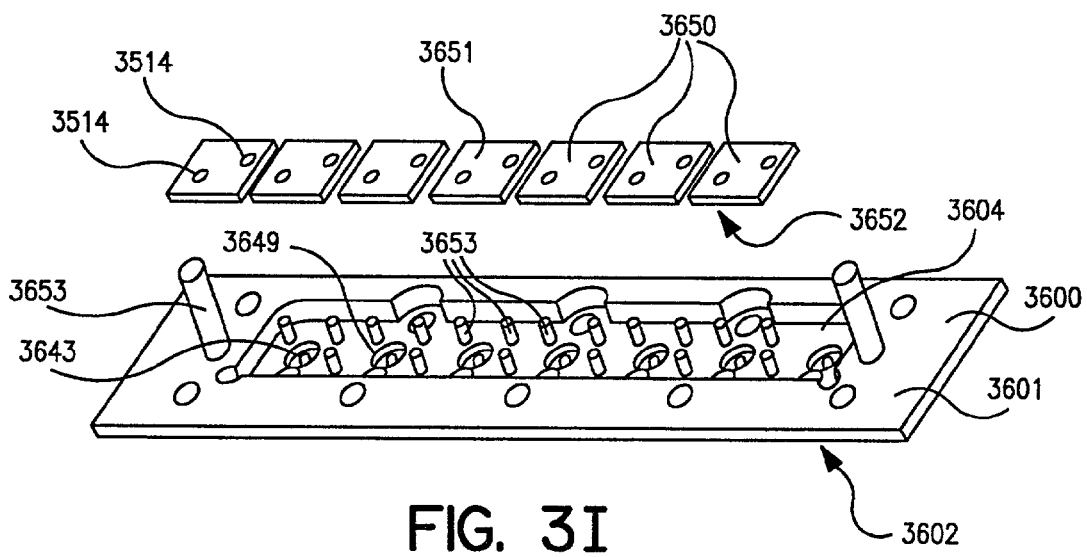

With further reference to FIG. 3I, a plurality of microchip bodies 3650 are individually, and detachably mounted on the substrate 3600, with each of the microchip bodies comprising one or more flow restrictors. Each of the microchip bodies 3650 are plate-type bodies having a substantially planar first surface 3651 and a substantially parallel, opposing substantially planar second surface 3652. A second mounting surface 3652 of each of the microchip bodies 3650 is in contact with a mounting surface formed as a recessed region 3604 in the exposed first surface 3601 of the substrate 3600. Alignment pins 3653 can help for positioning of the microchip bodies 3650 during mounting. When assembled, the microchip bodies 3650 are releasably held in the mounting position by islands (not shown) formed in the bottom surface of the cover block (not shown) that can be situated over the top surface 3601 of the substrate 3600. As shown, the microchip bodies 3650 comprise fluid connection ports (e.g. outlet ports 3514) at an exposed top surface 3651 of the microchip bodies 3650. Fluidic connections to fluidic cavities (e.g., reactors or mixing zones) can be advantageously effected with each of the microchip bodies 3650 in fluid communication through a fluid connection port (e.g., inlet port 3512, not shown) with first inlet passage 3643 in the substrate 3600. The substrate comprises pluralities of such passages 3643, one for each of the flow restrictors on the microchip bodies 3650. The flow passages 3643 in the substrate 3600 can be individually sealed in fluid communication with the ports of the microchip bodies using individual o-rings (not shows) as a releasable seal. The o-rings are seated in recessed o-ring seats 3649 that are formed in the mounting surface 3604 of the substrate 3600. One or more gaskets could be used alternatively, instead of the o-ring seals. In a preferred embodiment the passages 643 extends downward from the first mounting surface 3604 of the substrate 3600 to a second surface 3602 of the substrate. The second surface 3602 may be an irregular surface, with some portion interior to the bulk of the substrate 3600, to accommodate a fitting, such as a conventional fitting (e.g. Valveco fitting) that provides fluid communication between the inlet passage 3643 and a capillary (not shown, e.g., stainless steel capillaries, 1/16").

In either case, in which the flow restrictors are integral with a substrate or with a microchip body mounted on a substrate, the fabrication of the integral flow restrictors can be effected using typical microfluidic microfabrication techniques, preferably in silicon, including for example, techniques selected from the group of oxidation, making, etching, thin-film deposition, planarization and bonding.

Temperature Control

Process temperature (e.g., reaction temperature) can be controllably varied in combination with the aforementioned approaches for controlling reactor feed compositions, reactant flow rates and reactor pressure. With further reference to FIG. 7A, for example, the chemical processing system 10 can also include a temperature control system (not shown) adapted to provide a temperature gradient or other desired temperature variation across the array 100 of reactors 600. The temperature control can be for a group of reactors or for individual reactors, as desired, and can generally be as described below, and also as described in the Guan et al (U.S. Pat. No. 6,149,882) and Bergh et al. (U.S. Ser. No. 09/518,794, issued as U.S. Pat. No. 6,749,814) applications.

Figure 8A:
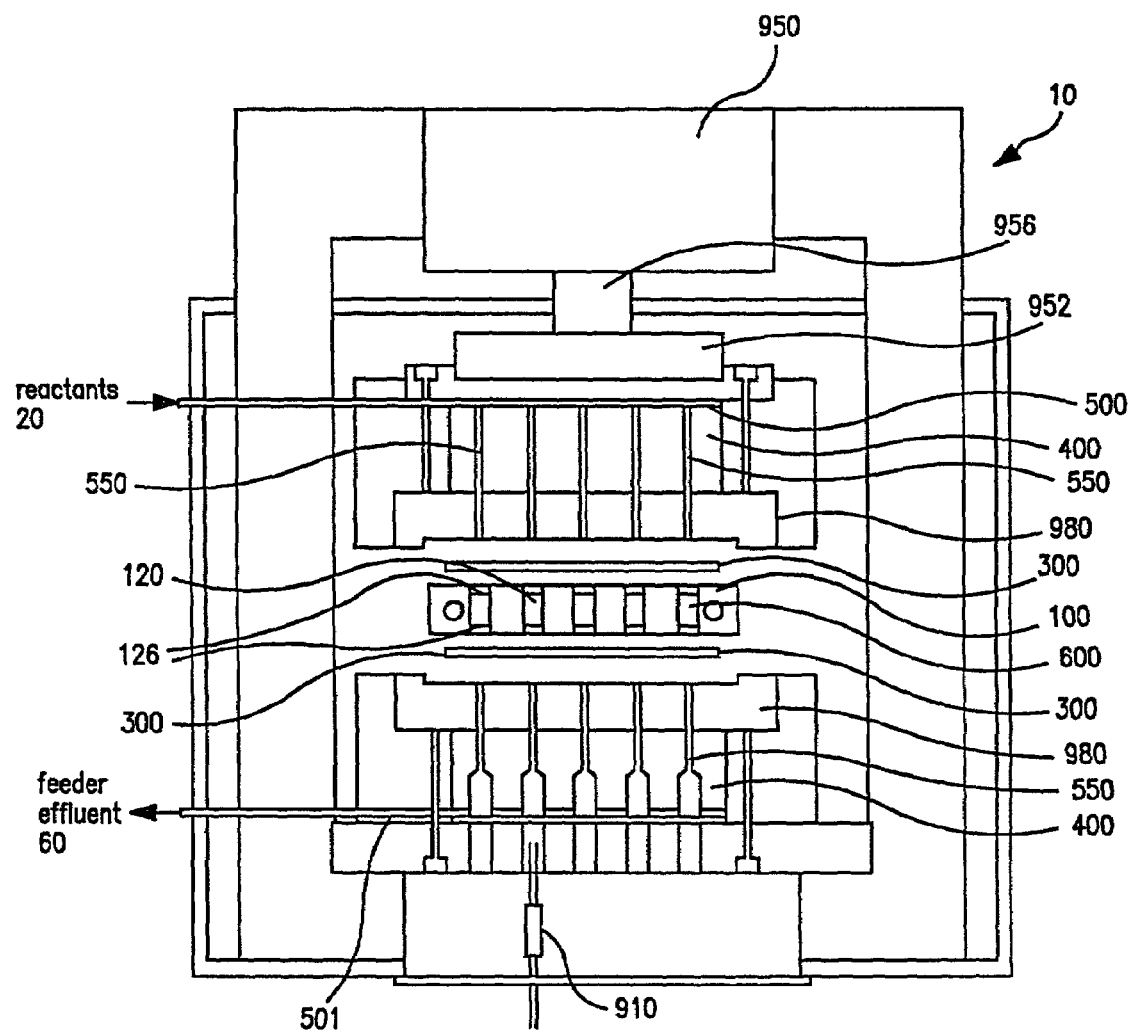
FIGS. 8A through 8E are schematic views illustrating various preferred configurations for a parallel flow reactor having four or more channels (FIGS. 8A, 8B, 8D), single-channel reactor detail (FIG. 8C) and a temperature-control strategy (FIG. 8E).
Figure 8B:
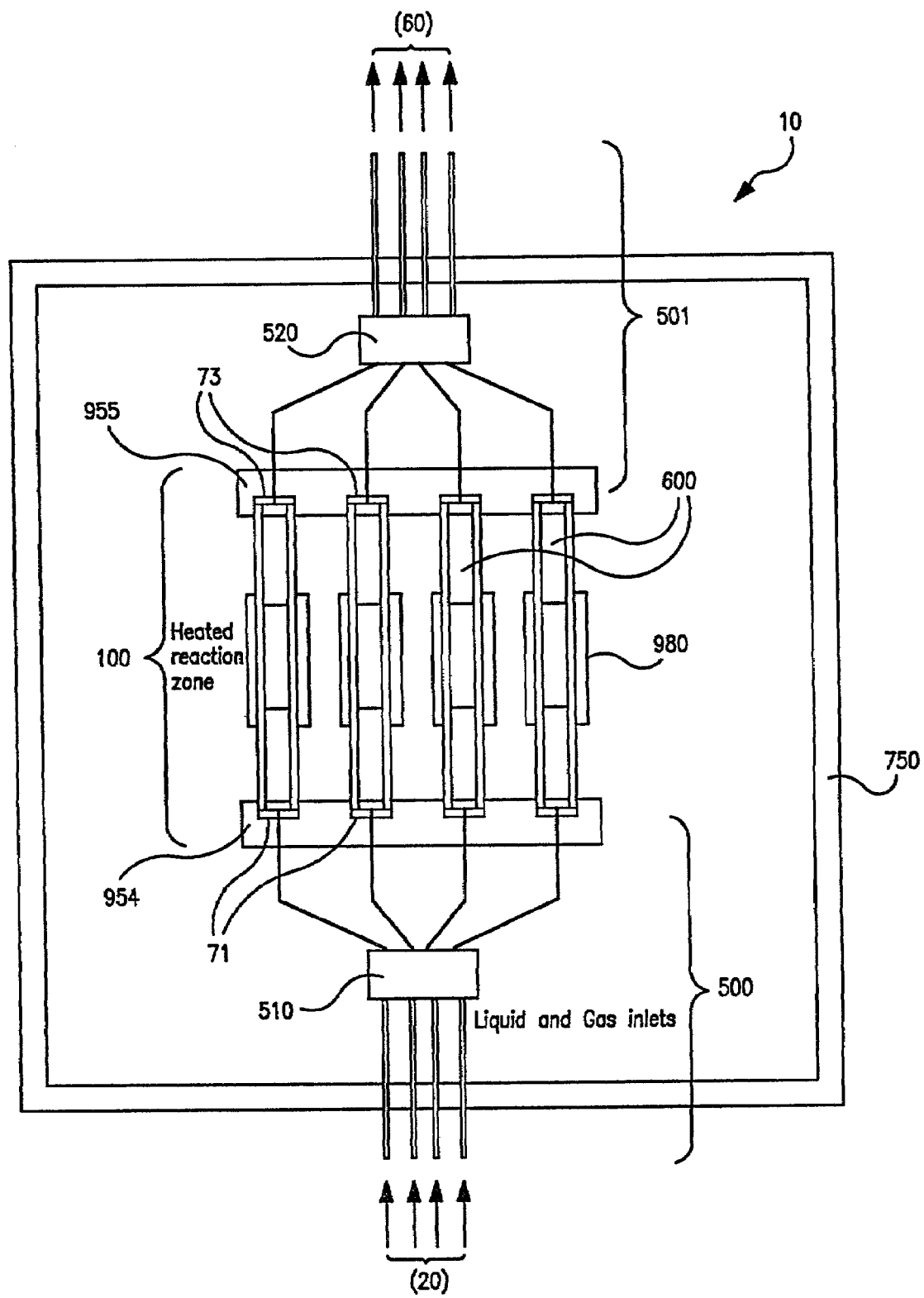

Particular approaches for varying temperatures across a library of candidate catalysts can vary depending on the particular type of reactor system employed. Exemplary approaches for varying temperature across a library of different candidate materials, are disclosed in connection with the aforementioned co-pending applications of Guan et al. (U.S. Pat. No. 6,149,882) and of Bergh et al. (U.S. Ser. No. 09/518,794, issued as U.S. Pat. No. 6,749,814). In one approach, a temperature gradient can be advantageously applied to one or more embodiments of reaction systems (or, other chemical processsing systems) where the number of reactors seeing different temperatures is substantially enhanced, by orientating an array of reactors in a slightly skewed manner relative to the orientation of the temperature-contours (lines of constant temperature). The embodiment shown and discussed in connection with FIG. 8E is exemplary.

Particularly preferred parallel flow reaction systems can include a reactor module that comprises four or more parallel flow reactors having separate and independent temperature control for each of the four or more reactors. Substantial thermal management challenges exist for such reactor modules in which the four or more flow reactors are close-packed—that is, in which the four or more reactors have a spatial density (taken along one or more cross-sections) of not less than about 1 reactor/100 $cm^2$, preferably not less than about 1 reactor/50 $cm^2$, more preferably not less than about 1 reactor/10 $cm^2$, and, in some applications, not less than about 1 reactor/$cm^2$, not less than about 2 reactors/$cm^2$, not less than about 1 reactor/$mm^2$. A preferred approach for establishing thermal independence between each of the four or more reactors, such that simultaneous independent temperature control can be effected for each of the four or more reactors without substantial thermal interference from adjacent reactors is disclosed in U.S. Ser. No. 60/274,065, entitled "Parallel Flow Reactor Having Improved Thermal Control" filed on Mar. 7, 2001) by Bergh et al., filed as non-provisional application U.S. Ser. No. 10/094,257 (pending and published as US 2002-0170976). Briefly, as described therein, independent temperature control for each of the four or more reactors is effected using separately-controlled heating elements (e.g. resistive heating elements such as coil heaters) around each of the four or more reactors, while thermal isolation between the four or more reactors is accomplished by fluid-based heat exchange with an external heat sink. In preferred embodiments, the heat flux being applied to each of the reactors has an axial profile (taken along the length of the flow reactor, with the direction of flow) that can be varied (fixedly varied, or controllably varied) to compensate for variations in the heat-flux profile associated with the circulating heat-exchange fluid cooling the reactors, and to compensate for the varied locations of the four or more reactors relative to other reactors and to the external environment (e.g. centered reactors versus reactors near an external edge of the reactor module). Hence, design and/or control of the heating elements for each of the reactors can effect a substantially axially-uniform temperature profile for each of the four or more independently. Although especially useful in connection with parallel flow reactors, the temperature-control system disclosed in the aforementioned patent application can have applications for control of other types of reaction systems (e.g., batch reactors, semi-continuous reactors) and/ or in non-reaction chemical processing systems (e.g. calcining of heterogeneous catalysts) where parallel, independent temperature control is desirable.

Integrated Chemical Reaction System

Figure 7B:
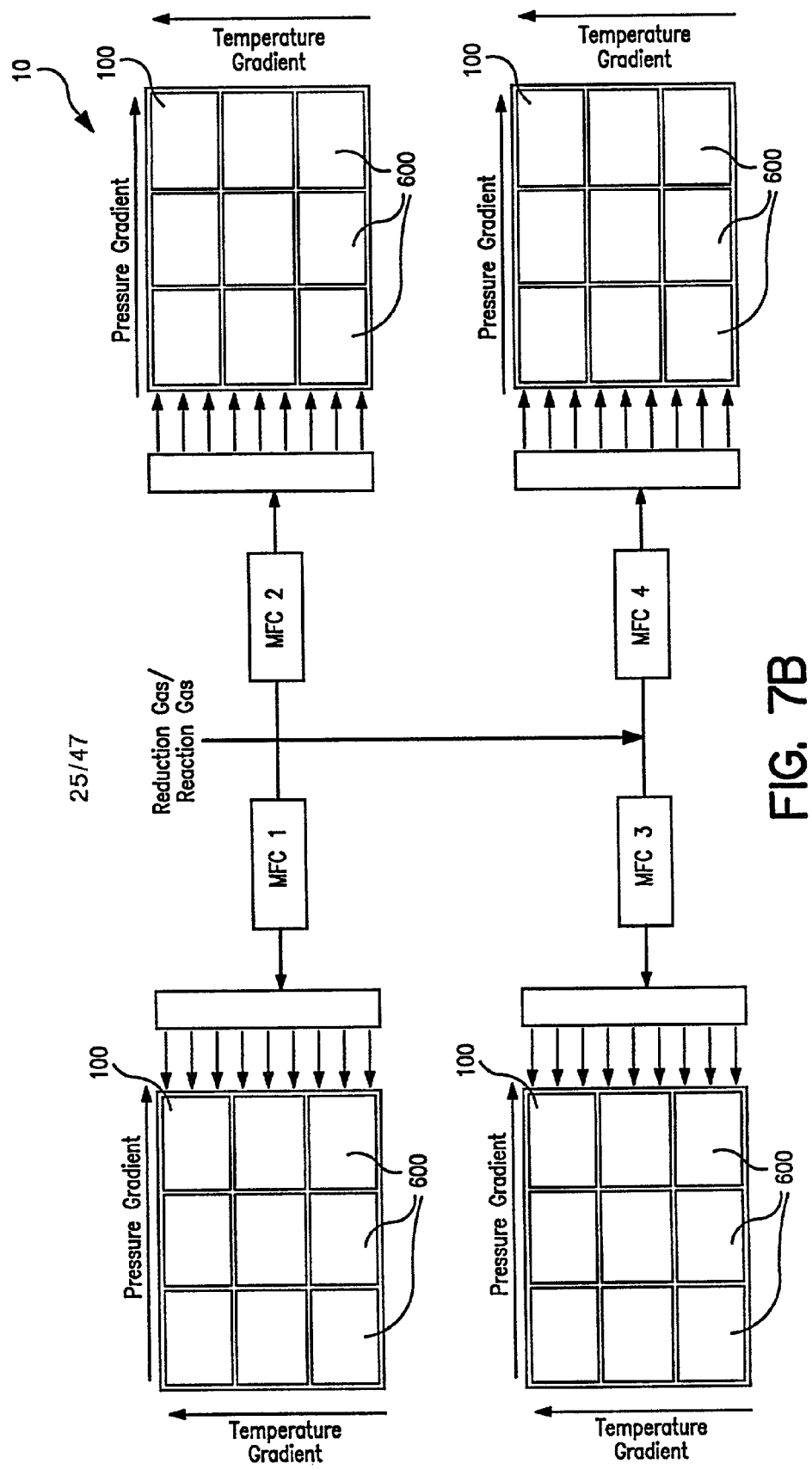

With reference to FIG. 7B, a plurality of arrays 100 of reactors 600 (e.g., as shown in FIG. 7A) can be combined into a single, integrated chemical processing system 10 to provide for robust control of various reactor conditions of interest. For clarity, the outlet distribution subsystem 501, detection system 1000 and effluent sinks of the embodiment shown in FIG. 7A are not shown in FIG. 7B.

Figure 7C:
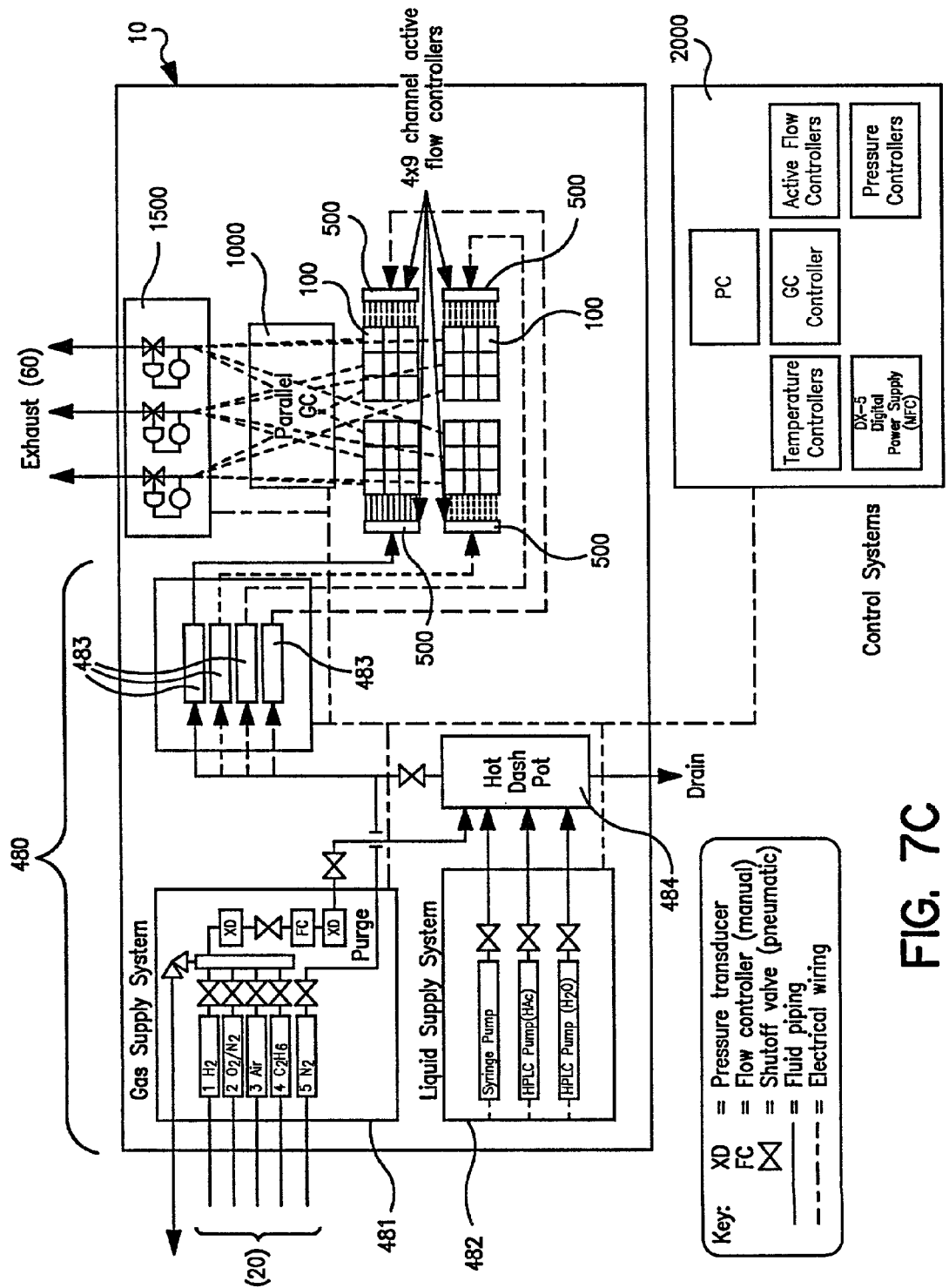

A particularly preferred embodiment of such an integrated chemical processing system 10 is shown, in greater detail, in FIG. 7C. With reference thereto, the chemical processing system 10 comprises four 9-channel (3×3) arrays 100 of reactors 600, together with four inlet distribution subsystems 500. Reactant feed streams are provided to each of the four inlet distribution subsystems 500 from a corresponding set of four dedicated active flow control elements 483 (e.g., MFC's). As shown, the external fluid distribution system 480 comprises gas and liquid reagent (or treatment agent) supply systems 481, 482, hot dash pot 484 and appropriate vents, drains, and connecting piping or conduits suitable for fluid communication between indicated components. The external fluid distribution system 480—and additionally or alternatively—the internal inlet distribution subsystem 500 can further comprise a feed-composition control system (not shown in FIG. 7C), including for example feed-composition control systems as described above in connection with FIGS. 4A through 4E, and especially FIG. 4E.

Preferred reactors 600 and reactor configurations are described below.

Each of the chemical reaction systems and/or chemical processing system can further comprise a detection system 1000 (e.g., parallel gas chromatograph). A number of detection schemes suitable for high-throughput, multi-channel reaction systems are known in the art and can be employed in connection with the present invention. Exemplary general detection approaches include, without limitation, parallel, quasi-parallel (hybrid parallel-serial) or rapid serial approaches involving, for example, gas chromatography (GC), mass spectrometry (MS), infrared spectroscopy (e.g., fourier-transformed infrared (FTIR) spectroscopy), liquid chromatography (LC), thin-layer chromatography (TLC), selective adsorption of reaction products and/or unreacted reactants, etc. Parallel approaches such as parallel gas chromatography (GC), parallel-fast GC, parallel time-of-flight mass spectrometry (TOF-MS) are particularly preferred. Without limitation, preferred detection apparatus and methods are disclosed in the aforementioned U.S. patent applications of Guan et al. (U.S. Pat. No. 6,149,882), Bergh et al. (U.S. Ser. No. 09/518,794, issued as U.S. Pat. No. 6,749, 814), as well as in U.S. Pat. No. 5,959,297 to Weinberg et al. entitled "Mass Spectrometers and Methods for Rapid Screening of Libraries of Different Materials". The detection system can include distribution valves and/or selection valves (not shown in FIG. 7C) as described in the Guan et al. and the Bergh et al. applications, for multiplexed selective sampling. An array of addressable microvalves, discussed below in connection with FIGS. 9A and 9B, can also be advantageously employed in connection with the detection system 1000.

A detection system especially preferred for use in connection with the reaction system of the present invention can comprise a multi-channel gas chromatograph as disclosed in co-owned, co-pending U.S. Ser. No. 60/222,540, entitled "Parallel Gas Chromatograph with Microdetector Array" filed Aug. 2, 2000 by Srinivasan et al., as well as in U.S. Ser. No. 09/801,430, entitled "Parallel Gas Chromatograph with Microdetector Array" filed on the date even herewith (Mar. 7, 2001) by Srinivasan et al. (issued as U.S. Pat. No. 6,701,774). Reactor effluents discharged from each of the four or more reactors can be simultaneously injected into such a multi-channel (i.e. parallel) gas chromatograph using a parallel injection valve, such as is disclosed in U.S. Ser. No. 60/274,022, entitled "Gas Chromatograph Injection Valve Having Microvalve Array" filed on Mar. 7, 2001) by Bergh et al., filed as non-provisional applications U.S. Ser. No. 10/092,364 (pending and published as US 2002-0127146) and U.S. Ser. No. 10/092,035 (issued as U.S. Pat. No. 6,742,544).

As shown in FIG. 7C, the chemical processing system 10 further comprises a pressure-control manifold 1500 for variably controlling pressure in the reactors 600, comprising a plurality of pressure-control valves, each of which is in fluid communication with one or more of the reactors 600 and/or the effluent of the detection system 1000. The chemical processing system 10 can be controlled with a control system 2000 comprising one or more microprocessors, flow controllers, temperature controllers, pressure controllers, detection system controllers, power supply controllers, etc.

The aforedescribed particularly preferred embodiment can be realized in a number of reaction system configurations. Exemplary reaction system configurations suitable for such an embodiment (as well as for other embodiments), are shown in FIGS. 8A and 8B, and described below in connection therewith.

Reactors

In each of the aforementioned chemical reaction systems, the four or more reactors can be of any suitable design, including for example designs modeling or substantially modeling continuous-stirred-tank reactors (CSTR's), fixed bed reactors, fluidized bed reactors, plug-flow reactors, channel-type reactors, etc. Designs modeling or substantially modeling fixed bed, plug-flow and CSTR-type reactors are preferred. The aforementioned co-pending patent applications of Guan et al. (filed Jun. 9, 1998) and of Bergh et al. (U.S. Ser. No. 09/518,794, issued as U.S. Pat. No. 6,749, 814) include preferred reactor and reactor configuration designs. The reactor types in a particular chemical reaction system can be identical to each other, substantially the same as each other, or varied (e.g., for optimization of reactor-type) in a particular chemical reaction system.

Each of the aforementioned chemical reaction systems (or processing/treatment systems) is preferably a microsystem, in which the volume of the reaction cavity is not more than about 1 ml. In some embodiments, the reaction cavities can have a volume of not more than about 100 µl, not more than about 10 µl, or not more than about 1 µl. The smaller volume reaction systems are particularly advantageous, for example, with respect to heat transfer characteristics, as well as handling and interchanging of modular components (e.g., arrays of diverse materials, flow-restrictor modules, reactor modules, etc.).

The plurality of reactors are two or more reactors, preferably four or more reactors, and more preferably nine or more reactors. Higher numbers of reactors, including sixteen, twenty-four, forty-eight or ninety-six or more reactors are contemplated. When an array of microreactors is used in connection with the invention, the number of reactors can be hundreds or thousands. Additional general features of the reactors together with preferred number of reactors, reactor types, types of candidate materials optionally included within the reactors (especially catalyst candidate materials), variations in composition of the candidate materials (especially variations in catalysts and/or catalyst precursors) loading/unloading of candidate materials into/from the reactors, configurations of arrays of reactors, planar densities of reactors, specific reactor designs, and reactor fabrication approaches are as described in the aforementioned co-pending U.S. patent applications of Guan et al. (U.S. Pat. No. 6,149,882) and Bergh et al. (U.S. Ser. No. 09/518,794, issued as U.S. Pat. No. 6,749,814), collectively referred to hereinafter as the "Guan et al. and Bergh et al. applications." Such additional general features are hereby specifically incorporated by reference.

Referring to FIG. 8A, an integrated chemical reaction system 10 comprising a flow-through reactor design (e.g, analogous to a plug-flow reactor) can comprise a plurality of microreactors 600 formed in one or more laminae 100. The material-containing laminate 100 comprises a candidate material 920 such as bulk catalyst (e.g., as is beads, pellets or particulates, etc.) or supported catalysts contained within the microreactors by a porous barrier 126 (e.g., frits, porous plug, etc., as described above). As shown, the plurality of microreactors 600 are sealed and heated by adjacent temperature control blocks—shown as adjacent heaters 980—with releasable seals 300 (e.g., gaskets, such as metal gaskets with optional knife-edge seal) situated between the heaters 980 and the microreactor laminae 100. Reactants 20 are provided to the microreactors 600 through an inlet distribution manifold 500 in fluid communication with the microreactors 600 via connecting channels 550. The distribution manifold can comprise a first set of inlet flow restrictors (not shown in FIG. 8A), and optionally, a feed-composition varying subsystems (not shown in FIG. 8A), as described above. The distribution manifold 500 is thermally isolated from the microreactors 600 by temperature control block 400. After contacting the candidate materials (e.g., catalysts) 920 under reaction conditions, reactor effluent 60 is passed through connection channels 550 to a discharge manifold 501, and further to an external distribution (waste) system. The discharge manifold 501 can comprise a second set of outlet flow restrictors (not shown in FIG. 8A). The discharge manifold 501 is likewise thermally insulated from the microreactors 600 by another temperature control block 400. Evaluation of the candidate materials can be determined by analysis of reaction products, for example, by sampling of the reactor effluent stream using one or more sampling probes 910 (e.g., sampling needles) that are in selective fluid communication with one or more of the microreactors 600, and in further fluid communication with a detection system (e.g., gas chromatograph, mass spectrometer, FTIR, etc.). A septum or other suitable accessible barrier 911 may be employed in connection with the sampling system. Reference is made to the earlier filed applications of Guan et al. (U.S. Pat. No. 6,149,882) and especially Bergh et al. (U.S. Ser. No. 09/518,794, issued as U.S. Pat. No. 6,749,814) in connection with the embodiment shown in FIG. 8A. A similar reaction system 10 is shown in FIG. 8D, except that the outlet stream includes a "U-turn" to direct the effluent stream 60 to a discharge manifold 501 located in the vicinity of the inlet distribution mannifold 500. This design has some advantages with respect to flow control interfacing (localized area) and with respect to temperature control (single "cold zone").

Referring to FIG. 8B, another integrated chemical reaction system 10 can comprise a tube-type flow-through reactor design (e.g, analogous to a plug-flow reactor)—generally on a somewhat larger scale than the microreactor embodiment shown in FIG. 8A. The reaction system 10 comprises a plurality of microreactors 600.

Figure 8C:
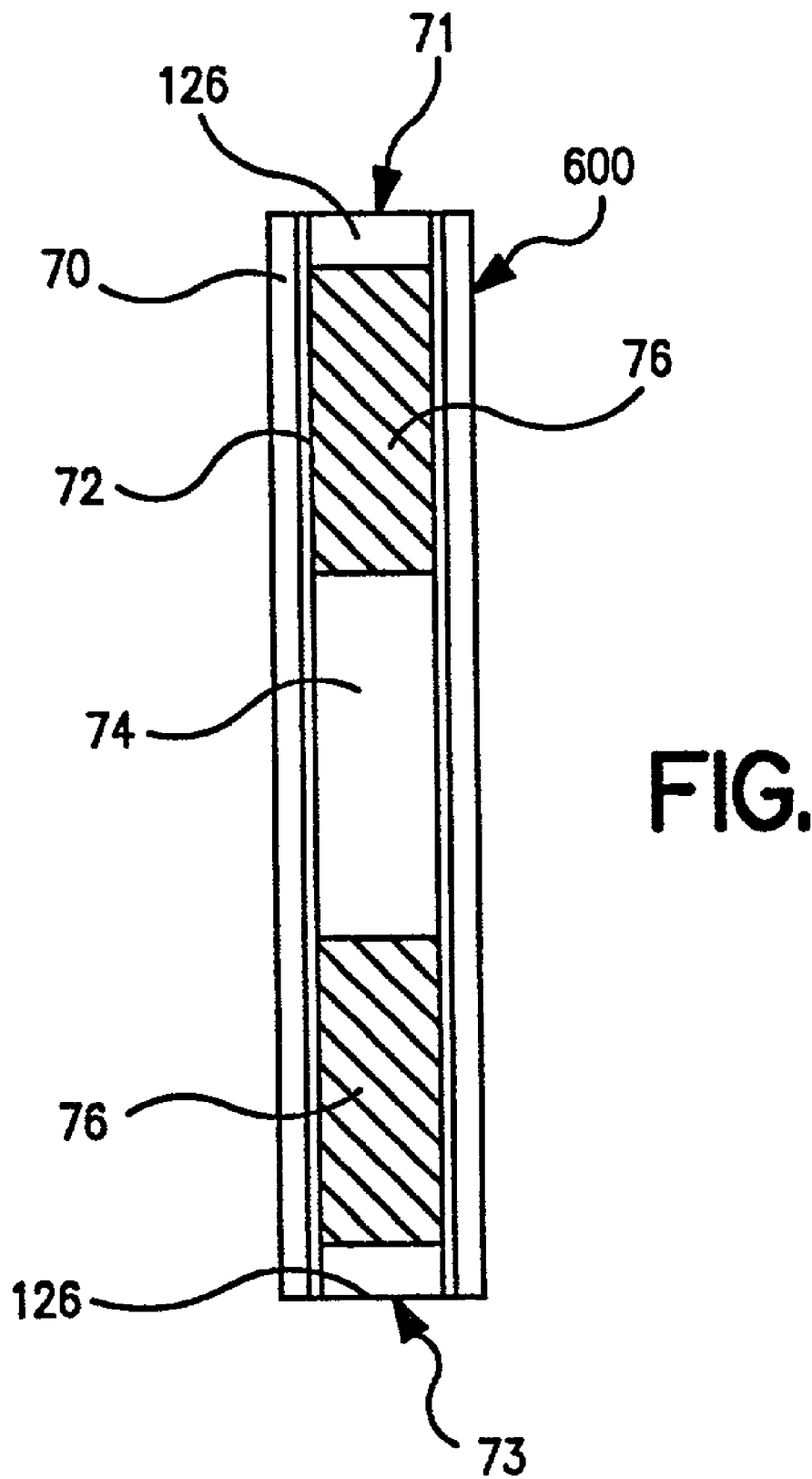
Figure 8D:
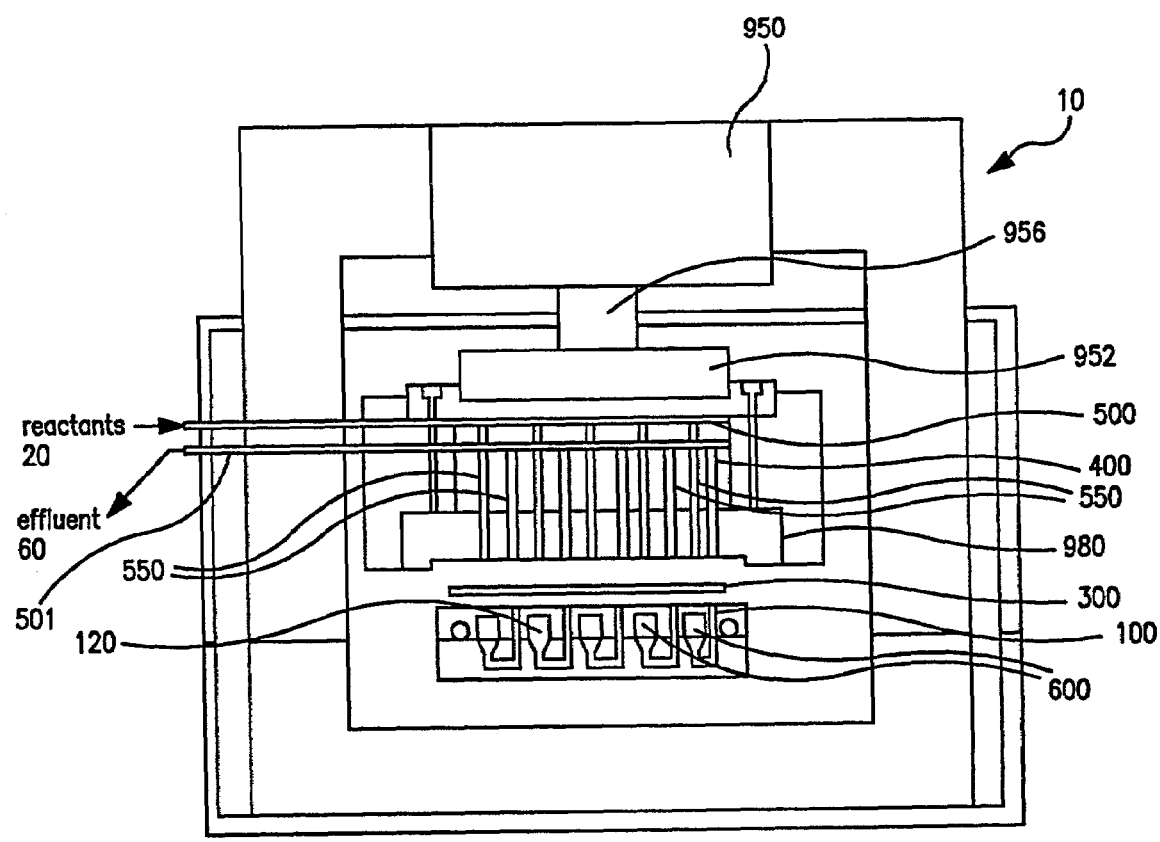
Figure 8E:
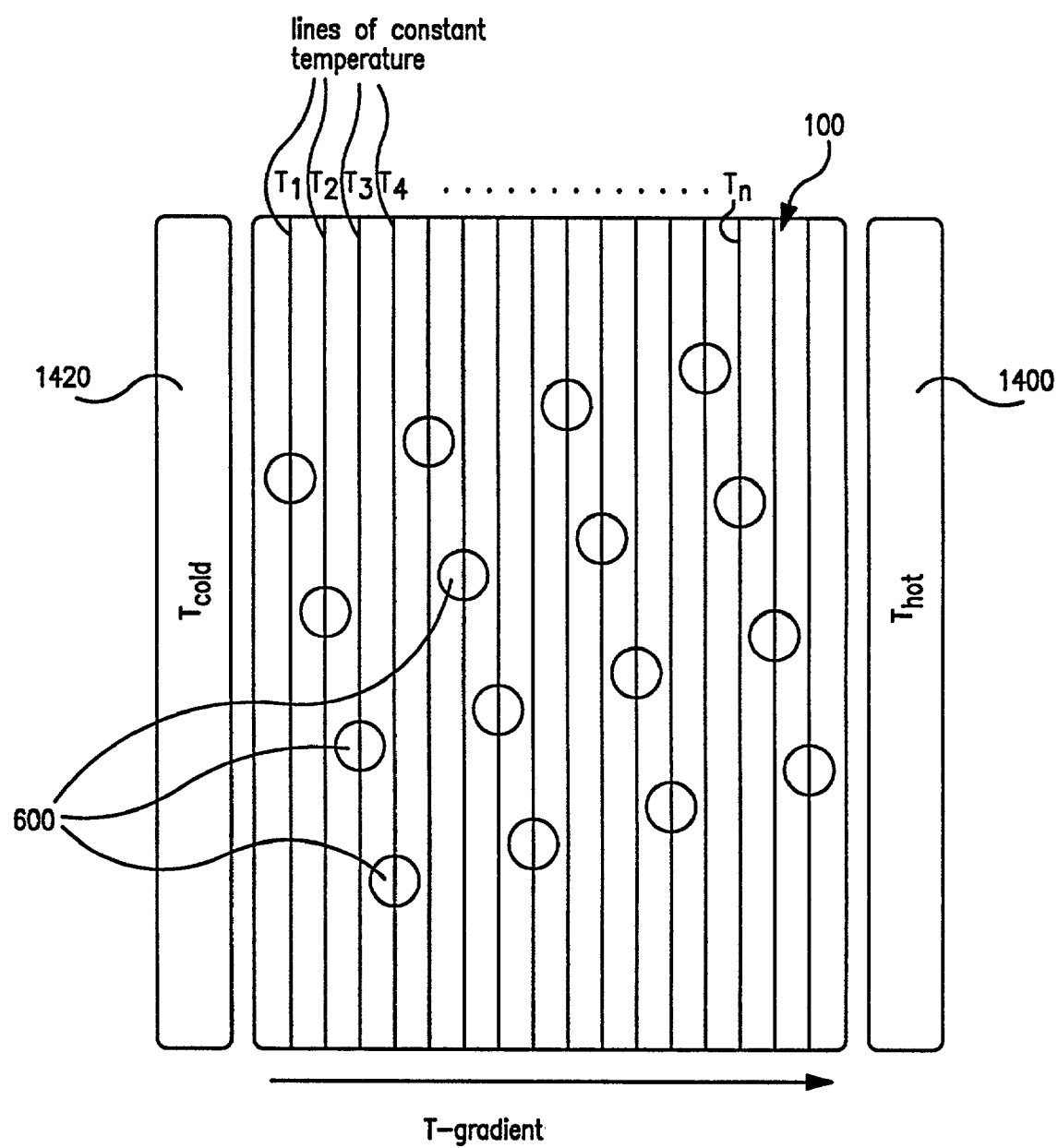

Each of the reactors 600 can comprise, with reference to FIG. 8C, an elongated reaction vessel 70 such as a tube or channel. The elongated reaction vessel 70 can be independent of other structure or can be integrated with and formed at, on or in a substrate (e.g., a plurality of laminae). The elongated reaction vessel 70 is preferably a stainless steel, ceramic, or quartz tube, and without limitation, preferably has a diameter ranging from about 1 mm to about 20 mm, more preferably from about 2 mm to about 10 mm, and most preferably from about 4 mm to about 8 mm. The elongated reaction vessel 70 can be lined with a liner 72 that is inert with respect to the reaction and reaction conditions being evaluated. The liner 72 can be, for example, a glass liner. A candidate material (e.g., catalyst or catalyst precursor material) 74 can be provided to and situated in the elongated reaction vessel 70 in any suitable form—for catalysts as bulk catalyst or as supported catalysts—and in either case in various forms known in the art (e.g., pellets, beads, particulates, microspheres, substantially uniform microspheres, etc). Particle diameters are not narrowly critical, but can typically range from about 1 µm to about 1 mm, more typically from about 10 µm to about 500 µm, and even more typically from about 50 µm to about 250 µm. The candidate material 74 is preferably held in position between porous end caps 126 (e.g., frits, screens, etc.) situated on each of the reactor inlet port 71 and reactor outlet port 73. Optionally, an inert filler 76, and preferably an inert filler 76 having thermal insulating properties can also be provided and situated between the porous end caps 126 and the candidate material 74. The reactors 600 can be fabricated using manual, semi-automated or automated instruments (e.g., robotic handling instruments) to provide the candidate materials 74 and/or other components of the reactor 600. The reactors 600 shown in FIGS. 8B and 8C can have a low thermal mass, and can thereby provide for relatively fast thermal cycling for processing/treatment of the candidate materials (e.g.,for calcining of catalysts or catalyst precursors) and for establishing and/or varying reaction conditions in the reactors 600.

Referring again to FIG. 8B, the material-containing reactors 600 are formed as an array 100 of reactors 600, with each reactor 600 supported near the reactor inlet port 71 and the reactor outlet port 73 by a first and second support plates 954, 955. As shown, the plurality of reactors 600 are heated by temperature control blocks—shown as heaters 980—adjacent to the material-containing portion of the reactors 600 and in thermal communication therewith. As such, the center, material-containing region of the reaction system 10 can be a relatively "hot zone" region, while the inlet and outlet-containing regions can be relatively "cold zone" regions. The temperature can be varied between reaction vessels 600, and temperature variations (e.g., gradients) can also, as desired, be established with multiple temperature zones along a single reactor 600 and/or along the material-containing portion of a single reactor 600. Seals, and preferably releasable seals between the fluid distribution system and the reactors 600 can be provided and integrated into the support plates 954, 955. Advantageously, such a design allows for the fluid-distribution seals to be located in the cold zones—and outside of the hot-zone, thereby providing for greater flexibility with respect to sealing materials, etc. Exemplary sealing materials include graphite, fluoropolymer, metal seals, or other seal materials disclosed in the pending Guan et al. or Bergh et al. applications. Reactants 20 can be provided to the reactors 600 through an inlet distribution subsystem 500 in fluid communication with the microreactors 600. The inlet distribution subsystem 500 can comprise a first set 510 of inlet flow restrictors, and optionally, a feed-composition varying subsystems (not shown in FIG. 8B), as described above. After contacting the candidate materials (e.g., catalysts) 74 under the variably controlled reaction conditions, reactor effluents 60 are passed through an outlet (discharge) distribution subsystem 501, and further to an external distribution (waste) system. The outlet distribution subsystem 501 can comprise a second set 520 of outlet flow restrictors. The sets of inlet and outlet flow restrictors 510, 520 can, as shown in the embodiment of FIG. 8B, be modular subunits such as modular fluidic chips dedicated to a group of four or more reactors 600, and as such, can be readily interchangeable to vary flow rates (and correspondingly, contact times) and/or pressure between various subgroups thereof and/or between various experimental runs. The inlet and outlet distribution subsystems 500, 501 can be thermally isolated from the microreactors 600 (e.g., by air or other insulating gas, by temperature control block, etc.) Evaluation of the candidate materials can be determined by analysis of reaction products, for example, by sampling of the reactor effluent streams as described above and/or in connection with the Guan et al. and Bergh et al. applications. The chemical reaction system can optionally be contained within an oven 750 (and in operation, a heated oven)—particularly when liquid reagents are employed—to provide for additional thermal energy to keep the feed stream and effluent streams in the vapor phase.

With reference to FIG. 8E, a temperature gradient can be provided across an array 100 of reactors 600 by providing a heat source 1400 at $T_{hot}$ and a heat sink 1420. Lines of constant temperature, "temperature contours" are formed having varying temperatures T1, T2, T3, T4, . . . Tn as shown. The difference in temperatures between the temperature contours can be substantially the same (as shown) or can vary. The array 100 of reactors 600 can be arranged and/or situated such that each of the four or more reactors 600 is at a different temperature (with the array skewed relative to the heat source/heat sink—or vice-versa). Alternatively, the array 100 can be arranged and/or situated such that a group of reactors 600 is at substantially the same temperature (not shown). Other variations, including radial temperature variations, with concentric temperature contours, can also be effected.

Figure 9A:
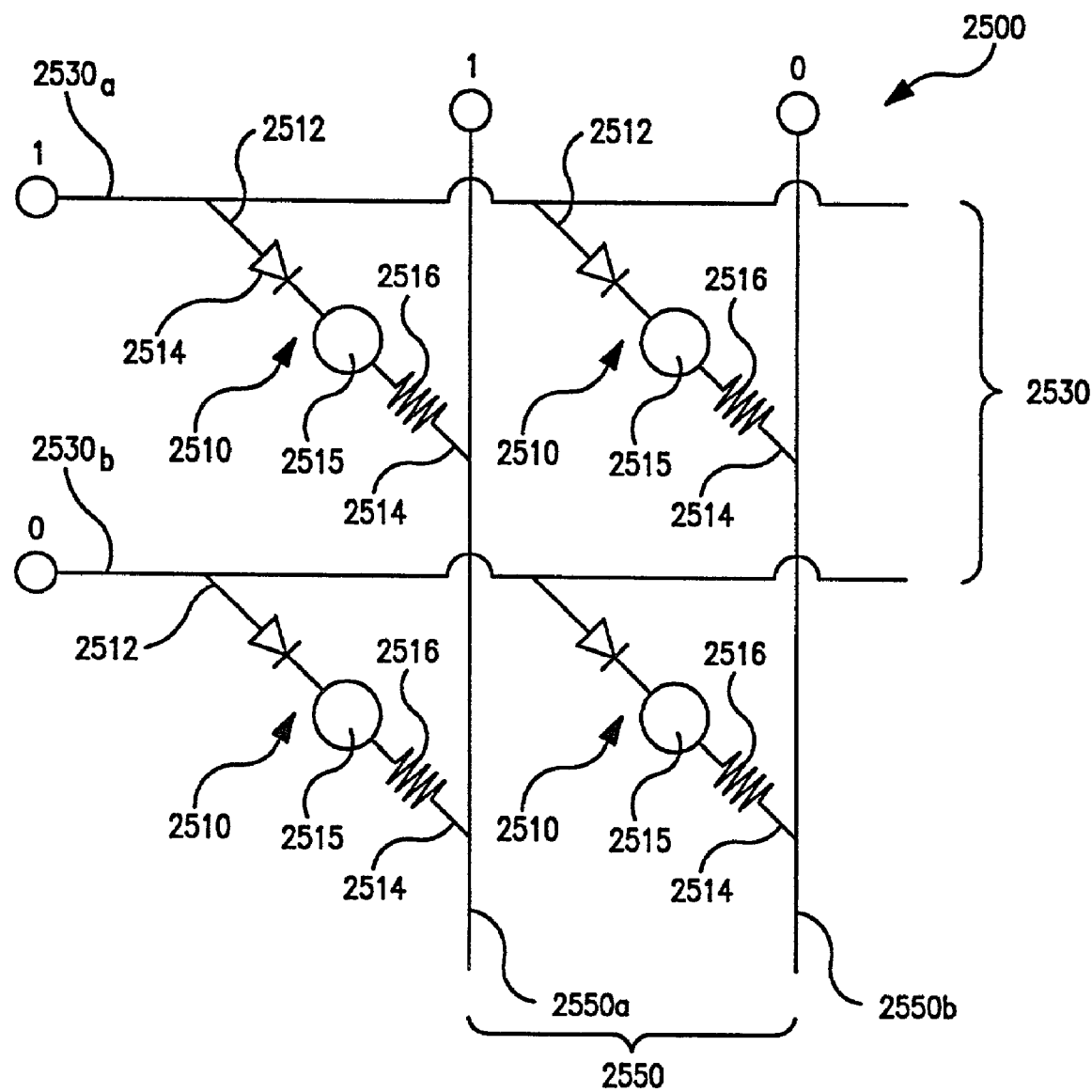
FIGS. 9A and 9B are schematic views showing an array of microvalves and actuation system (FIG. 9A) and associated valve logic (FIG. 9B).
Figure 9B:
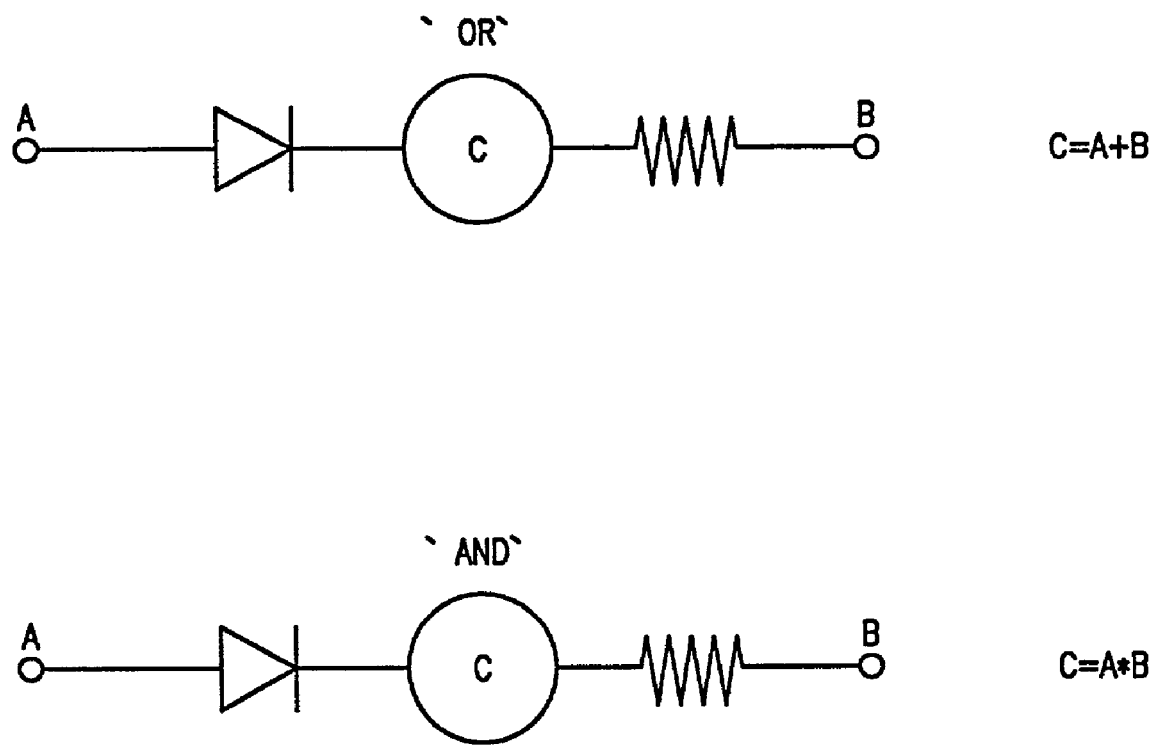

An array of valves, preferably an array of microvalves can be employed in connection with the chemical processing systems of the invention (e.g., a chemical reaction system 10 such as that shown and discussed in connection with FIG. 8A), as well as with other chemical processing systems, such as those disclosed and discussed in the earlier-filed Bergh et al. application (U.S. Ser. No. 09/518,794, issued as U.S. Pat. No. 6,749,814). With reference to FIG. 9A, for example, a pneumatically active microvalve array 2500 can comprise a plurality, and preferably four or more microvalves (2510—not shown schematically) in operational communication with four or more microvalve actuators 2515 arranged and/or formed at, on or in a common substrate. The microvalve actuators can actuate the microvalves. In some embodiments, the common substrate can comprise a plurality of laminae, and the four or more microvalves and four or more microvalve actuators 2515 can be formed in the plurality of laminae. Each of the four or more microvalve actuators 2515 can be in selective fluid communication between a first pneumatic valve actuating line 2530a, 2530b of a first set 2530 of actuating lines, and a second pneumatic valve actuating line sample line 2550a, 2550b of a second set 2550 of actuating lines. Collectively, the four or more microvalve actuators are in selective fluid communication between the sets of first and second valve actuating lines 2530 and lines 2550. As shown, each of the four or more actuating flowpaths comprises an actuator inlet 2512 in fluid communication with at least one of the first actuating lines 2530a, 2530b, and an actuator outlet 2514 in fluid communication with at least one of the second actuating lines 2550a, 2550b, and in selective fluid communication with the actuator inlet 2512. A valve control logic 2514 can provide for selective, controlled actuation of the microvalve actuator 2515 for operation of valve 2510. One or more flow restrictors 2516 can be provided in the actuator flowpath (i.e., between the actuator inlet 2512 and actuator outlet 2514), including for example as shown, between the microvalve actuator 2515 and the actuator outlet 2414. With reference to FIG. 9B, the valve control logic 2514 can vary depending on the particular application, but can typically be an "AND" or an "OR" logic, such that valve control for four or more valves can be controlled using microprocessor based technology with appropriate software. Although shown only with four or more microvalve actuators in the array, the number of microvalve actuators and microvalves can be substantially larger, including numbers that are the same as the number of reactors as described, for example, in the Guan et al. (U.S. Pat. No. 6,149,882) and/or the Bergh et al. (U.S. Ser. No. 09/518,794, issued as U.S. Pat. No. 6,749, 814) applications. As applied to chemical processing systems having arrays of larger numbers of components (e.g., reactors; microvalve actuators)—such as 100 or more components, the number of actuation circuits can be increased by log N (where N is the number of components) rather than being increased by N—which is the case with a heirarchy of individually-dedicated actuators. The array of microvalve actuators and microvalves can be fabricated by methods known in the art. See, for example: Rich et al., "*An 8-Bit Microflow Controller Using Pneumatically-Actuated Valves*", pp. 130–134, IEEE (1999); Wang et al., "*A Parylene Micro Check Valve*", pp. 177–182, IEEE (1999); Xdeblick et al., "*Thermpneumatically Actuated Microvalves and Integrated Electro-Fluidic Circuits*", 251–255, TRF, Solid State Sensor and Actuator Workshop, Hilton Head, S.C., Jun. 13–16 (1994); and Grosjean et al., "*A Practical Thermpneumatic Valve*", 147–152, IEEE (1999). In operation, the array of microvalves and microvalve actuators can provide for selective sampling and multiplexing of a plurality and preferably four or more reactor effluent streams, and can be interfaced, for example, with detection instruments such as parallel GC and/or parallel MS, among others. Individual reactor effluent streams, or groups or subgroups of reactor effluent streams can be selectively sampled. The array of microvalves 2500 can be integrated with flow distribution systems, such as those disclosed herein, as well as with those disclosed in the Guan et al. and the Bergh et. al., and can be used with numerous other applications.

In operation, the chemical processing systems of the invention, can operate over various ranges of temperature, pressure, contact times and space velocities. For a chemical reaction system: the reactor temperature can generally range from about 0° C. to about 1000° C., and preferably from about 20° C. to about 500° C., and more preferably from about 100° C. to about 500° C.; the reactor pressure can range from about 1 bar to about 200 bar, and preferably from about 1 bar to about 10 bar; contact times can range from about 1 μsec to about 100 sec, preferably from about 1 μsec to about 10 seconds, and most preferably from about 0.2 seconds to about 5 seconds; and space velocities can range from about 0.01 mL/ml hr to about 50 mL/ml hr, and preferably from about 0.1 mL/ml hr to about 3 mL/ml hr. For explosive reactants (e.g., hydrocarbons and oxygen), explosion limits should be observed.

The chemical processing systems of the invention, and particularly the chemical reaction systems of the invention are, as noted, advantageously applied as mutiple-variable optimization (MVO) reactors. When employed in connection with a materials-science research program, MVO reactors can provide for high-throughput analysis and optimization of "lead" candidate materials developed with primary and/or secondary screening approaches.

Figure 10A:
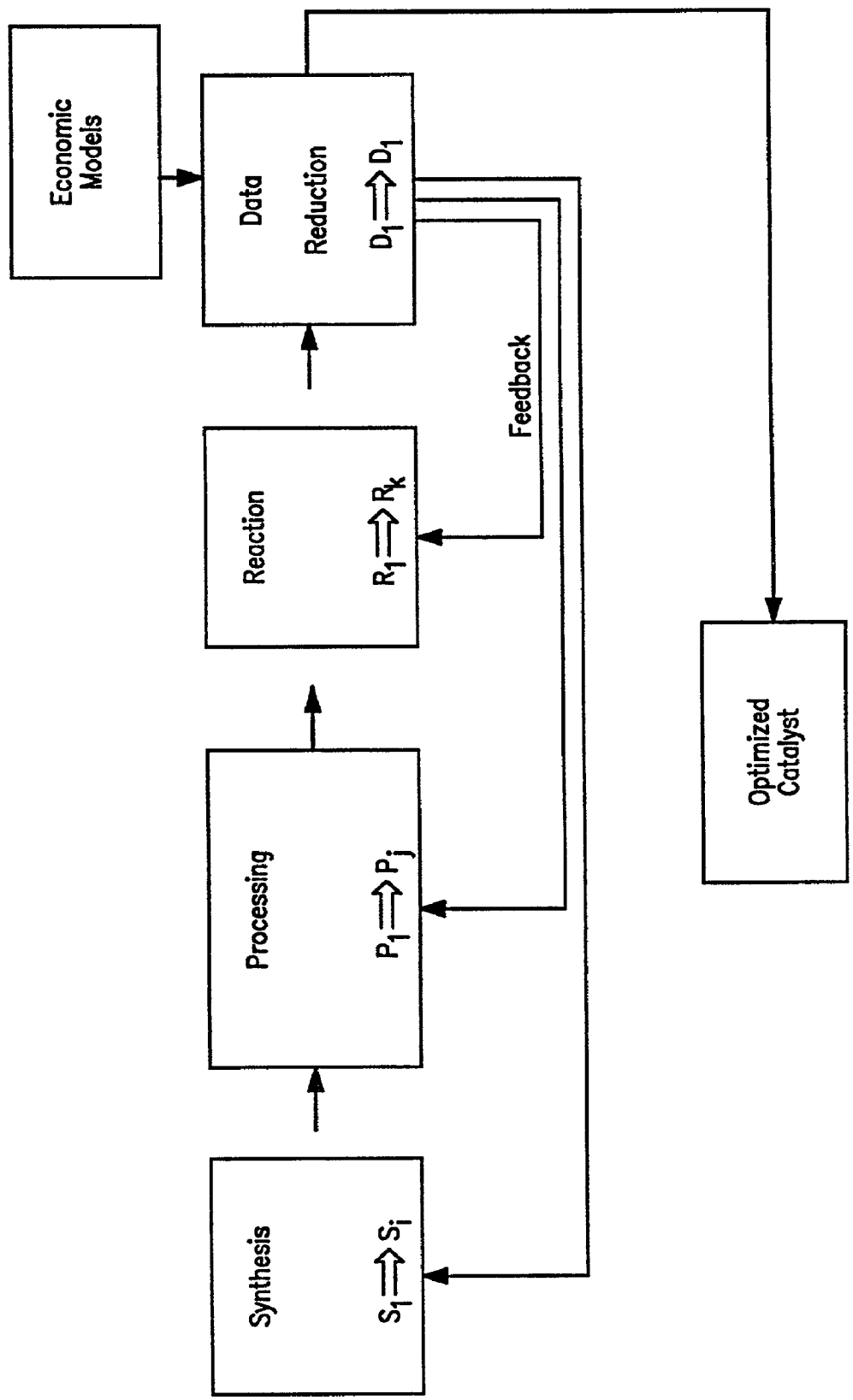
FIGS. 10A and 10B are schematic views showing, for example, how a lead composition can be evaluated in a process optimization reactor with respect to optimization of synthesis protocols, processing/treatment (e.g.,reduction) conditions, and/or reaction conditions. Data reduction from one or more of such optimization efforts can then be integrated as feedback into further investigations with the process, preferably moderated with economic evaluations based, for example, on economic models. Preferred variables in connection with each of the synthesis optimization, processing optimization, reaction optimization, reactor optimization, and catalyst optimization are summarized in FIG. 10B.
Figure 10B:
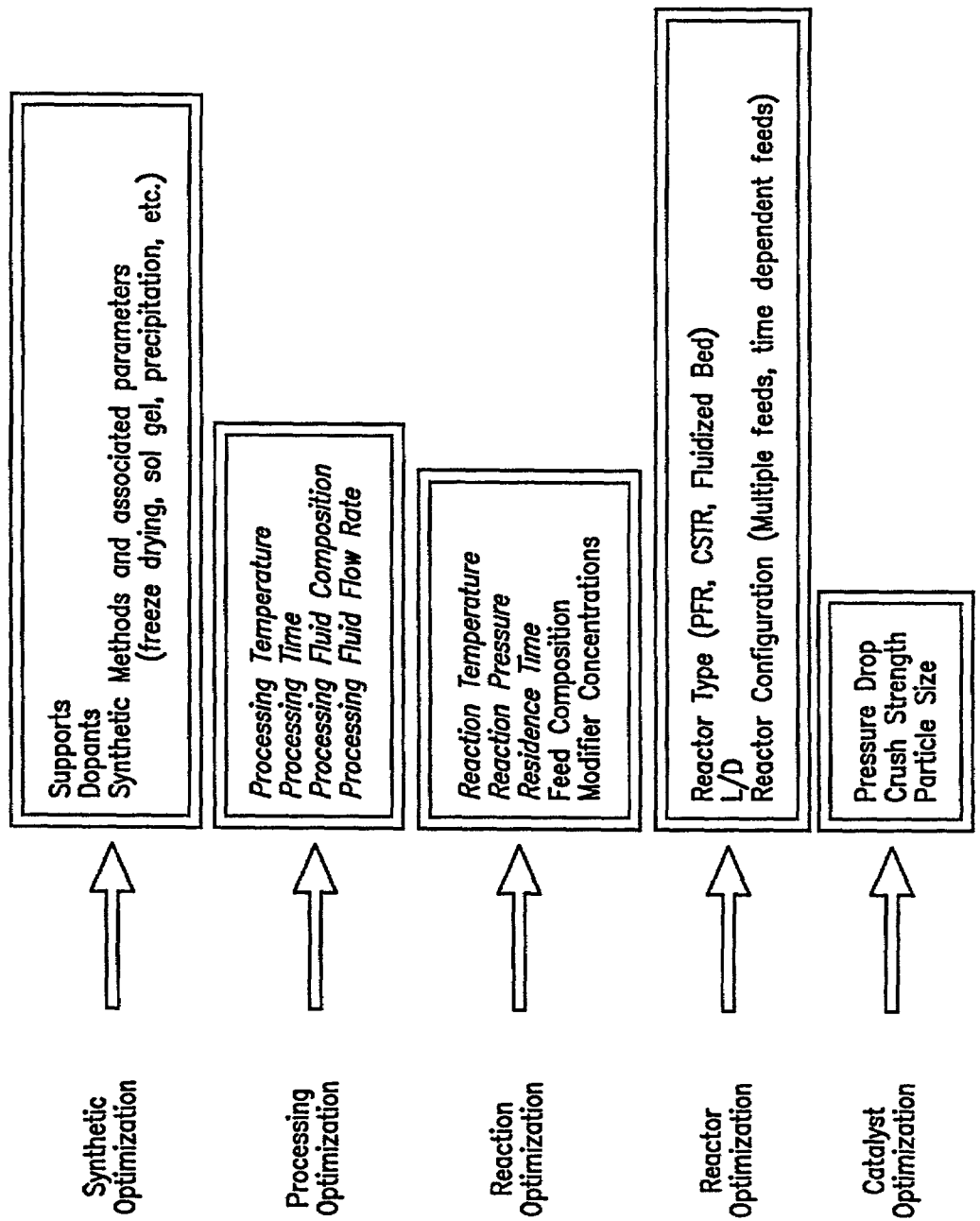

The reaction systems of the present invention are particularly useful in connection with high-throughput (i.e., combinatorial) catalysis research programs. Preferred approaches are disclosed in U.S. Pat. No. 6,149,882 to Guan et al., and U.S. Ser. No. 09/518,794 filed Mar. 3, 2000 by Bergh et al., issued as U.S. Pat. No. 6,749,814). As applied to combinatorial (i.e., high-throughput) research for heterogeneous catalysts, such MVO reactors can be employed in a work-flow paradigm in which an identified "lead composition" is efficiently optimized and evaluated for potential commercial applications. As represented schematically in FIG. 10A, for example, a lead composition can be evaluated in an MVO reactor with respect to optimization of synthesis protocols, processing/treatment (e.g.,reduction) conditions, and/or reaction conditions. Data reduction from one or more of such optimization efforts can then be integrated as feedback into further investigations with the MVO, preferably moderated with economic evaluations based, for example, on economic models. Preferred variables in connection with each of the synthesis optimization, processing optimization, reaction optimization, reactor optimization, and catalyst optimization are summarized in FIG. 10B.

Twenty-Four Channel Parallel Flow Reactor Having Variable Feed Composition

In a preferred embodiment, the invention is exemplified by a twenty-four channel, parallel-flow reaction system for effecting twenty-four simultaneous reactions. Each of the twenty-four reactors can be a fixed-bed type flow reactor, allowing for evaluation of candidate catalysts under varied process conditions. In particular, the twenty-four channel reactor includes a fluid distribution system having a feed-composition subsystem for simultaneously supplying six-different gaseous feed compositions—each feed composition comprising three feed components—to the reaction cavity of each of the twenty-four reactors. The reactor effluent is discharged from each reactor through the fluid distribution system to effluent and to a parallel gas chromatograph injection valve for simultaneous injection into a twenty-four channel parallel gas chromatrograph. The reactor can also include a temperature-control subsystem for controlling, individually, the temperature of each of the twenty-four reactors.

Figure 11A:
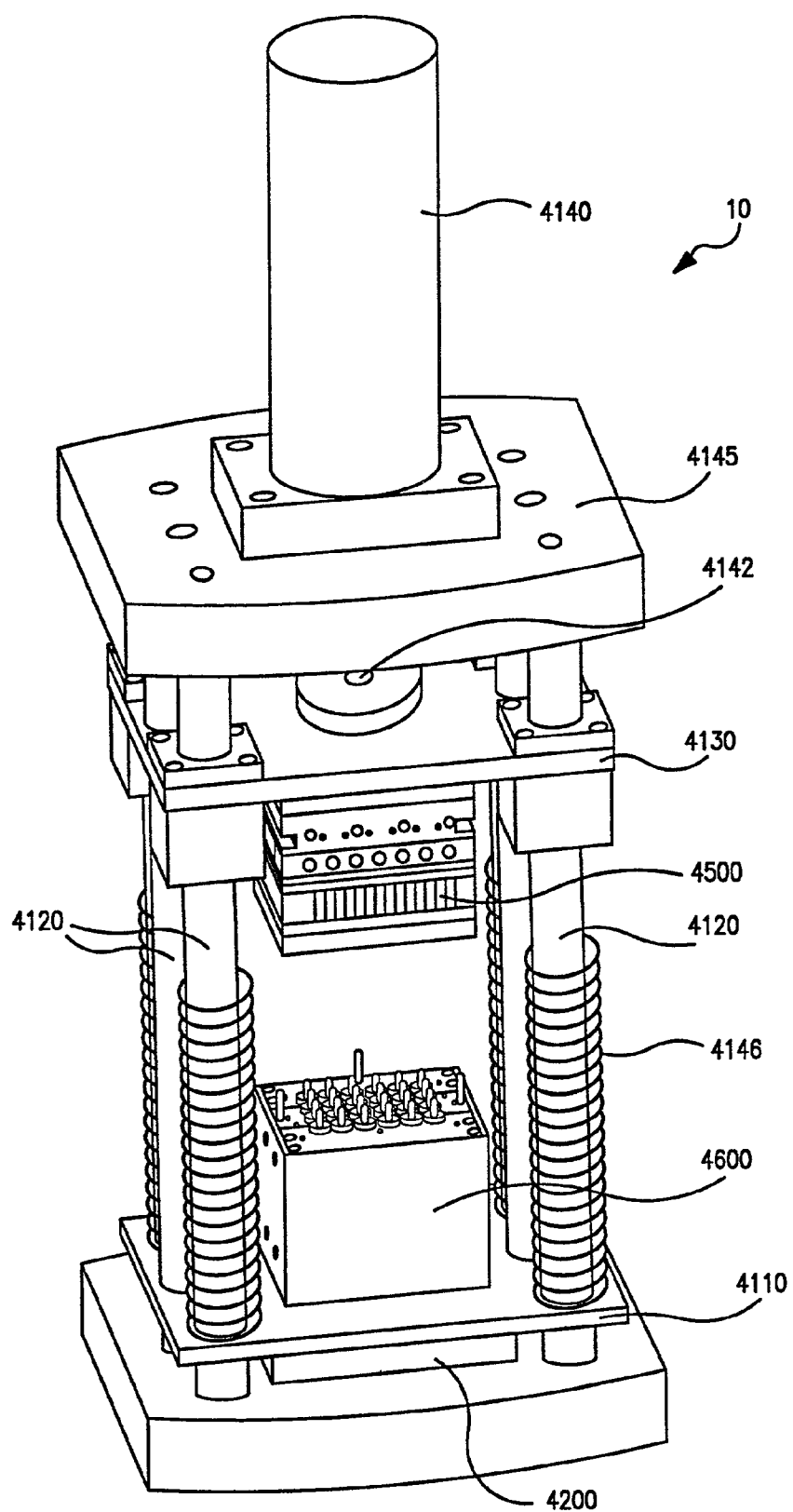
FIGS. 11A through 11O are perspective views (FIGS. 11A, 11C, 11G, 11J, 11L,), schematic views (FIGS. 11B, 11M) top plan views (FIGS. 11D, 11E, 11F, 11N,), cross-sectional views (11H, 11I, 11K, 11O) showing various aspects of a twenty-four channel parallel flow reactor having variable feed composition (FIGS. 11A, 11B), including specifically a distribution module (FIG. 11C), a microchip body with integral set of flow restrictors (FIGS. 11D, 11E, 11F), a flow restrictor block (FIG. 11G), a microvalve (FIG.

With reference to FIG. 11A, the twenty-four channel reaction system 10 is a bench-top instrument comprising a distribution module 4500 and a reactor module 4600. The distribution module 4500 and reactor module 4600 are supported in a frame 4100 that includes a lower support shelf 4110, and upper support shelf 4130 and four guide posts 4120 (linear ball bearings). The distribution module 4500 can be operationally engaged with the reactor module 4600 by downward movement of a shaft 4142 connected at a lower end to the distribution module 4500 via a support block (not shown), and at an opposing upper end to a hydraulic jack 4140 (e.g. 100 kN, adjustable, regulated force) supported on a press frame 4145. Preloaded springs 4146 are provided on each of the guide posts 4120 to ensure appropriate seating force between the reactor module 4600 and the lower support shelf 4110 to sequentially demount the distribution module from the reactor module (release of upper o-ring seals on reactor module), and subsequently, the reactor module lower o-rings). A gas-chromatograph-connector module 4200 provides twenty-four channel fluidic interface to a parallel gas chromatograph injection valve (not shown) situated under the lower support shelf 4110, and is in fluid communication with the reactor module 4600.

Figure 11B:
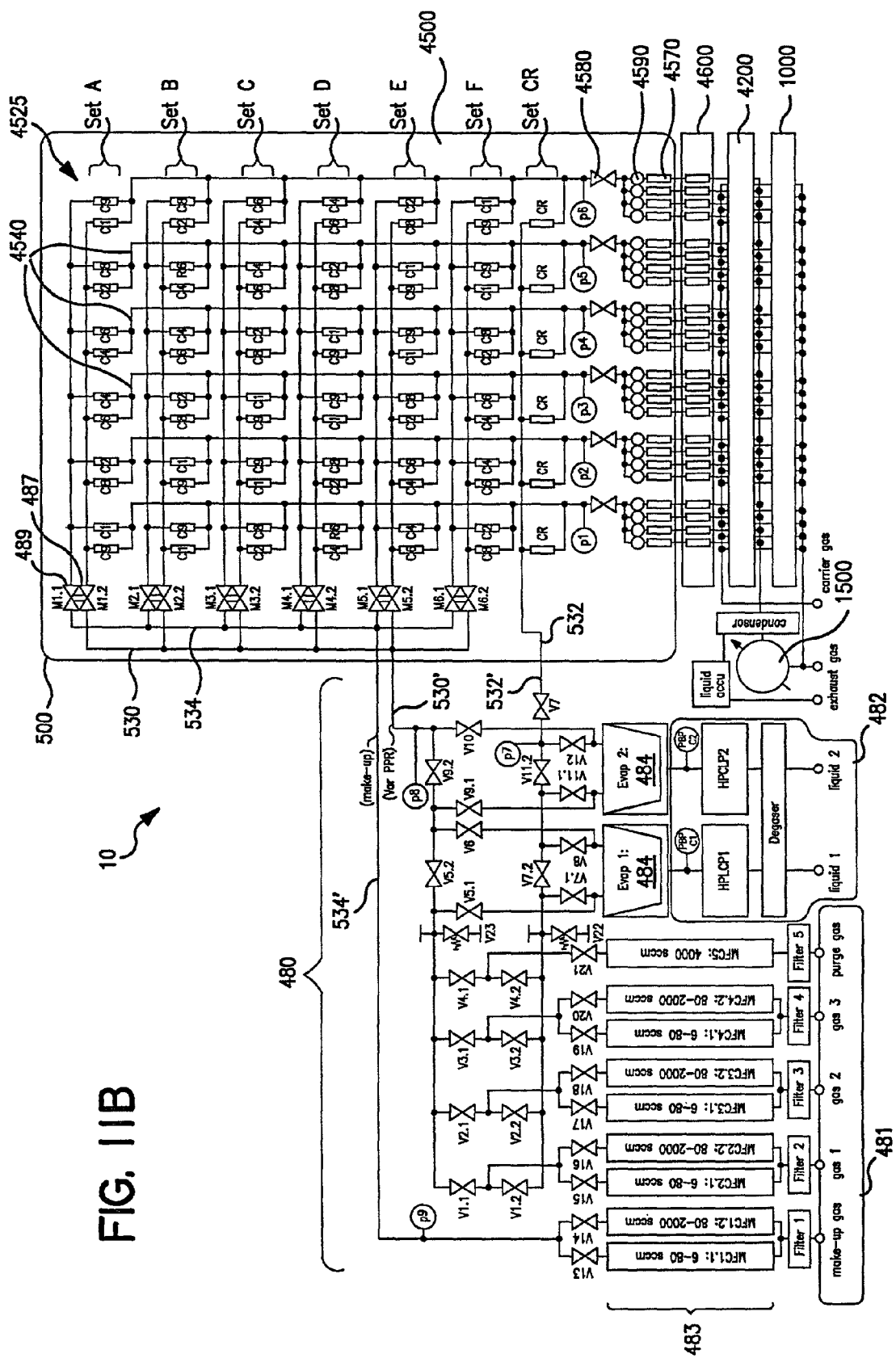

Referring to FIG. 11B, the distribution module 4500 can be interfaced with an external fluid distribution system 480 having gas supply system 481 with associated mass flow controllers 483, and a liquid supply system 482 with associated evaporators 484, together with appropriate valving, substantially as described above. Three gaseous feed components are fed through external transfer lines 530' (variable partial pressure reactant feed source), 532' and (constant partial pressure reactant feed source), 534' (make-up gas) substantially as described in connection with FIG. 4E to an internal inlet fluid distribution system 500 having an internal feed-composition subsystem 4525. Internal feed transfer lines 530, 534, and pairs of commonly-actuated inlet isolation valves 487, 489 provide selectable fluid communication to a series of six sets of flow restrictor groups—indicated as SET A, SET B, SET C, SET D, SET E, and SET F—with each set comprising six groups of flow restrictors. Each group of flow restrictors in a particular set include a first-feed-component flow restrictor in selectable fluid communication with the variable partial pressure feed source through transfer line 530 and inlet isolation valve 487, and a second-feed-component flow restrictor in fluid communication with the make-up feed source through transfer line 534 and inlet isolation valve 489. The relative conductance values for the first-feed-component flow restrictor and the second-feed-component flow restrictor within each group is indicated as "C1", "C2", "C4", "C6", "C8" and "C9", with combinations of values rotating between the various groups substantially as described above in connection with FIG. 4E. Internal feed transfer line 532 provides a constant partial pressure feed source through a set of six dedicated flow restrictors, where the flow restrictors have substantially the same resistance to flow (i.e., "constant resistance" flow restrictors, indicated as SET CR). The (varied) feed composition from the six groups of feed-component flow restrictors (after mixing feed components from the first-feed-component flow restrictors and second-feed-component flow restrictors in an internal mixing zone, not shown,) are fed through six respective discharge channels 4540. The combined feed composition (of the variable feed component/make-up feed component) are mixed with the constant feed component in the discharge channels 4540. A pressure sensor (illustrated as p1, p2, p3 . . . etc.) monitors discharge channel 4540 pressure. Each of the resulting six varied feed composition feeds are discharged through an outlet isolation valve 4580, and then split four ways using flow-splitters to create twenty-four streams—with six groups of four steams each, and each group having a varied feed composition. Each of the twenty-four feed streams can be fed through a single, individual split restrictor 4570—such as a capillary or as microfluidic channel (e.g. having substantially the same resistance to flow as compared between reaction channels), and then through a mass flow sensor 4590 (MFS), before leaving the distribution module. As illustrated, the order of the mass flow sensor 4590 and the split restrictor 4570 can be reversed from that described above. The distribution module 4500 is a separate, stand-alone subsystem that mounts in fluid communication with the reactor module 4600. Connector module 4200 and detection module 1000 are also shown.

Figure 11C:
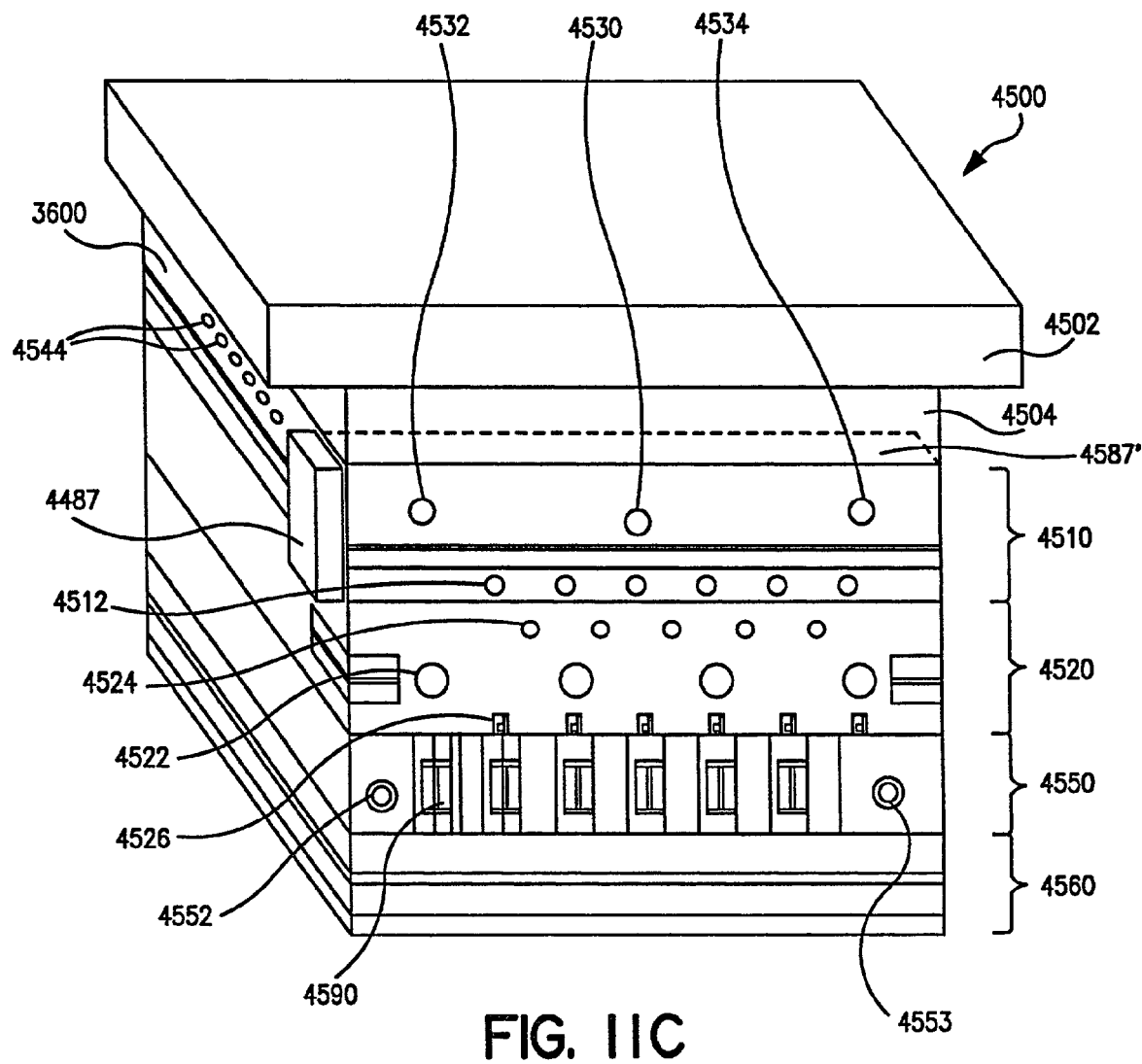

The distribution module 4500 was provided as a modular unit comprising a plurality of modular fluidic chips. In particular, with reference to FIG. 11C, the distribution module comprises a flow-restrictor block 4510 comprising a substrate 3600 having several microchip bodies (not shown) mounted thereon. The microchip bodies include flow restrictors (C1, C2, C3, etc.) from which sets of flow-restrictor groups are formed by fluidic connection. A series of commonly-actuated groups of microvalves can be precision machined and mounted as a valve block 4487 on one side of the distribution module 4500, or integrally therewith, including for example as a subblock integrally within the flow-restrictor block 4510—for example, as indicated as 4587' with dotted lines. Alternatively, the groups of microvalves can be microfabricated and be integral with the flow restrictor block 4510 or with microchip bodies mounted on the flow-restrictor block 4510. The microvalves are pneumatically actuated with air supplied through control pressure ports 4512. Reactant sources, including a variable partial pressure gas, a make-up gas and a constant partial pressure gas are supplied via external-internal inlet ports 4530, 4534, 4532, to provide fluid connection with internal transfer lines 530, 534, 532, respectively (FIG. 11B). A cover 4504 and an insulator block 4502 are positioned over the flow-restrictor block 4510. The flow-restrictor block 4510 is situated over a heater block 4520 comprising resistive cartridge heaters 4522, pressure-sensor ports 4524 and thermocouple ports 4526. Capillary-type split restrictors (4570, FIG. 11B) extend between the heater block 4520 and the split-restrictor-mass flow sensor block 4550 ("SR-MFS block" 4550), that includes an array of microfabricated mass flow sensors 4590 downstream from each of the split restrictors, and connection ports 4552, 4553 for cooling fluid circulating through the SR-MFS block 4550. The feed passes from the mass flow sensors into reactor tubes (not shown) that extend upward from the reactor module (4600, FIG. 11B) into a press block 4560 when the distribution module 4500 is engaged with the reactor module.

Figure 11G:
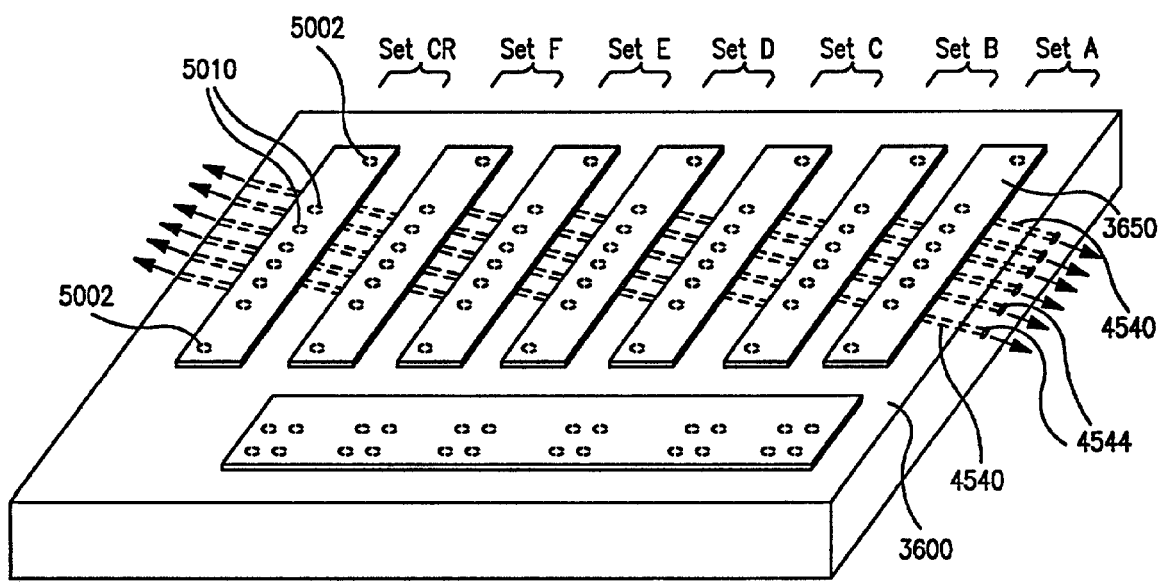

The flow restrictor block 4510 includes six sets of flow-restrictor-groups microfabricated on separate microchip bodies 3650 that are mounted on a common substrate 3600. In one embodiment, a set of seven microchip bodies having integral flow restrictors can be mounted on a substrate, with each the flow restrictors in each of the mircochip bodies corresponding to one of the sets of flow-restrictor groups (SET A, SET B, SET C, SET D, SET E, SET F, SET CR) represented in FIG. 11B. Exemplary microchip bodies, corresponding to SET A and SET CR are shown in FIG. 11D and 11E, respectively. The microchip bodies comprise a first inlets 5002 (e.g. in fluid communication with one of the feed-component source gasses, such as the variable-feed component), and a second inlet 5004 (e.g., in fluid communication with another of the feed-component source gas, such as the make-up feed component). When a particular set of flow restrictors is selected by actuation of microvalves (487, 489, FIG. 11B) corresponding to that set, then the two feed components come in through the inlets 5002, 5004 into the inlet plenums 5003, 5005, and flow through the flow restrictors (e.g., for SET A, varied flow restrictors C1, C2, C4, C6, C8, C9; for SET CR, constant restrictors CR) to mixing zones 540, such that the varied feed compositions having various ratios of feed components are formed in the mixing zones. Microfluidic outlets 5010 provide fluid communcation to the discharge (channels 4540, FIG. 11B). As an alternative to the particular embodiment shown in FIG. 2D, geometry effects associated with variously-sized channels off of the common inlet plunums 5003, 5005 (e.g. entrance volume effects) can be minimized physically forming, for example, the C9 flow restrictor from nine multiple, identical copies of the C1 flow restrictor. With reference to FIG. 11F, in a further embodiment, the flow resistances on each particular microchip body be substantially the same (e.g., C4, as illustrated, for one microchip body, C6 for another microchip body, etc.). Also, each flow restrictor (e.g., C4, as illustrated) can have its own, dedicated mierfluidic inlet 5002 and inlet plenum 5003. Referring to FIG. 11G, the sets of flow restrictors (with grouped resistance values as shown in FIG. 11B) can be established where each of the microchip bodies are fabricated to be identical (e.g., such as shown in FIG. 11D)—without physically and integrally rotating the various combinations of flow resistances on the microchip body—by having microfluidic channels 4540 that cross the outlets 5010 of each flow restrictor (C1, C2, C4, etc.) in the various combinations, so that by selection of appropriate feed components to the inlets 5002, the desired sets of flow restrictors (e.g. SET A, SET B, SETC, etc.) can be achieved. Internal passages within the flow-restrictor block 4520 and/or cover block 4510, 4504 can be used for internal interconnections. Such internal passages can be supplemented by external interconnections that interface through side ports 4544. Alternatively, such side-ports could be manifolded and routed through a different face of the flow-restrictor block 4510. Fabrication of the flow restrictors integral with the microchip bodies can be effected, for any of the aforementioned embodiments, using typical microfabrication techniques. Example 1 describes the fabrication techniques for an exemplary set of flow restrictor microchannels integral with a substrate or with a microchip body.

Figure 11H:
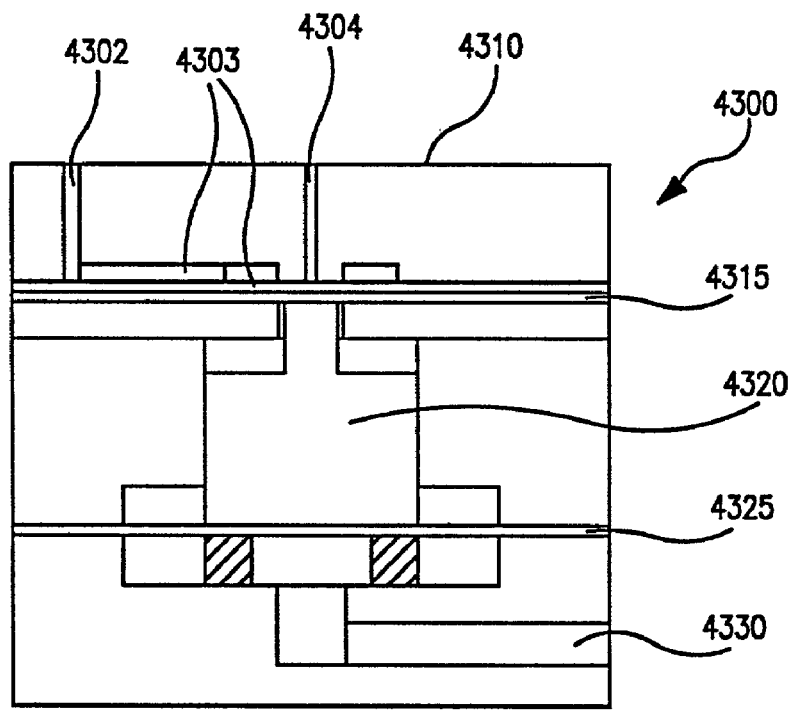
Figure 11I:
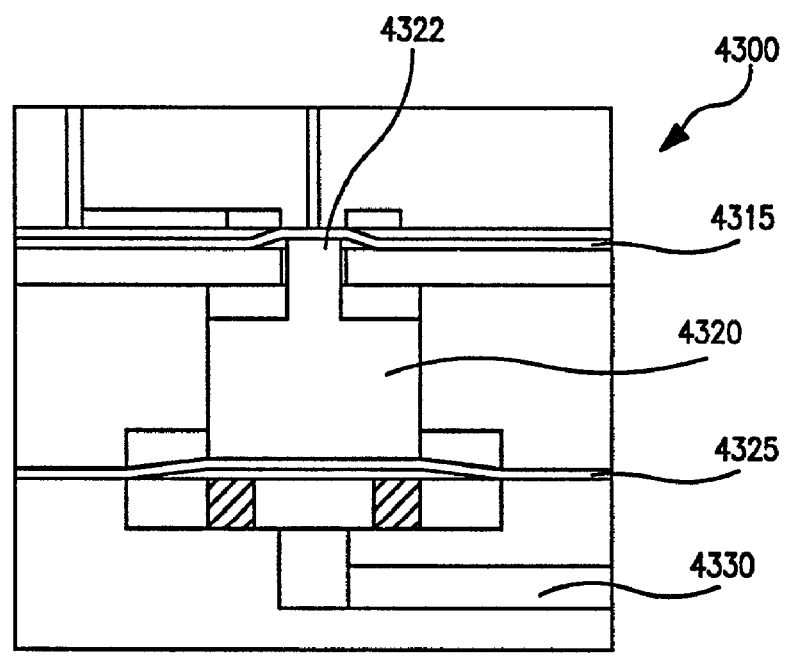

The flow restrictor block 4510 also includes the six pairs of commonly-actuated inlet isolation microvalves 487, 489, as well as the outlet isolation valves 4580. These valves are preferably fabricated using precision machining techniques known in the art. Alternatively, the valves can be microfabricated, and can be integral with the flow-restrictor block 4510 or with a microchip body mounted thereon. The valves can also be, as noted above, part of an external fluid distribution system (480, FIG. 11b). The particular microvalve design is not critical. Preferably, the microvalves 487, 489 are membrane-actuated, membrane-seated valves such as shown in FIGS. 11H and 11I. Briefly, membrane-actuated valves 4300 can be prepared by precision machining to form the various component parts. In its open state (FIG. 11H), a fluid can flow into the valve through fluid inlet passage 4302, through internal passages 4303, past the valve seat 4310, and out through outlet passage 4304. In its closed state (FIG. 11I), a piston 4320 having a piston face 4322 is forced upward against a seating membrane 4315 such that fluid flow past the seat 4310 is sealingly blocked, with the seating membrane 4315 essentially acting as a gasket between the piston face 4322 and the valve seat 4310. The piston 4320 is preferably pneumatically actuated by use of an actuating membrane 4325 under pressure through actuation passage 4330. Portions of the seating membrane 4315 and actuating membrane that are situated between facing component surfaces of the valve body can serve as gaskets when the valve is clamped or fastened together. Further details are provided in co-pending, co-owned application U.S. Ser. No. 60/274,022, entitled "Gas Chromatograph Injection Valve Having Microvalve Array" filed on Mar. 7, 2001) by Bergh et al., filed as non-provisional applications U.S. Ser. No. 10/092,364 (pending and published as US 2002-0127146) and U.S. Ser. No. 10/092,035 (issued as U.S. Pat. No. 6,742,544).

Figure 11J:
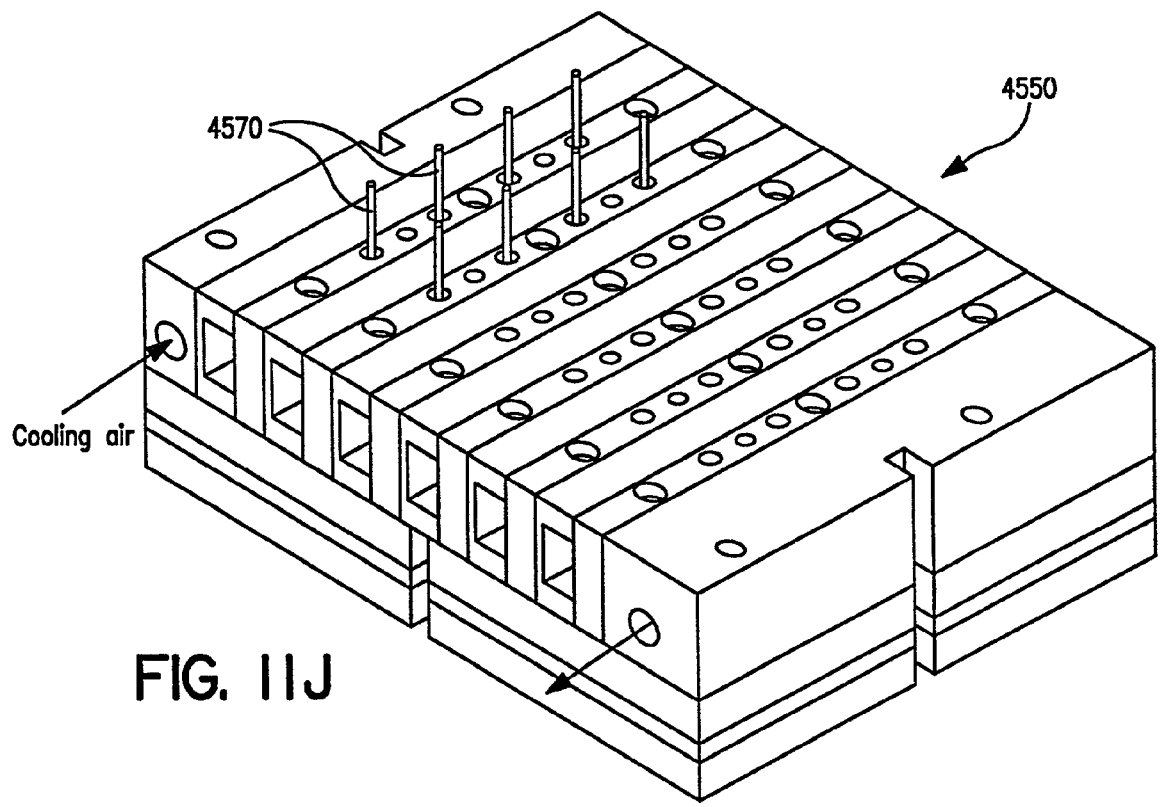
Figure 11K:
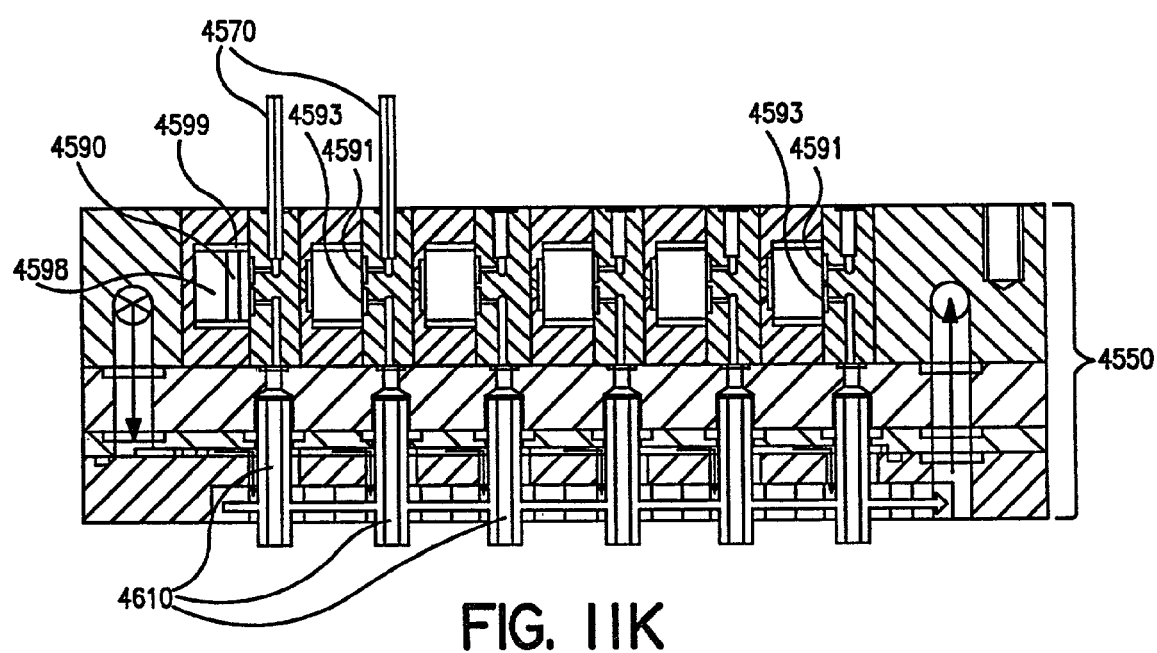
Figure 11L:
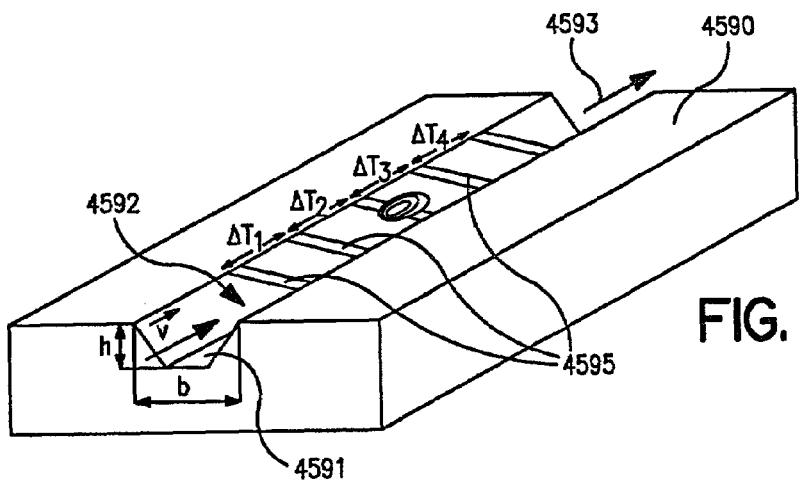
Figure 11M:
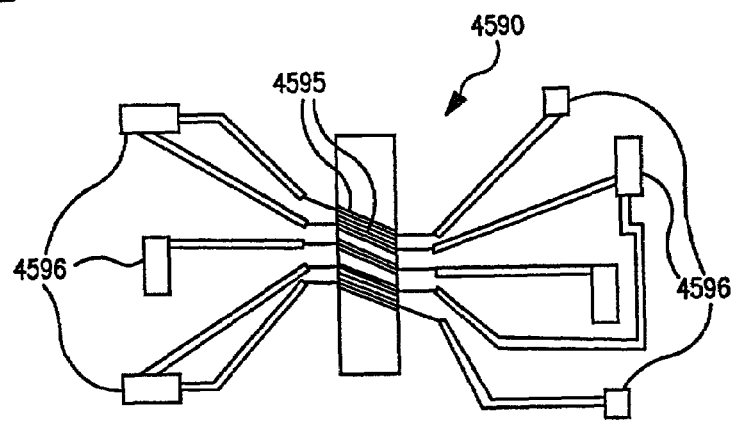
Figure 11N:
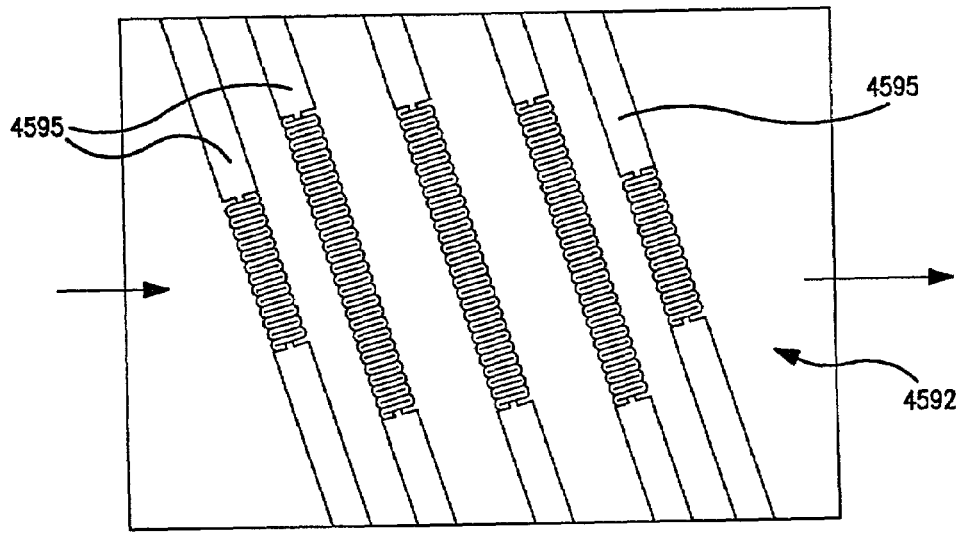

The mass-flow-sensor/split restrictor block 4550 is shown in FIGS. 11J and 11K. The MFS-SR block 4550 comprises, for each of the twenty-four reaction channels, a split restrictor 4570, and a microfabricated mass-flow sensor 4590. As shown in FIG. 11J, the unit is cooled using fluid-type micro heat exchanger with cooling air as the cooling medium. The split restrictor is preferably a capillary-type flow restrictor (e.g., $\frac{1}{16}$ O.D./125 µm I.D. stainless steel capillaries). For each reaction channel, the feed gas flows through the split restrictor into the mass-flow sensor 4590 via sensor inlet 4591. The feed gasses passes through a detection channel 4592 and then exits via sensor outlet 4593. O-rings 4599 are used to seal the sensor inlet and outlet. 4591, 4593. The mass-flow sensor design is not critical. Referring, briefly, to FIGS. 11L, 11M and 11N, a preferred microfabricated mass flow sensor 4590 includes five-detection filaments 4595. The detection filaments 4595 are electrically connected to contact pads 4596 via conductive paths. The contact pads are connected to mass-sensor electronic circuitry for a five-bridge design, according to known techniques. The detection filaments 4595 are preferably platinum vapor-deposited onto a silicon nitride bridge, and designed with a meandering path (FIG. 11N). The silicon nitride bridge is positioned at 15° angle relative to the normal to the detection channel 4592. The electronic circuitry (e.g. printed circuit board) can be located adjacent each mass flow sensor (e.g., in the adjacent cavity 4598). After exiting the mass flow sensor 4590, the feed gas for each channel is fed to the reactor tubes 4610.

The reactor module 4600, shown schematically in FIG. 11O, comprises a 4×6 array of twenty-four reactor tubes 4610 individually supported in a reactor frame 4605. Each tube has a reaction volume of about 1 ml. Each of the reactor tubes 4610 can be individually heated using resistive coil heaters 4620 (e.g. Watlow Mini-K-ring). Thermal isolation between reactor tubes 4610 is achieved using fluid-type heat exchanger to cool the inter-reactor volume within the reactor frame 4610. Preferably, the cooling medium is air or inert gas, and is fed into the reactor module 4600 substantially at the midsection thereof. Plate cooling fluid (e.g. air) is also fed through the top member 4606 and bottom member 4607 of the reactor frame 4605, specifically through heat-exchange channels 4608 formed therein. Advantageously, as described in greater detail above, the heat flux associated with the resistive coil heaters 4620 can be axially varied to account for heat variations due to the reaction, and to balance heat removal by the cooling media such that a substantially axial uniform temperature profile is obtained. Further details about temperature control are provided in co-owned, co-pending application U.S. Ser. No. 60/274,065, entitled "Parallel Flow Reactor Having Improved Thermal Control" filed on Mar. 7, 2001) by Bergh et al., filed as non-provisional application U.S. Ser. No. 10/094,257 (pending and published as US 2002-0170976). The feed gas flows into the reactor tube inlet 4612, and optionally contacts a catalyst (e.g., supported in the reactor tube using frits (not shown)) under reaction conditions to effect the chemical reaction of interest. The reaction products and unreacted reactants are discharged through the reactor tube outlet 4614.

Other Applications

Although described particularly in connection with gas and liquid phase chemical reaction systems, the present invention has, as noted above, applications in other areas, including for example, as a parallel adsorbent system, extraction system and/or solubilization systems for research and development in, for example, the gas processing fields, environmental applications or in pharmaceutical manufacturing. The chemical processing systems described herein can also be employed, for example, in connection with solid-state chemistry and solid-state material research and development. In any of the aforementioned applications, evaluation of candidate materials and/or of processing conditions can be effected by characterizing one or more properties of the plurality of candidate materials (e.g., crystal structure) after processing in the chemical processing system.

In addition, individual subsystems of the distribution system can be advantageously applied in contexts other than for distribution to parallel flow reactors. In particular, the flow-partitioning subsystem, the pressure-partitioning subsystem, and the feed-composition subsystem all have other applications.

In general, the invention can be characterized as a fluid distribution system for simultaneously providing a fluid to four or more cavities, each of the four or more cavities having an inlet providing fluid communication with at least one fluid source, and optionally, where the cavity is a flow cavity, an outlet providing fluid communication with at least one effluent sink. In one embodiment, the fluid distribution system includes one or more subsystems selected from the group consisting of (a) a flow-partitioning subsystem for providing a different flow rate to each of the four or more cavities, (b) a pressure-partitioning subsystem for providing a different pressure in each of the four or more cavities, and (c) a feed-composition subsystem for providing a different feed composition to each of the four or more cavities. The one or more subsystems comprise at least one set of four or more flow restrictors (e.g. inlet flow restrictors, outlet flow restrictors and/or feed-component flow restrictors), where each of the four or more flow restrictors has a flow resistance that varies relative to other flow restrictors in the set. Preferably, each of the four or more flow restrictors are a capillary or are integral with a substrate or with one or more microchip bodies mounted on a substrate.

For example, the subsystems can be applied, as well, to the processing or treatment of candidate materials such as heterogeneous catalyst candidate materials prior to use in catalyzing the reaction of interest. Specifically, in such applications, the invention is directed to a parallel processing system having the capability to simultaneously vary one or more of the following parameters between separate channels: the composition of treatment agents (e.g., oxidizing agents, reducing agents), and correspondingly the composition of, for example, the calcining environment, pressure, temperature, and treatment time. The general principles of the invention, as applied to varying such processing/treatment conditions, is substantially and generally the same as that disclosed herein with respect to reaction systems.

Figure 6:
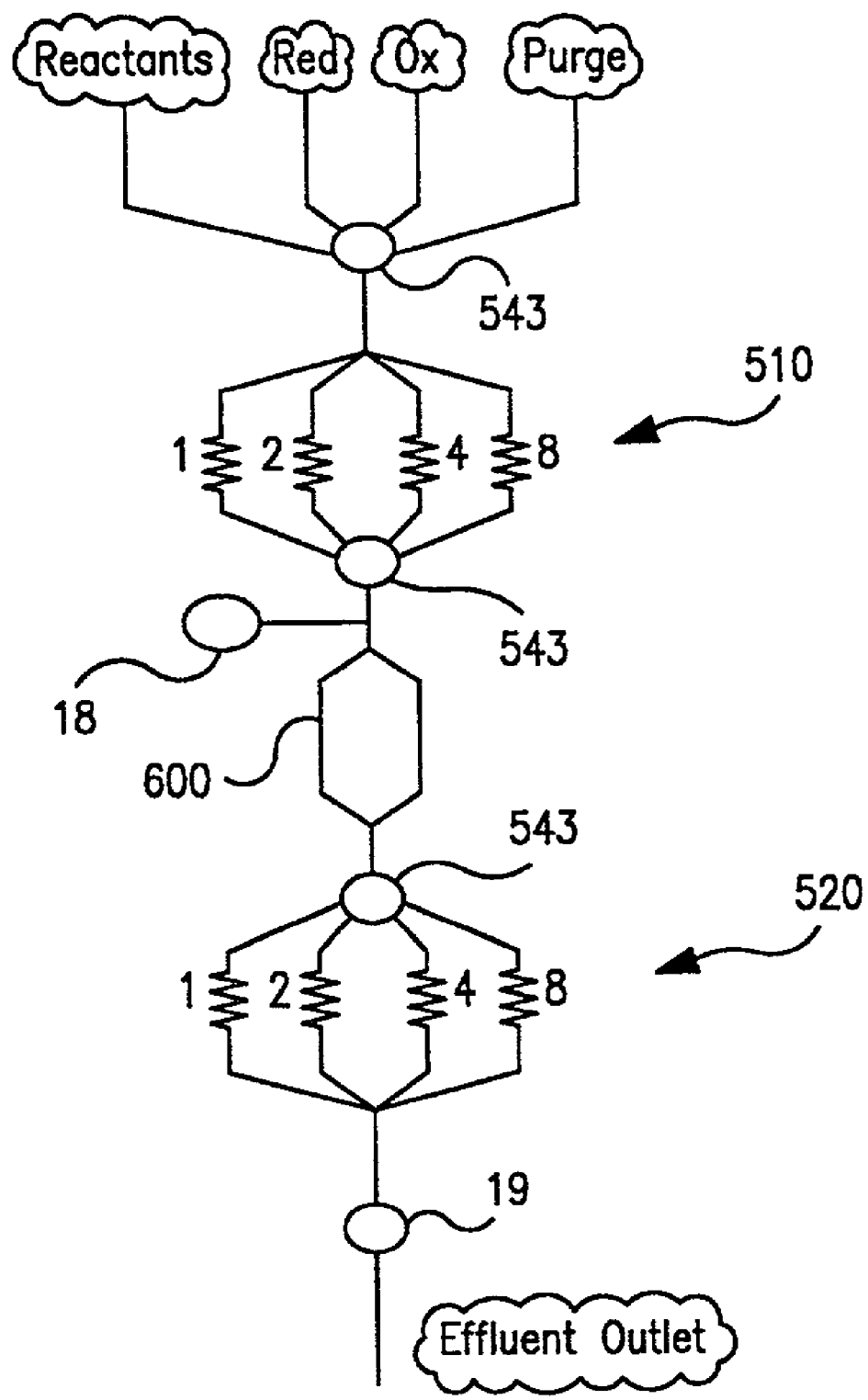
FIG. 6 is a schematic view illustrating an integrated chemical processing system for pretreatment and reaction of catalysts (or catalyst precursors) in-situ in the reaction cavity, prior to the reaction of interest.

In one embodiment—particularly preferred for evaluation of reaction systems involving heterogeneous catalysis, an integrated chemical processing system, and preferably an integrated chemical processing microsystem, has the capability to (i) process/treat four or more catalyst precursors (e.g., different catalyst precursors) to form catalyst candidates under varying processing/treatment conditions (e.g., composition of treatment agents/calcining environment, pressure, temperature, temperature ramps and/or exposure time), as well as the capability to (ii) screen (e.g., evaluate) such catalyst candidates for a particular reaction of interest under varying reaction conditions (reactor feed composition, reactant flow rate, pressure and temperature. The embodiment represented schematically in FIG. 6 (for a single channel) is exemplary of such an integrated treatment/reaction system, where pretreatment of catalyst precursors occurs in-situ in the reaction cavity, prior to the reaction of interest. Briefly, various treatments sources such as reactants, reductants ("Red", FIG. 6), oxidants (Ox, FIG. 6) or inert purge gases (Purge, FIG. 6) can be selectably supplied to a catalyst precursor situated in a reactor 600 composition situated via selection valves 543 and a set of inlet flow restrictors 510. Additionally or alternatively, a set of outlet flow restrictors 520 can also be employed, generally as described above. A shut-off valve 19 can optionally be used to isolate the reactor (e.g. to allow for greater residence times of some of the treatment agents).

Each of the aforementioned chemical processing systems (e.g., reaction systems, processing/treatment systems) are preferably flow-systems (e.g., flow reactors, or processing chambers adapted for non-reactive processing) in which a fluid feed is provided to a flow cavity (e.g., a flow reactor cavity), allowed to interact with (e.g., contact) one or more candidate materials of interest (the materials being the same or different in separate channels) under the reaction conditions of interest (or, alternatively for example, pretreatment conditions of interest), and in which an effluent stream is discharged from the reaction cavity. However, the systems can also be batch systems, or semi-continuous systems, with the fluid feed being provided to a batch cavity. In particular, the feed-composition subsystem is well-suited to operations involving batch or semi-continuous systems, as well as continuous systems. For batch operations, for example, the mixing zone can be a well of a parallel batch reactor, a well of a microtiter plate, or a treated or untreated region or area of a plate-type substrate such as a wafer.

In a preferred embodiment for formulation and synthesis applications, a fluid distribution system can advantageously simultaneously form four or more fluid compositions comprising at least two or more components in varying relative amounts. The fluid distribution system can comprise four or more mixing zones for forming the four or more fluid compositions, and a first feed component source in fluid communication with each of the four or more mixing zones, via a set of four or more first-feed-component flow restrictors. Each of the four or more first-feed-component flow restrictors provide fluid communication between the first feed component source and one of the four or more mixing zones, and each have a flow resistance that varies relative to other first-feed-component flow restrictors in the set. A second feed component source is also in fluid communication with each of the four or more mixing zones. Hence, although described herein in connection with controlling feed composition to a flow reactor or other flow processing system, the concept of using flow-partitioning to form varying compositions in a mixing zone also has applications in other aspects of combinatorial material science research, such as in material synthesis applications (e.g., catalyst synthesis or catalyst precursor synthesis). Such synthesis applications include those described in co-owned and co-pending U.S. patent application Ser. No. 09/516,669, entitled "Method and System for In-Situ Synthesis of a Combinatorial Library of Supported Catalyst Materials", filed Mar. 1, 2000 by Lugmair et al., issued as U.S. Pat. No. 6,627,571.

EXAMPLES

Example 1

Microfabrication of Flow Restrictors

Flow restrictors integral with a microchip body were formed using known microfabrication techniques.

Figure 12A:
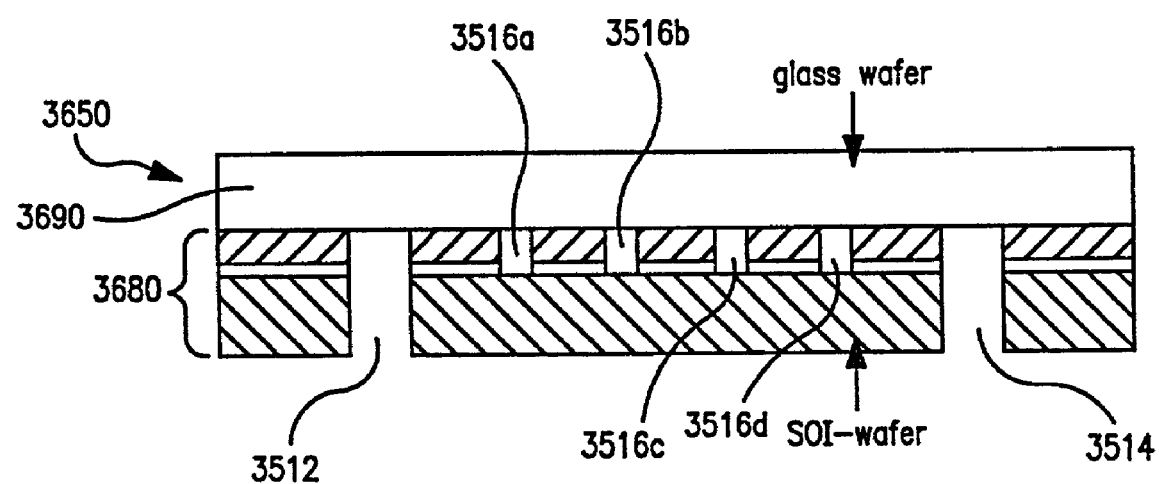
Figure 12G:
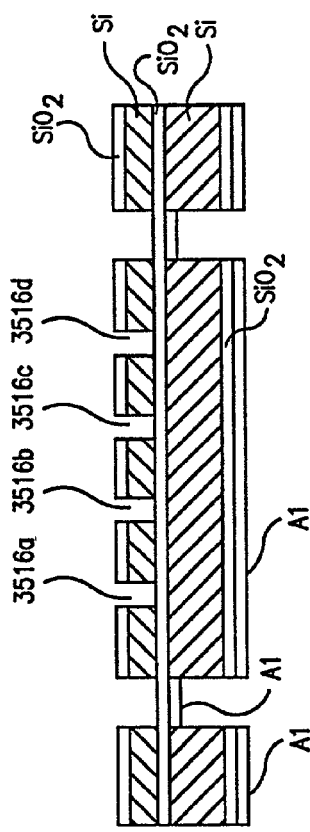
Figure 12F:
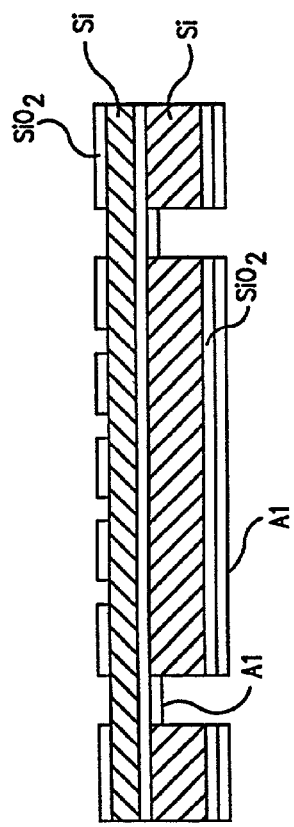
Figure 12H:
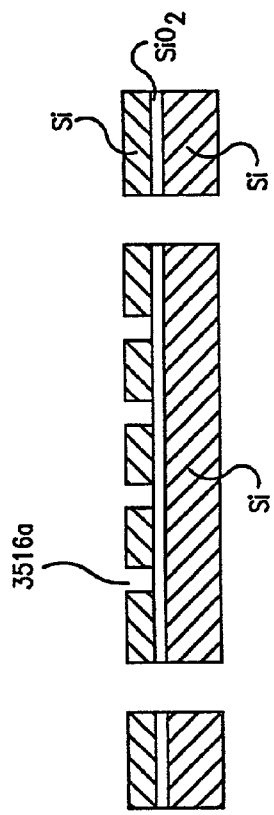

With reference to FIG. 12A, a microchip body 3650 comprising a plurality of microfluidic channels as flow restrictors 3516a, 3516b, 3516c, 3516d can be formed in a plurality of laminae, including a glass wafer as a top cover laminate 3690, and a silicon-on-insulator (SOI) composite laminate as a bottom flow-restrictor laminate 3680. SOI wafers are well known in the art, and are commercially available. The wafer of FIG. 12A was prepared as follows. An SOI wafer 3680 (having a 66 μm device layer 3682) was oxidized on both sides to form oxide layers thereon (FIG. 12B). Double-sided lithography was used to pattern for inlet and outlet holes 3512, 3514 on the bottom side, and for flow-restrictor channels 3516a, b, c, d on the top side. Then oxide etching was carried out on both sides to expose the underlying silicon surface at the patterned areas. (FIG. 12C). Inlet and outlets holes were then formed by single-sided ASE (Advanced Silicon Etch—Bosch) etching of the exposed silicon (FIG. 12D), and the photoresist was removed. (FIG. 12E). An aluminum film was deposited on the backside (FIG. 12F), and then the fluidic channels 3516a, b, c, d were etched using ASE-etching on the front side (FIG. 12G). The aluminum, the exposed oxide, and the buried oxide were then removed. (FIG. 12H). The cover laminate 3690 was then bonded to the topside of the fabricated assembly, to form the microchip body of FIG. 12A.

In light of the detailed description of the invention and the examples presented above, it can be appreciated that the several objects of the invention are achieved.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention.

We claim:

1. A parallel flow reaction system for effecting four or more simultaneous reactions in four or more reaction channels, the reaction system comprising four or more reactors, each of the four or more reactors comprising a surface defining a reaction cavity for carrying out a chemical reaction, an inlet part in fluid communication with the reaction cavity, and an outlet port in fluid communication with the reaction cavity, a fluid distribution system for simultaneously supplying one or more reactants from one or more reactant sources to the inlet port of the reaction cavity for each of the four or more reactors, and for discharging a reactor effluent from the outlet port of each such reaction cavity to one or more effluent sinks, the fluid distribution system comprising one or more subsystems selected from the group consisting of (a) a flow-partitioning subsystem for providing a different flow rate to each of the four or more reactors, the flow-partitioning subsystem comprising at least one set of four or more passive inlet or outlet flow restrictors, wherein each reactor of the four or more reactors is in fluid communication with at least one different passive flow restrictor from the set of four or more passive inlet or outlet flow restrictors than the other reactors, each of the four or more inlet or outlet flow restrictors having a flow resistance that varies relative to other flow restrictors in the set, (b) a pressure-partitioning subsystem for providing a different reaction pressure in the reaction cavity of each of the four or more reactors, the pressure-partitioning subsystem comprising at least one set of four or more passive inlet or outlet flow restrictors, wherein each reactor of the four or more reactors is in fluid communication with at least one different passive flow restrictor from the set of four or more passive inlet or outlet flow restrictors than the other reactors, each of the four or more inlet or outlet flow restrictors having a flow resistance that varies relative to other flow restrictors in the set, and (c) a feed-composition subsystem for providing a different feed composition to each of the four or more reactors, the feed-composition subsystem comprising four or more mixing zones, each mixing zone in fluid communication with an inlet port of a different reactor of the four or more reactors and at least two sets of four or more passive flow restrictors, a first of the two sets of passive flow restrictors in fluid communication with a first reactant source and the four or more mixing zones so that each of the four or more mixing zones is in fluid communication with the first reactant source through at least one passive flow restrictor of the first set of flow restrictors, a second of the two sets of passive flow restrictors in fluid communication with a second reactant source and the four or more mixing zones so that each of the four or more mixing zones is in fluid communication with the second reactant source through at least one passive flow restrictor of the second set of flow restrictors, each of the four or more flow restrictors in a set providing a resistance to flow between the or more reactant sources and one of the four or more mixing zones, each of the four or more flow restrictors in a set having a flow resistance that varies relative to other flow restrictors in the set.

2. The reaction system of claim 1 comprising the flow-partitioning subsystem and the pressure-partitioning subsystem.

3. The reaction system of claim 2 wherein the flow-partitioning subsystem and the pressure-partitioning subsystem are integrated and the flow restrictors are a first set of four or more inlet flow restrictors, each of the four or more inlet flow restrictors providing fluid communication between at least one reactant source and one of the four or more reactors, each of the four or more inlet flow restrictors having a flow resistance, $R_{inlet}$, that varies relative to other inlet flow restrictors in the set, the fluid distribution system further comprising a second set of four or more outlet flow restrictors, each of the four or more outlet flow restrictors providing fluid communication between one of the four or more reactors and at least one effluent sink, each of the four or more outlet flow restrictors having a flow resistance, $R_{outlet}$, that varies relative to other outlet flow restrictors in the set, the total resistance of the inlet and outlet flow restrictors for each channel, $R_{total}=R_{inlet}+R_{outlet}$, varying between each of the four or more channels of the reaction system to provide different flow rates through each of the four or more reactors, and the ratio of the resistances of the inlet and outlet flow restrictors for each channel, $R_{inlet}$:$R_{outlet}$, varying between each of the four or more channels of the reaction system to provide a different pressure in the reaction cavities of each of the four or more reactors.

4. The reaction system of claim 3 wherein the flow restrictors are microfluidic channels.

5. The reaction system of claim 3 wherein the flow restrictors are capillaries.

6. The reaction system of claim 3 wherein the flow resistance of each of the four or more inlet flow restrictors varies relative to other inlet flow restrictors in the set by a common factor, and the flow resistance of each of the four or more outlet flow restrictors varies relative to other outlet flow restrictors in the set by a common factor.

7. The reaction system of claim 1 comprising the flow-partitioning subsystem and the feed-composition subsystem.

8. The reaction system of claim 1 comprising the flow-partitioning subsystem and a temperature-control subsystem having operational capability for providing a different reaction temperature in the reaction cavity of each of the four or more reactors.

9. The reaction system of claim 1 comprising the flow-partitioning subsystem, the pressure-partitioning subsystem and the feed-composition subsystem.

10. The reaction system of claim 1 comprising the flow-partitioning subsystem, the pressure-partitioning subsystem and a temperature-control subsystem having operational capability for providing a different reaction temperature in the reaction cavity of each of the four or more reactors.

11. The reaction system of claim 1 comprising the flow-partitioning subsystem, the feed-composition subsystem and a temperature-control subsystem having operational capability for providing a different reaction temperature in the reaction cavity of each of the four or more reactors.

12. The reaction system of claim 1 comprising the flow-partitioning subsystem, the pressure-partitioning subsystem, the feed-composition subsystem and a temperature-control subsystem having operational capability for providing a different reaction temperature in the reaction cavity of each of the four or more reactors.

13. The reaction system of claim 1 comprising the pressure-partitioning subsystem and the feed-composition subsystem.

14. The reaction system of claim 1 comprising the pressure-partitioning subsystem and a temperature-control subsystem having operational capability for providing a different reaction temperature in the reaction cavity of each of the four or more reactors.

15. The reaction system of claim 1 comprising the pressure-partitioning subsystem, the feed-composition subsystem and a temperature-control subsystem having operational capability for providing a different reaction temperature in the reaction cavity of each of the four or more reactors.

16. The reaction system of claim 1 comprising the feed-composition subsystem.

17. The reaction system of claim 1 comprising the feed-composition subsystem and a temperature-control subsystem having operational capability for providing a different reaction temperature in the reaction cavity of each of the four or more reactors.

18. The reaction system of claim 1 wherein the reaction cavity of each of the four or more reactors has a volume of not more than about 10 ml.

19. The reaction system of claim 1 wherein the reactors and fluid distribution system are adapted to effect a chemical reaction of interest at a temperature of not less than about 100° C. and additionally, or alternatively, at a pressure of not less than about 10 bar.

20. A parallel flow reaction system for effecting four or more simultaneous reactions in four or more reaction channels, the reaction system comprising four or more reactors, each of the four or more reactors comprising a surface defining a reaction cavity having a volume of not more than about 100 ml for carrying out a chemical reaction, an inlet port in fluid communication with the reaction cavity, and an outlet port in fluid communication with the reaction cavity, and a fluid distribution system for simultaneously supplying one or more reactants from one or more reactant sources to the inlet port of the reaction cavity for each of the four or more reactors, and for discharging a reactor effluent from the outlet port of each such reaction cavity to one or more effluent sinks, the fluid distribution system comprising one or more subsystems selected from the group consisting of (a) a flow-partitioning subsystem having operational capability for providing a different flow rate to each of the four or more reactors, the flow-partitioning subsystem comprising at least one set of four or more flow restrictors integral with a substrate or with one or more microchip bodies mounted on a substrate, wherein each reactor of the four or more reactors is in fluid communication with at least one different flow restrictor from the set of four or more flow restrictors than the other reactors.

(b) a pressure-partitioning subsystem having operational capability for providing a different reaction pressure in the reaction cavity of each of the four or more reactors, the pressure-partitioning subsystem comprising at least one set of four or more flow restrictors integral with a substrate or with one or more microchip bodies mounted on a substrate, wherein each reactor of the four or more reactors is in fluid communication with at least one different flow restrictor from the set of four or more flow restrictors than the other reactors, and (c) a feed-composition subsystem for having operational capability providing a different feed composition to each of the four or more reactors, the feed-composition subsystem comprising four or more mixing zones, each mixing zone in fluid communication with an inlet port of a different reactor of the four or more reactors and at least two sets of four or more flow restrictors, a first of the two sets of flow restrictors in fluid communication with a first reactant source and the four or more mixing zones so that each of the four or more mixing zones is in fluid communication with the first reactant source through at least one flow restrictor of the first set of flow restrictors, a second of the two sets of flow restrictors in fluid communication with a second reactant source and the four or more mixing zones so that each of the four or more mixing zones is in fluid communication with the second reactant source through at least one flow restrictor of the second set of flow restrictors, each of the four or more flow restrictors in a set providing a resistance to flow between the or more reactant sources and one of the four or more mixing zones, the four or more flow restrictors being integral with a substrate or with one or more microchip bodies mounted on a substrate.

21. The reaction system of claim 1 or 20 further comprising a temperature-control subsystem having operational capability for providing a different reaction temperature in the reaction cavity of each of the four or more reactors.

22. The reaction systems of claims 1 or 20 wherein when the fluid distribution system comprises a flow-partitioning subsystem or a pressure-partitioning subsystem, the flow restrictors are four or more inlet flow restrictors, each of the four or more inlet flow restrictors providing fluid communication between at least one reactant source and one of the four or more reactors, each of the four or more inlet flow restrictors having a flow resistance that varies relative to other inlet flow restrictors in the set, and when the fluid distribution system comprises a feed-composition subsystem, the fluid distribution system further comprises a set of four or more inlet flow restrictors, each of the four or more inlet flow restrictors providing fluid communication between at least one reactant source and one of the four or more reactors, each of the four or more inlet flow restrictors having a flow resistance that varies relative to other inlet flow restrictors in the set.

23. The reaction systems of claims 1 or 20 wherein when the fluid distribution system comprises a flow-partitioning subsystem or a pressure-partitioning subsystem, the flow restrictors are four or more outlet flow restrictors, each of the four or more outlet flow restrictors providing fluid communication between one of the four or more reactors and at least one effluent sink, each of the four or more outlet flow restrictors having a flow resistance that varies relative to other outlet flow restrictors in the set and when the fluid distribution system comprises a feed-composition subsystem, the fluid distribution system further comprises a set of four or more outlet flow restrictors, each of the four or more outlet flow restrictors providing fluid communication between one of the four or more reactors and at least one effluent sink, each of the four or more outlet flow restrictors having a flow resistance that varies relative to other outlet flow restrictors in the set.

24. The reaction systems of claims 1 or 20 wherein when the fluid distribution system comprises a flow-partitioning subsystem or a pressure-partitioning subsystem, the flow restrictors are a first set of four or more inlet flow restrictors, each of the four or more inlet flow restrictors providing fluid communication between at least one reactant source and one of the four or more reactors, each of the four or more inlet flow restrictors having a flow resistance that varies relative to other inlet flow restrictors in the set, and when the fluid distribution system comprises a feed-composition subsystem, the fluid distribution system further comprises a first set of four or more inlet flow restrictors, each of the four or more inlet flow restrictors providing fluid communication between at least one reactant source and one of the four or more reactors, each of the four or more inlet flow restrictors having a flow resistance that varies relative to other inlet flaw restrictors in the set, the fluid distribution further comprising
a second set of four or more outlet flow restrictors, each of the four or more outlet flow restrictors providing fluid communication between one of the four or more reactors and at least one effluent sink, each of the four or more outlet flow restrictors having a flow resistance that varies relative to other outlet flow restrictors in the set.

25. The reaction system of claims 1 or 20 further comprising a detection system in fluid communication with the outlet ports of the four or more reactors for detecting at least one reaction product or unreacted reactant from the effluent discharged from each of the four or more reactors.

26. The reaction system of claims 1 or 20 further comprising a parallel detection system in fluid communication with the outlet ports of the four or more reactors for simultaneously detecting at least one reaction product or unreacted reactant from the effluent discharged from each of the four or more reactors.

27. The reaction system of claims 1 or 20 further comprising a parallel gas chromatograph in fluid communication with the outlet ports of the four or more reactors for simultaneously detecting at least one reaction product or unreacted reactant from the effluent discharged from each of the four or more reactors.

28. A parallel flow reaction system for effecting four or more simultaneous reactions in four or more reaction channels, the reaction system comprising
four or more reactors, each of the four or more reactors comprising a surface defining a reaction cavity for carrying out a chemical reaction, an inlet port in fluid communication with the reaction cavity, and an outlet port in fluid communication with the reaction cavity, and
a fluid distribution system for simultaneously supplying one or more reactants from one or more reactant sources to the inlet port of the reaction cavity for each of the four or more reactors, and for discharging a reactor effluent from the outlet port of each such reaction cavity to one or more effluent sinks, the fluid distribution system comprising a flow-partitioning subsystem for providing a different flow rate to each of the four or more reactors, the flow-partitioning subsystem comprising at least one set of four or more passive inlet or outlet flow restrictors, each of the four or more inlet or outlet flow restrictors having a flow resistance that varies relative to other flow restrictors in the set wherein each reactor of the four or more reactors is in fluid communication with at least one different flow restrictor from the set of four or more flow restrictors than the other reactor.

29. The reaction system of claim 28 wherein the flow restrictors of the flow-partitioning subsystem are a set of four or more inlet flow restrictors, each of the four or more inlet flow restrictors providing fluid communication between at least one reactant source and one of the four or more reactors, each of the four or more inlet flow restrictors having a flow resistance that varies relative to other inlet flow restrictors in the set.

30. The reaction system of claim 29 wherein the set of four or more inlet flow restrictors are integral with a substrate or with one or more microchip bodies mounted on a substrate.

31. The reaction system of claim 29 wherein the flow restrictors are microfluidic channels.

32. The reaction system of claim 29 wherein the flow restrictors are capillaries.

33. The reaction system of claim 29 wherein the flow resistance of each of the four or more inlet flow restrictors varies relative to other inlet flow restrictors in the set by a common factor.

34. The reaction system of claim 29 wherein the flow-partitioning subsystem comprises
a first plurality of selectable dedicated inlet flow restrictors having different flow resistances, and providing selectable fluid communication between the at least one reactant source and a first reactor of the four or more reactors,
a second plurality of selectable dedicated inlet flow restrictors having different flow resistances, and providing selectable fluid communication between the at least one reactant source and a second reactor of the four or more reactors,
a third plurality of selectable dedicated inlet flow restrictors having different flow resistances, and providing selectable fluid communication between the at least one reactant source and a third reactor of the four or more reactors,
a fourth plurality of selectable dedicated inlet flow restrictors having different flaw resistances, and providing selectable fluid communication between the at least one reactant source and a fourth reactor of the four or more reactors, and
a means for selecting at least one flow restrictor from each of the first plurality, the second plurality, the third plurality and the fourth plurality of selectable dedicated inlet flow restrictors to form the set of four or more inlet flow restrictors.

35. The reaction system of claim 34 wherein the first plurality, the second plurality, the third plurality and the fourth plurality of selectable dedicated inlet flow restrictors are integral with a substrate or with one or more microchip bodies mounted on a substrate.

36. The reaction system of claim 34 wherein the first plurality, the second plurality, the third plurality and the fourth plurality of selectable dedicated inlet flow restrictors are integral with one or more microchip bodies mounted on a substrate.

37. The reaction system of claim 34 wherein the first plurality, the second plurality, the third plurality and the fourth plurality of selectable dedicated inlet flow restrictors are integral with one or more microchip bodies detachably mounted on a substrate.

38. The reaction system of claim 34 wherein the selection means comprises four or more inlet selection valves for selecting at least one flow restrictor from each of the first plurality, the second plurality, the third plurality and the fourth plurality of selectable dedicated inlet flow restrictors to form the set of four or more inlet flow restrictors.

39. The reaction system of claim 34 wherein the selection means comprises a first plurality of inlet isolation valves for selecting at least one flow restrictor from the first plurality of selectable dedicated inlet flow restrictors, a second plurality of inlet isolation valves for selecting at least one flow restrictor from the second plurality of selectable dedicated inlet flow restrictors, a third plurality of inlet isolation valves for selecting at least one flow restrictor from the third plurality of selectable dedicated inlet flow restrictors, and a fourth plurality of inlet isolation valves for selecting at least one flow restrictor from the fourth plurality of selectable dedicated inlet flow restrictors.

40. The reaction system of claim 39 wherein the first plurality of inlet isolation valves, the second plurality of inlet isolation valves, the third plurality of inlet isolation valves and the fourth plurality of inlet isolation valves of the inlet isolation valve array are integral with a substrate or with one or more microchip bodies mounted on the substrate.

41. The reaction system of claim 39 wherein the first plurality, the second plurality, the third plurality and the fourth plurality of selectable dedicated inlet flow restrictors are integral with a substrate or with one or more microchip bodies mounted on the substrate.

42. The reaction system of claim 39 wherein
the first plurality of inlet isolation valves, the second plurality of inlet isolation valves, the third plurality of inlet isolation valves and the fourth plurality of inlet isolation valves are integral with a substrate or with one or more microchip bodies mounted on a substrate, and
the first plurality, the second plurality, the third plurality and the fourth plurality of selectable dedicated inlet flow restrictors are integral with a substrate or with one or more microchip bodies mounted on a substrate.

43. The reaction system of claim 29 wherein the flow-partitioning subsystem comprises a series of selectable sets of inlet flow restrictors, the inlet-set series comprising
a first set of four or more inlet flow restrictors comprising first, second, third and fourth inlet flow restrictors providing fluid communication between at least one reactant source and first, second, third and fourth reactors, respectively, each of the first, second, third and fourth inlet flow restrictors of the first set having a different flow resistance relative to each other,
a second set of four or more inlet flow restrictors comprising first, second, third and fourth inlet flow restrictors providing fluid communication between the least one reactant source and the first, second, third and fourth reactors, respectively, each of the first, second, third and fourth inlet flow restrictors of the second set having a different flow resistance relative to each other, the flow resistance of at least one of the four or more inlet flow restrictors of the second set varying from the flow resistance of the corresponding inlet flow restrictor of the first set, and
a means for selecting the first set or the second set of inlet flow restrictors to provide fluid communication between the at least one reactant source and the four or more reactors.

44. The reaction system of claim 43 wherein the first set of four or more inlet flow restrictors and the second set of four or more inlet flow restrictors are integral with a substrate or with one or more microchip bodies mounted on a substrate.

45. The reaction system of claim 43 wherein the first set of four or more inlet flow restrictors and the second set of four or more inlet flow restrictors are integral with one or more microchip bodies mounted on a substrate.

46. The reaction system of claim 43 wherein the first set of four or more inlet flow restrictors and the second set of four or more inlet flow restrictors are integral with one or more microchip bodies detachably mounted on a substrate.

47. The reaction system of claim 43 wherein the selection means comprises an inlet selection valve for selecting at least one the first set of inlet flow restrictors or the second set of inlet flow restrictors.

48. The reaction system of claim 43 wherein the selection means comprises a series of inlet isolation valves, the inlet-isolation-valve series comprising a first inlet isolation valve for selecting the first set of inlet flow restrictors, and a second inlet isolation valve for selecting the second set of inlet flow restrictors.

49. The reaction system of claim 48 wherein the first inlet isolation valve and the second inlet isolation valve of the inlet-isolation-valve series are integral with a substrate or with one or more microchip bodies mounted on a substrate.

50. The reaction system of claim 48 wherein the first set of four or more inlet flow restrictors and the second set of four or more inlet flow restrictors of the inlet-set series are integral with a substrate or with one or more microchip bodies mounted on a substrate.

51. The reaction system of claim 48 wherein
the first inlet isolation valve and the second inlet isolation valve of the inlet-isolation valve series are integral with a substrate or with one or more microchip bodies mounted on a substrate, and
the first set of four or more inlet flow restrictors and the second set of four or more inlet flow restrictors of the inlet-set array are integral with a substrate or with one or more microchip bodies mounted on a substrate.

52. The reaction system of claim 28 wherein the flow restrictors of the flow-partitioning subsystem are a set of four or more outlet flow restrictors, each of the four or more outlet flow restrictors providing fluid communication between one of the four or more reactors and at least one effluent sink, each of the four or more outlet flow restrictors having a flow resistance that varies relative to other outlet flow restrictors in the set.

53. The reaction system of claim 52 wherein the set of four or more outlet flow restrictors are integral with a substrate or with one or more microchip bodies mounted on a substrate.

54. The reaction system of claim 52 wherein the flow restrictors are microfluidic channels.

55. The reaction system of claim 52 wherein the flow restrictors are capillaries.

56. The reaction system of claim 52 wherein the flow resistance of each of the four or more outlet flow restrictors varies relative to other outlet flow restrictors in the set by a common factor.

57. The reaction system of claim 52 wherein the flow-partitioning subsystem comprises
a first plurality of selectable dedicated outlet flow restrictors having different flow resistances, and providing selectable fluid communication between a first reactor of the four or more reactors and the at least one effluent sink,
a second plurality of selectable dedicated outlet flow restrictors having different flow resistances, and providing selectable fluid communication between a second reactor of the four or more reactors and the at least one effluent sink,
a third plurality of selectable dedicated outlet flow restrictors having different flow resistances, and providing selectable fluid communication between a third reactor of the four or more reactors and the at least one effluent sink,
a fourth plurality of selectable dedicated outlet flow restrictors having different flow resistances, and providing selectable fluid communication between a fourth reactor of the four or more reactors and the at least one effluent sink, and
a means for selecting at least one flow restrictor from each of the first plurality, the second plurality, the third plurality and the fourth plurality of selectable dedicated outlet flow restrictors to form the set of four or more outlet flow restrictors.

58. The reaction system of claim 57 wherein the first plurality, the second plurality, the third plurality and the fourth plurality of selectable dedicated outlet flow restrictors are integral with a substrate or with one or more microchip bodies mounted on a substrate.

59. The reaction system of claim 57 wherein the first plurality, the second plurality, the third plurality and the fourth plurality of selectable dedicated outlet flow restrictors are integral with one or more microchip bodies mounted on a substrate.

60. The reaction system of claim 57 wherein the first plurality, the second plurality the third plurality and the fourth plurality of selectable dedicated outlet flow restrictors are integral with one or more microchip bodies detachably mounted on the substrate.

61. The reaction system of claim 57 wherein the selection means comprises four or more outlet selection valves for selecting at least one flow restrictor from each of the first plurality, the second plurality, the third plurality and the fourth plurality of selectable dedicated outlet flow restrictors to form the set of four or more outlet flow restrictors.

62. The reaction system of claim 57 wherein the selection means comprises a first plurality of outlet isolation valves for selecting at least one flow restrictor from the first plurality of selectable dedicated outlet flow restrictors, a second plurality of outlet isolation valves for selecting at least one flow restrictor from the second plurality of selectable dedicated outlet flow restrictors, a third plurality of outlet isolation valves for selecting at least one flow restrictor from the third plurality of selectable dedicated outlet flow restrictors, and a fourth plurality of outlet isolation valves for selecting at least one flow restrictor from the fourth plurality of selectable dedicated outlet flow restrictors.

63. The reaction system of claim 62 wherein the first plurality of outlet isolation valves the second plurality of outlet isolation valves, the third plurality of outlet isolation valves and the fourth plurality of outlet isolation valves are integral with a substrate or with one or more microchip bodies mounted on a substrate.

64. The reaction system of claim 62 wherein the first plurality, the second plurality, the third plurality and the fourth plurality of selectable dedicated outlet flow restrictors are integral with a substrate or with one or more microchip bodies mounted on a substrate.

65. The reaction system of claim 62 wherein the first plurality of outlet isolation valves, the second plurality of outlet isolation valves, the third plurality of outlet isolation valves and the fourth plurality of outlet isolation valves are integral with a substrate or with one or more microchip bodies mounted on a substrate, and
the first plurality, the second plurality, the third plurality and the fourth plurality of selectable dedicated outlet flow restrictors are integral with a substrate or with one or more microchip bodies mounted on the substrate.

66. The reaction system of claim 52 wherein the flow-partitioning subsystem comprises a series of selectable sets of outlet flow restrictors, the outlet-set series comprising
a first set of four or more outlet flow restrictors comprising first, second, third and fourth outlet flow restrictors providing fluid communication between first, second, third and fourth reactors, respectively, and at least one effluent sink, each of the first second, third and fourth outlet flow restrictors of the first set having a different flow resistance relative to each other,
a second set of four or more outlet flow restrictors comprising first, second, third and fourth outlet flow restrictors providing fluid communication between the first, second, third and fourth reactors, respectively, an the at least one effluent sink, each of the first, second, third and fourth outlet flow restrictors of the second set having a different flow resistance relative to each other, the flow resistance of at least one of the four or more outlet flow restrictors of the second set varying from the flow resistance of the corresponding outlet flow restrictor of the first set, and
a means for selecting the first set or the second set of outlet flow restrictors to provide fluid communication between the four or more reactors and the at least one effluent sink.

67. The reaction system of claim 66 wherein the first set of four or more outlet flow restrictors and the second set of four or more outlet flow restrictors are integral with a substrate or with one or more microchip bodies mounted on a substrate.

68. The reaction system of claim 66 wherein the first set of four or more outlet flow restrictors and the second set of four or more outlet flow restrictors are integral with one or more microchip bodies mounted on a substrate.

69. The reaction system of claim 66 wherein the first set of four or more outlet flow restrictors and the second set of four or more outlet flow restrictors are integral with one or more microchip bodies detachably mounted on a substrate.

70. The reaction system of claim 66 wherein the selection means comprises an outlet selection valve for selecting at least one the first set of outlet flow restrictors or the second set of outlet flow restrictors.

71. The reaction system of claim 66 wherein the selection means comprises a series of outlet isolation valves, the outlet-isolation valve series comprising a first outlet isolation valve for selecting the first set of outlet flow restrictors, and a second outlet isolation valve for selecting the second set of outlet flow restrictors.

72. The reaction system of claim 71 wherein the first outlet isolation valve and the second outlet isolation valve of the outlet-isolation-valve series are integral with a substrate or with one or more microchip bodies mounted on a substrate.

73. The reaction system of claim 71 wherein the first set of four or more outlet flow restrictors and the second set of four or more outlet flow restrictors of the outlet-set series are integral with a substrate or with one or more microchip bodies mounted on a substrate.

74. The reaction system of claim 71 wherein
the first outlet isolation valve and the second outlet isolation valve of the outlet-isolation valve series are integral with a substrate or with one or more microchip bodies mounted on a substrate, and
the first set of four or more inlet flow restrictors and the second set of four or more inlet flow restrictors are integral with a substrate or with one or microchip bodies mounted on a substrate.

75. The reaction system of claim 28 wherein the flow restrictors of the flow-partitioning subsystem are
a first set of four or more inlet flow restrictors, each of the four or more inlet flow restrictors providing fluid communication between at least one reactant source and one of the four or more reactors, each of the four or more inlet flow restrictors having a flow resistance that varies relative to other inlet flow restrictors in the set, the flow-partitioning subsystem further comprising a second set of four or more outlet flow restrictors, each of the four or more outlet flow restrictors providing fluid communication between one of the four or more reactors and at least one effluent sink, each of the four or more outlet flow restrictors having a flow resistance that varies relative to other outlet flow restrictors in the set.

76. The reaction system of claim 75 wherein
the set of four or more inlet flow restrictors are integral with a substrate or with one or more microchip bodies mounted on a substrate, and
the set of four or more outlet flow restrictors are integral with a substrate or with one or more microchip bodies mounted on a substrate.

77. The reaction system of claim 75 wherein the flow restrictors are microfluidic channels.

78. The reaction system of claim 75 wherein the flow restrictors are capillaries.

79. The reaction system of claim 75 wherein the flow resistance of each of the four or more inlet flow restrictors varies relative to other inlet flow restrictors in the set by a factor of two, and the flow resistance of each of the four or more outlet flow restrictors varies relative to other outlet flow restrictors in the set by a factor of two.

80. The reaction system of claim 75 wherein the flow-partitioning subsystem comprises
a first plurality of selectable dedicated inlet flow restrictors having different flow resistances, and providing selectable fluid communication between the at least one reactant source and a first reactor of the four or more reactors,
a second plurality of selectable dedicated inlet flow restrictors having different flow resistances, and providing selectable fluid communication between the at least one reactant source and a second reactor of the four or more reactors,
a third plurality of selectable dedicated inlet flow restrictors baying different flow resistances, and providing selectable fluid communication between the at least one reactant source and a third reactor of the four or more reactors,
a fourth plurality of selectable dedicated inlet flow restrictors having different flow resistances, and providing selectable fluid communication between the at least one reactant source and a fourth reactor of the four or more reactors, and
a first means for selecting at least one flow restrictor from each of the first plurality, the second plurality, the third plurality and the fourth plurality of selectable dedicated inlet flow restrictors to form the set of four or more inlet flow restrictors.
a first plurality of selectable dedicated outlet flow restrictors having different flow resistances, and providing selectable fluid communication between the first reactor and the at least one effluent sink,
a second plurality of selectable dedicated outlet flow restrictors having different flow resistances, and providing selectable fluid communication between the second reactor and the at least one effluent sink,
a third plurality of selectable dedicated outlet flow restrictors having different flow resistances, and providing selectable fluid communication between the third reactor and the at least one effluent sink,
a fourth plurality of selectable dedicated outlet flow restrictors having different flow resistances, and providing selectable fluid communication between the fourth reactor and the at least one effluent sink, and
a second means for selecting at least one flow restrictor from each of the first plurality, the second plurality, the third plurality and the fourth plurality of selectable dedicated outlet flow restrictors to form the set of four or more outlet flow restrictors.

81. The reaction system of claim 80 wherein
the first plurality, the second plurality, the third plurality and the fourth plurality of selectable dedicated inlet flow restrictors are integral with a substrate or with one or more microchip bodies mounted on the substrate, and
the first plurality, the second plurality, the third plurality and the fourth plurality of selectable dedicated outlet flow restrictors are integral with a substrate or with one or more microchip bodies mounted on a substrate.

82. The reaction system of claim 80 wherein
the first plurality, the second plurality, the third plurality and the fourth plurality of selectable dedicated inlet flow restrictors are integral with one or more microchip bodies mounted on a substrate, and
the first plurality, the second plurality, the third plurality and the fourth plurality of selectable dedicated outlet flow restrictors are integral with one or more microchip bodies mounted on a substrate.

83. The reaction system of claim 80 wherein
the first plurality, the second plurality, the third plurality and the fourth plurality of selectable dedicated inlet flow restrictors are integral with one or more microchip bodies detachably mounted on the substrate, and
the first plurality, the second plurality, the third plurality and the fourth plurality of selectable dedicated outlet flow restrictors are integral with one or more microchip bodies detachably mounted on the substrate.

84. The reaction system of claim 80 wherein the first selection means comprises
four or more inlet selection valves for selecting at least one flow restrictor from each of the first plurality, the second plurality, the third plurality and the fourth plurality of selectable dedicated inlet flow restrictors to form the set of four or more inlet flow restrictors, and the second selection means comprises
four or more outlet selection valves for selecting at least one flow restrictor from each of the first plurality, the second plurality, the third plurality and the fourth plurality of selectable dedicated outlet flow restrictors to form the set of four or more outlet flow restrictors.

85. The reaction system of claim 80 wherein the first selection means comprises
a first plurality of inlet isolation valves for selecting at least one flow restrictor from the first plurality of selectable dedicated inlet flow restrictors, a second plurality of inlet isolation valves for selecting at least one flow restrictor from the second plurality of selectable dedicated inlet flow restrictors, a thirds plurality of inlet isolation valves for selecting at least one flow restrictor from the third plurality of selectable dedicated inlet flow restrictors, a fourth plurality of inlet isolation valves for selecting at least one flow restrictor from the fourth plurality of selectable dedicated inlet flow restrictors, and the second selection means comprises
a first plurality of outlet isolation valves for selecting at least one flow restrictor from the first plurality of selectable dedicated outlet flow restrictors, a second plurality of outlet isolation valves for selecting at least one flow restrictor from the second plurality of selectable dedicated outlet flow restrictors, a third plurality of outlet isolation valves for selecting at least one flow restrictor from the third plurality of selectable dedicated outlet flow restrictors, and a fourth plurality of outlet isolation valves for selecting at least one flow restrictor from the fourth plurality of selectable dedicated outlet flow restrictors.

86. The reaction system of claim 85 wherein
the first plurality of inlet isolation valves, the second plurality of inlet isolation valves, the third plurality of inlet isolation valves and the fourth plurality of inlet isolation valves are integral with a substrate or with one or more microchip bodies mounted on a substrate, and
the first plurality of outlet isolation valves, the second plurality of outlet isolation valves, the third plurality of outlet isolation valves and the fourth plurality of outlet isolation valves are integral with a substrate or with one or more microchip bodies mounted on a substrate.

87. The reaction system of claim 85 wherein
the first plurality, the second plurality, the third plurality and the fourth plurality of selectable dedicated inlet flow restrictors are integral with a substrate or with one or more microchip bodies mounted on a substrate, and
the first plurality, the second plurality, the third plurality and the fourth plurality of selectable dedicated outlet flow restrictors are integral with a substrate or with one or more microchip bodies mounted on a substrate.

88. The reaction system of claim 85 wherein
the first plurality of inlet isolation valves, the second plurality of inlet isolation valves, the third plurality of inlet isolation valves and the fourth plurality of inlet isolation valves are integral with a substrate or with one or more microchip bodies mounted on a substrate,
the first plurality of outlet isolation valves, the second plurality of outlet isolation valves, the third plurality of outlet isolation valves and the fourth plurality of outlet isolation valves are integral with a substrate or with one or more microchip bodies mounted on a substrate,
the first plurality, the second plurality, the third plurality and the fourth plurality of selectable dedicated inlet flow restrictors are integral with a substrate or with one or more microchip bodies mounted on a substrate, and
the first plurality, the second plurality, the third plurality and the fourth plurality of selectable dedicated outlet flow restrictors are integral with a substrate or with one or more microchip bodies mounted on a substrate.

89. The reaction system of claim 75 wherein the flow-partitioning subsystem comprises
a series of selectable sets of inlet flow restrictors, the inlet-set series comprising (a) a first set of four or more inlet flow restrictors comprising first, second, third and fourth inlet flow restrictors providing fluid communication between at least one reactant source and first, second, third and fourth reactors, respectively, each of the first, second, third and fourth inlet flow restrictors of the first set having a different flow resistance relative to each other, (b) a second set of four or more inlet flow restrictors comprising first, second, third and fourth inlet flow restrictors providing fluid communication between the least one reactant source and the first, second, third and fourth reactors, respectively, each of the first, second, third and fourth inlet flow restrictors of the second set having a different flow resistance relative to each other, the flow resistance of at least one of the four or more inlet flow restrictors of the second set varying from the flow resistance of the corresponding inlet flow restrictor of the first set, and (c) a first means for selecting the first set or the second set of inlet flow restrictors to provide fluid communication between the at least one reactant source and the four or more reactors, and
a series of selectable sets of outlet flow restrictors, the outlet-set series comprising (a) a first set of four or more outlet flow restrictors comprising first, second, third and fourth outlet flow restrictors providing fluid communication between first, second, third and fourth reactors, respectively, and at least one effluent sink, each of the first, second, third and fourth outlet flow restrictors of the first set having a different flow resistance relative to each other, and (b) a second set of four or more outlet flow restrictors comprising first, second, third and fourth outlet flow restrictors providing fluid communication between the first, second, third and fourth reactors, respectively, an the at least one effluent sink, each of the first, second, third and fourth outlet flow restrictors of the second set having a different flow resistance relative to each other, the flow resistance of at least one of the four or more outlet flow restrictors of the second set varying from the flow resistance of the corresponding outlet flow restrictor of the first set, and (c) a second means for selecting the first set or the second set of outlet flow restrictors to provide fluid communication between the four or more reactors and the at least one effluent sink.

90. The reaction system of claim 89 wherein
the first set of four or more inlet flow restrictors and the second set of four or more inlet flow restrictors are integral with a substrate or with one or more microchip bodies mounted on a substrate, and
the first set of four or more outlet flow restrictors and the second set of four or more outlet flow restrictors are integral with a substrate or with one or more microchip bodies mounted on a substrate.

91. The reaction system of claim 89 wherein
the first set of four or more inlet flow restrictors and the second set of four or more inlet flow restrictors are integral with one or more microchip bodies mounted on a substrate, and
the first set of four or more outlet flow restrictors and the second set of four or more outlet flow restrictors are integral with one or more microchip bodies mounted on a substrate.

92. The reaction system of claim 89 wherein
the first set of four or more inlet flow restrictors and the second set of four or more inlet flow restrictors are integral with one or more microchip bodies detachably mounted on a substrate, and
the first set of four or more outlet flow restrictors and the second set of four or more outlet flow restrictors are integral with one or more microchip bodies detachably mounted on a substrate.

93. The reaction system of claim 89 wherein the first selection means comprises
an inlet selection valve for selecting at least one the first set of inlet flow restrictors or the second set of inlet flow restrictors, and
the second selection means comprises an outlet selection valve for selecting at least one the first set of outlet flow restrictors or the second set of outlet flow restrictors.

94. The reaction system of claim 89 wherein the first selection means comprises
a series of inlet isolation valves, the inlet-valve series comprising a first inlet isolation valve for selecting the first set of inlet flow restrictors, and a second inlet isolation valve for selecting the second set of inlet flow restrictors, and the second selection means comprises a series of outlet isolation valves, the outlet-valve series comprising a first outlet isolation valve for selecting the first set of outlet flow restrictors, and a second outlet isolation valve for selecting the second set of outlet flow restrictors.

95. The reaction system of claim 94 wherein the first inlet isolation valve and the second inlet isolation valve of the inlet-isolation-valve series are integral with a substrate or with one or more microchip bodies mounted on a substrate, and the first outlet isolation valve and the second outlet isolation valve of the outlet-isolation-valve series are integral with a substrate or with one or more microchip bodies mounted on a substrate.

96. The reaction system of claim 94 wherein the first set of four or more inlet flow restrictors and the second set of four or more inlet flow restrictors of the inlet-set series are integral with a substrate or with one or more microchip bodies mounted on a substrate, and the first set of four or more outlet flow restrictors and the second set of four or more outlet flow restrictors of the outlet-set series are integral with a substrate or with one or more microchip bodies mounted on a substrate.

97. The reaction system of claim 94 wherein the first inlet isolation valve and the second inlet isolation valve of the inlet-isolation valve series are integral with a substrate or with one or more microchip bodies mounted on a substrate, the first outlet isolation valve and the second outlet isolation valve of the outlet-isolation-valve series are integral with a substrate or with one or more microchip bodies mounted on a substrate, the first set of four or more inlet flow restrictors and the second set of four or more inlet flow restrictors of the inlet-set any are integral with a substrate or with one or more microchip bodies mounted on a substrate, and the first set of four or more outlet flow restrictors and the second set of four or more outlet flow restrictors of the outlet-set series are integral with a substrate or with one or more microchip bodies mounted on a substrate.

98. The reaction system of claim 28 wherein the flow restrictors of the flow-partitioning subsystem are a first set of four or more inlet flow restrictors, each of the four or more inlet flow restrictors providing fluid communication between at least one reactant source and one of the four or more reactors, each of the four or more inlet flow restrictors having a flow resistance, $R_{inlet}$, that varies relative to other inlet flow restrictors in the set, the fluid distribution system further comprising a second set of four or more outlet flow restrictors, each of the four or more outlet flow restrictors providing fluid communication between one of the four or more reactors and at least one effluent sink, each of the four or more outlet flow restrictors having a flow resistance, $R_{outlet}$, that varies relative to other outlet flow restrictors in the set, the total resistance of the inlet and outlet flow restrictors for each channel, $R_{total}=R_{inlet}+R_{outlet}$, varying between each of the four or more channels of the reaction system to provide a different flowrate through each of the four or more reactors, and the ratio of the resistances of the inlet and outlet flow restrictors for each channel, $R_{inlet}$:

$R_{outlet}$, being substantially the same between each of the four or more channels of the reaction system to provide substantially the same pressure in the reaction cavities of each of the four or more reactors.

99. The reaction system of claim 98 wherein the flow restrictors are microfluidic channels.

100. The reaction system of claim 98 wherein the flow restrictors are capillaries.

101. The reaction system of claim 98 wherein the flow resistance of each of the four or more inlet flow restrictors varies relative to other inlet flow restrictors in the set by a common factor, and the flow resistance of each of the four or more outlet flow restrictors varies relative to other outlet flow restrictors in the set by a common factor.

102. A parallel flow reaction system for effecting four or more simultaneous reactions in four or more reaction channels, the reaction system comprising four or more reactors, each of the four or more reactors comprising a surface defining a reaction cavity for carrying out a chemical reaction, an inlet port in fluid communication with the reaction cavity, and an outlet port in fluid communication with the reaction cavity, and a fluid distribution system for simultaneously supplying one or more reactants from one or more reactant sources to the inlet port of the reaction cavity for each of the four or more reactors, and for discharging a reactor effluent from the outlet port of each such reaction cavity to one or more effluent sinks, the fluid distribution system comprising a pressure-partitioning subsystem for providing a different reaction pressure in the reaction cavity of each of the four or more reactors, the pressure-partitioning subsystem comprising at least one set of four or more passive inlet or outlet flow restrictors, wherein each reactor of the four or more reactors is in fluid communication with at least one different passive flow restrictor from the set of four or more passive inlet or outlet flow restrictors than the other reactors, each of the four or more inlet or outlet flow restrictors having a flow resistance that varies relative to other flow restrictors in the set.

103. The reaction system of claim 102 wherein the flow restrictors of the pressure-partitioning subsystem are a set of four or more inlet flow restrictors, each of the four or more inlet flow restrictors providing fluid communication between at least one reactant source and one of the four or more reactors, each of the four or more inlet flow restrictors having a flow resistance that varies relative to other inlet flow restrictors in the set.

104. The reaction system of claim 103 wherein the set of four or more inlet flow restrictors are integral with a substrate or with one or more microchip bodies mounted on a substrate.

105. The reaction system of claim 103 wherein the flow restrictors are microfluidic channels.

106. The reaction system of claim 103 wherein the flow restrictors are capillaries.

107. The reaction system of claim 103 wherein the flow resistance of each of the four or more inlet flow restrictors varies relative to other inlet flow restrictors in the set by a common factor.

108. The reaction system of claim 103 wherein the pressure-partitioning subsystem comprises a first plurality of selectable dedicated inlet flow restrictors having different flow resistances, and providing selectable fluid communication between the at least one reactant source and a first reactor of the four or more reactors,
a second plurality of selectable dedicated inlet flow restrictors having different flow resistances, and providing selectable fluid communication between the at least one reactant source and a second reactor of the four or more reactors,
a third plurality of selectable dedicated inlet flow restrictors having different flow resistances, and providing selectable fluid communication between the at least one reactant source and a third reactor of the four or more reactors,
a fourth plurality of selectable dedicated inlet flow restrictors having different flow resistances, and providing selectable fluid communication between the at least one reactant source and a fourth reactor of the four or more reactors, and
a means for selecting at least one flow restrictor from each of the first plurality, the second plurality. the third plurality and the fourth plurality of selectable dedicated inlet flow restrictors to form the set of four or more inlet flow restrictors.

109. The reaction system of claim 108 wherein the first plurality, the second plurality, the third plurality and the fourth plurality of selectable dedicated inlet flow restrictors are integral with a substrate or with one or more microchip bodies mounted on a substrate.

110. The reaction system of claim 108 wherein the first plurality, the second plurality, the third plurality and the fourth plurality of selectable dedicated inlet flow restrictors are integral with one or more microchip bodies mounted on a substrate.

111. The reaction system of claim 108 wherein the first plurality, the second plurality, the third plurality and the fourth plurality of selectable dedicated inlet flow restrictors are integral with one or the microchip bodies detachably mounted on a substrate.

112. The reaction system of claim 108 wherein the selection means comprises four or more inlet selection valves for selecting at least one flow restrictor from each of the first plurality, the second plurality, the third plurality and the fourth plurality of selectable dedicated inlet flow restrictors to form the set of four or more inlet flow restrictors.

113. The reaction system of claim 108 wherein the selection means comprises a first plurality of inlet isolation valves for selecting at least one flow restrictor from the first plurality of selectable dedicated inlet flow restrictors, a second plurality of inlet isolation valves for selecting at least one flow restrictor from the second plurality of selectable dedicated inlet flow restrictors, a third plurality of inlet isolation valves for selecting at least one flow restrictor from the third plurality of selectable dedicated inlet flow restrictors, and a fourth plurality of inlet isolation valves for selecting at least one flow restrictor from the fourth plurality of selectable dedicated inlet flow restrictors.

114. The reaction system of claim 113 wherein the first plurality of inlet isolation valves, the second plurality of inlet isolation valves, the third plurality of inlet isolation valves and the fourth plurality of inlet isolation valves are integral with a substrate or with one or more microchip bodies mounted on a substrate.

115. The reaction system of claim 113 wherein the first plurality, the second plurality, the third plurality and the fourth plurality of selectable dedicated inlet flow restrictors are integral with a substrate or with one or more microchip bodies mounted on a substrate.

116. The reaction system of claim 113 wherein the first plurality of inlet isolation valves, the second plurality of inlet isolation valves, the third plurality of inlet isolation valves and the fourth plurality of inlet isolation valves are integral with a substrate or with one or more microchip bodies mounted on a substrate, and
the first plurality, the second plurality, the third plurality and the fourth plurality of selectable dedicated inlet flow restrictors are integral with a substrate or with one or more microchip bodies mounted on a substrate.

117. The reaction system of claim 103 wherein the pressure-partitioning subsystem comprises a series of selectable sets of inlet flow restrictors, the series comprising
a first set of four or more inlet flow restrictors comprising first, second, third and fourth inlet flow restrictors providing fluid communication between at least one reactant source and first second, third and fourth reactors, respectively, each of the first, second, third and fourth inlet flow restrictors of the first set having a different flow resistance relative to each other,
a second set of four or more inlet flow restrictors comprising first, second, third and fourth inlet flow restrictors providing fluid communication between the least one reactant source and the first, second, third and fourth reactors, respectively, each of the first, second, third and fourth inlet flow restrictors of the second set having a different flow resistance relative to each other, the flow resistance of at least one of the four or more inlet flow restrictors of the second set varying from the flow resistance of the corresponding inlet flow restrictor of the first set, and
a means for selecting the first set or the second set of inlet flow restrictors to provide fluid communication between the at least one reactant source and the four or more reactors.

118. The reaction system of claim 117 wherein the first set of four or more inlet flow restrictors and the second set of four or more inlet flow restrictors are integral with a substrate or with one or more microchip bodies mounted on a substrate.

119. The reaction system of claim 117 wherein the first set of four or more inlet flow restrictors and the second set of four or more inlet flow restrictors are integral with one or more microchip bodies mounted on a substrate.

120. The reaction system of claim 117 wherein the first set of four or more inlet flow restrictors and the second set of four or more inlet flow restrictors are integral with one or more microchip bodies detachably mounted on a substrate.

121. The reaction system of claim 117 wherein the selection means comprises an inlet selection valve for selecting at least one the first set of inlet flow restrictors or the second set of inlet flow restrictors.

122. The reaction system of claim 117 wherein the selection means comprises a series of inlet isolation valves, the inlet-isolation valve series comprising a first inlet isolation valve for selecting the first set of inlet flow restrictors, and a second inlet isolation valve for selecting the second set of inlet flow restrictors.

123. The reaction system of claim 122 wherein the first inlet isolation valve and the second inlet isolation valve of the inlet-isolation-valve series are integral with a substrate or with one or more microchip bodies mounted on a substrate.

124. The reaction system of claim 122 wherein the first set of four or more inlet flow restrictors and the second set of four or more inlet flow restrictors of the inlet-set series are integral with a substrate or with one or more microchip bodies mounted on a substrate.

125. The reaction system of claim 122 wherein
the first inlet isolation valve and the second inlet isolation valve of the inlet-isolation valve series are integral with a substrate or with one or more microchip bodies mounted on a substrate, and
the first set of four or more inlet flow restrictors and the second set of four or more inlet flow restrictors of the inlet-set array are integral with a substrate or with one or more microchip bodies mounted on a substrate.

126. The reaction system of claim 102 wherein the flow restrictors of the pressure-partitioning subsystem are a set of four or more outlet flow restrictors, each of the four or more outlet flow restrictors providing fluid communication between one of the four or more reactors and at least one effluent sink, each of the four or more outlet flow restrictors having a flow resistance that varies relative to other outlet flow restrictors in the set.

127. The reaction system of claim 126 wherein the set of four or more outlet flow resistors are integral with a substrate or with one or more microchip bodies mounted on a substrate.

128. The reaction system of claim 126 wherein the flow restrictors are microfluidic channels.

129. The reaction system of claim 126 wherein the flow restrictors are capillaries.

130. The reaction system of claim 126 wherein the flow resistance of each of the four or more outlet flow restrictors varies relative to other outlet flow restrictors in the set by a common factor.

131. The reaction system of claim 126 wherein the pressure-partitioning subsystem comprises
a first plurality of selectable dedicated outlet flow restrictors having different flow resistances, end providing selectable fluid communication between a first reactor of the four or more reactors and the at least one effluent sink,
a second plurality of selectable dedicated outlet flow restrictors having different flow resistances, and providing selectable fluid communication between a second reactor of the four or more reactors and the at least one effluent sink,
a third plurality of selectable dedicated outlet flow restrictors having different flow resistances, and providing selectable fluid communication between a third reactor of the four or more reactors and the at least one effluent sink,
a fourth plurality of selectable dedicated outlet flow restrictors having different flow resistances, and providing selectable fluid communication between a fourth reactor of the four or more reactors and the at least one effluent sink, and
a means for selecting at least one flow restrictor from each of the first plurality, the second plurality, the third plurality and the fourth plurality of selectable dedicated outlet flow restrictors to form the set of four or more outlet flow restrictors.

132. The reaction system of claim 131 wherein the first plurality, the second plurality, the third plurality and the fourth plurality of selectable dedicated outlet flow restrictors are integral with a substrate or with one or more microchip bodies mounted on a substrate.

133. The reaction system of claim 131 wherein the first plurality, the second plurality, the third plurality and the fourth plurality of selectable dedicated outlet flow restrictors are integral with one or more microchip bodies mounted on a substrate.

134. The reaction system of claim 131 wherein the first plurality, the second plurality, the third plurality and the fourth plurality of selectable dedicated outlet flow restrictors are integral with one or more microchip bodies detachably mounted on a substrate.

135. The reaction system of claim 131 wherein the selection means comprises four or more outlet selection valves for selecting at least one flow restrictor from each of the first plurality, the second plurality, the third plurality and the fourth plurality of selectable dedicated outlet flow restrictors to form the set of four or more outlet flow restrictors.

136. The reaction system of claim 131 wherein the selection means comprises a first plurality of outlet isolation valves for selecting at least one flow restrictor from the first plurality of selectable dedicated outlet flow restrictors, a second plurality of outlet isolation valves for selecting at least one flow restrictor from the second plurality of selectable dedicated outlet flow restrictors, a third plurality of outlet isolation valves for selecting at least one flow restrictor from the third plurality of selectable dedicated outlet flow restrictors, and a fourth plurality of outlet isolation valves for selecting at least one flow restrictor from the fourth plurality of selectable dedicated outlet flow restrictors.

137. The reaction system of claim 136 wherein the first plurality of outlet isolation valves, the second plurality of outlet isolation valves, the third plurality of outlet isolation valves and the fourth plurality of outlet isolation valves are integral with a substrate or with one or more microchip bodies mounted on a substrate.

138. The reaction system of claim 136 wherein the first plurality, the second plurality, the third plurality and the fourth plurality of selectable dedicated outlet flow restrictors are integral with a substrate or with one or more microchip bodies mounted on a substrate.

139. The reaction system of claim 136 wherein
the first plurality of outlet isolation valves, the second plurality of outlet isolation valves, the third plurality of outlet isolation valves and the fourth plurality of outlet isolation valves are integral with a substrate or with one or more microchip bodies mounted on a substrate, and
the first plurality, the second plurality, the third plurality and the fourth plurality of selectable dedicated outlet flow restrictors are integral with a substrate or with one or more microchip bodies mounted on a substrate.

140. The reaction system of claim 126 wherein the pressure-partitioning subsystem comprises a series of selectable sets of outlet flow restrictors, the series comprising
a first set of four or more outlet flow restrictors comprising first, second, third and fourth outlet flow restrictors providing fluid communication between first, second, third and fourth reactors, respectively, and at least one effluent sink, each of the first, second, third and fourth outlet flow restrictors of the first set having a different flow resistance relative to each other,
a second set of four or more outlet flow restrictors comprising first second, third and fourth outlet flow restrictors providing fluid communication between the first, second, third and fourth reactors, respectively, an the at least one effluent sink, each of the first, second, third and fourth outlet flow restrictors of the second set having a different flow resistance relative to each other, the flow resistance of at least one of the four or more outlet flow restrictors of the second set varying from the flow resistance of the corresponding outlet flow restrictor of the first set, and a means for selecting the first set or the second set of outlet flow restrictors to provide fluid communication between the four or more reactors and the at least one effluent sink.

141. The reaction system of claim 140 wherein the first set of four or more outlet flow restrictors and the second set of four or more outlet flow restrictors are integral with a substrate or with one or more microchip bodies mounted on a substrate.

142. The reaction system of claim 140 wherein the first set of four or more outlet flow restrictors and the second set of four or more outlet flow restrictors are integral with one or more microchip bodies mounted on a substrate.

143. The reaction system of claim 140 wherein the first set of four or more outlet flow restrictors and the second set of four or more outlet flow restrictors are integral with one or more microchip bodies detachably mounted on a substrate.

144. The reaction system of claim 140 wherein the selection means comprises an outlet selection valve for selecting at least one the first set of outlet flow restrictors or the second set of outlet flow restrictors.

145. The reaction system of claim 140 wherein the selection means comprises a series of outlet isolation valves, the outlet-valve series comprising a first outlet isolation valve for selecting the first set of outlet flow restrictors, and a second outlet isolation valve for selecting the second set of outlet flow restrictors.

146. The reaction system of claim 145 wherein the first outlet isolation valve and the second outlet isolation valve of the outlet-isolation-valve series are integral with a substrate or with one or more microchip bodies mounted on a substrate.

147. The reaction system of claim 145 wherein the first set of four or more outlet flow restrictors and the second set of four or more outlet flow restrictors of the outlet-set series are integral with a substrate or with one or more microchip bodies mounted on a substrate.

148. The reaction system of claim 145 wherein
the first outlet isolation valve and the second outlet isolation valve of the outlet-isolation valve series are integral with a substrate or with one or more microchip bodies mounted on a substrate, and
the first set of four or more outlet flow restrictors and the second set of four or more outlet flow restrictors of the outlet-set series are integral with a substrate or with one or more microchip bodies mounted on a substrate.

149. The reaction system of claim 102 wherein the flow restrictors of the pressure-partitioning subsystem are
a first set of four or more inlet flow restrictors, each of the four or more inlet flow restrictors providing fluid communication between at least one reactant source and one of the four or more reactors, each of the four or more inlet flow restrictors having a flow resistance that varies relative to other inlet flow restrictors in the set, the pressure-partitioning system further comprising
a second set of four or more outlet flow restrictors, each of the four or more outlet flow restrictors providing fluid communication between one of the four or more reactors and at least one effluent sink, each of the four or more outlet flow restrictors having a flow resistance that varies relative to other outlet flow restrictors in the set.

150. The reaction system of claim 149 wherein
the set of four or more inlet flow restrictors are integral with a substrate or with one or more microchip bodies mounted on a substrate, and
the set of four or more outlet flow restrictors are integral with a substrate or with one or more microchip bodies mounted on a substrate.

151. The reaction system of claim 149 wherein the flow restrictors are microfluidic channels.

152. The reaction system of claim 149 wherein the flow restrictors are capillaries.

153. The reaction system of claim 149 wherein the flow resistance of each of the four or more inlet flow restrictors varies relative to other inlet flow restrictors in the set by a factor of two, and the flow resistance of each of the four or more outlet flow restrictors varies relative to other outlet flow restrictors in the set by a factor of two.

154. The reaction system of claim 149 wherein the pressure-partitioning subsystem comprises
a first plurality of selectable dedicated inlet flow restrictors having different flow resistances, and providing selectable fluid communication between the at least one reactant source and a first reactor of the four or more reactors,
a second plurality of selectable dedicated inlet flow restrictors having different flow resistances, and providing selectable fluid communication between the at least one reactant source and a second reactor of the four or more reactors,
a third plurality of selectable dedicated inlet flow restrictors having different flow resistances, and providing selectable fluid communication between the at least one reactant source and a third reactor of the four or more reactors,
a fourth plurality of selectable dedicated inlet flow restrictors having different flow resistances, and providing selectable fluid communication between the at least one reactant source and a fourth reactor of the four or more reactors, and
a first means for selecting at least one flow restrictor from each of the first plurality, the second plurality, the third plurality and the fourth plurality of selectable dedicated inlet flow restrictors to form the set of four or more inlet flow restrictors and further comprises,
a first plurality of selectable dedicated outlet flow restrictors having different flow resistances, and providing selectable fluid communication between the first reactor and the at least one effluent sink,
a second plurality of selectable dedicated outlet flow restrictors having different flow resistances, and providing selectable fluid communication between the second reactor and the at least one effluent sink,
a third plurality of selectable dedicated outlet flow restrictors having different flow resistances, and providing selectable fluid communication between the third reactor and the at least one effluent sink,
a fourth plurality of selectable dedicated outlet flow restrictors having different flow resistances, and providing selectable fluid communication between the fourth reactor and the at least one effluent sink,
a second means for selecting at least one flow restrictor from each of the first plurality, the second plurality, the third plurality and the fourth plurality of selectable dedicated outlet flow restrictors to form the set of four or more outlet flow restrictors.

155. The reaction system of claim 154 wherein
the first plurality, the second plurality, the third plurality and the fourth plurality of selectable dedicated inlet flow restrictors are integral with a substrate or with one or more microchip bodies mounted on a substrate, and
the first plurality, the second plurality, the third plurality and the fourth plurality of selectable dedicated outlet flow restrictors are integral with a substrate or with one or more microchip bodies mounted on a substrate.

156. The reaction system of claim 154 wherein
the first plurality, the second plurality, the third plurality and the fourth plurality of selectable dedicated inlet flow restrictors are integral with one or more microchip bodies mounted on a substrate, and
the first plurality, the second plurality, the third plurality and the fourth plurality of selectable dedicated outlet flow restrictors are integral with one or more microchip bodies mounted on a substrate.

157. The reaction system of claim 154 wherein
the first plurality, the second plurality, the third plurality and the fourth plurality of selectable dedicated inlet flow restrictors are integral with one or more microchip bodies detachably mounted on a substrate, and
the first plurality, the second plurality, the third plurality and the fourth plurality of selectable dedicated outlet flow restrictors are integral with one or more mircochip bodies detachably mounted on a substrate.

158. The reaction system of claim 154 wherein the first selection means comprises
four or more inlet selection valves for selecting at least one flow restrictor from each of the first plurality, the second plurality, the third plurality and the fourth plurality of selectable dedicated inlet flow restrictors to form the set of four or more inlet flow restrictors, and the second selection means comprises
four or more outlet selection valves for selecting at least one flow restrictor from each of the first plurality, the second plurality, the third plurality and the fourth plurality of selectable dedicated outlet flow restrictors to form the set of four or more outlet flow restrictors.

159. The reaction system of claim 154 wherein the first selection means comprises
a first plurality of inlet isolation valves for selecting at least one flow restrictor from the first plurality of selectable dedicated inlet flow restrictors, a second plurality of inlet isolation valves for selecting at least one flow restrictor from the second plurality of selectable dedicated inlet flow restrictors, a thirds plurality of inlet isolation valves for selecting at least one flow restrictor from the third plurality of selectable dedicated inlet flow restrictors, a fourth plurality of inlet isolation valves for selecting at least one flow restrictor from the fourth plurality of selectable dedicated inlet flow restrictors, and the second selection means comprises
a first plurality of outlet isolation valves for selecting at least one flow restrictor from the first plurality of selectable dedicated outlet flow restrictors, a second plurality of outlet isolation valves for selecting at least one flow restrictor from the second plurality of selectable dedicated outlet flow restrictors, a third plurality of outlet isolation valves for selecting at least one flow restrictor from the third plurality of selectable dedicated outlet flow restrictors, and a fourth plurality of outlet isolation valves for selecting at least one flow restrictor from the fourth plurality of selectable dedicated outlet flow restrictors.

160. The reaction system of claim 159 wherein
the first plurality of inlet isolation valves, the second plurality of inlet isolation valves, the third plurality of inlet isolation valves and the fourth plurality of inlet isolation valves are integral with a substrate or with one or more microchip bodies mounted on a substrate, and
the first plurality of outlet isolation valves, the second plurality of outlet isolation valves, the third plurality of outlet isolation valves and the fourth plurality of outlet isolation valves are integral with a substrate or with one or more microchip bodies mounted on a substrate.

161. The reaction system of claim 159 wherein
the first plurality, the second plurality, the third plurality and the fourth plurality of selectable dedicated inlet flow restrictors are integral with a substrate or with one or more microchip bodies mounted on a substrate, and
the first plurality, the second plurality, the third plurality and the fourth plurality of selectable dedicated outlet flow restrictors are integral with a substrate or with one or more microchip bodies mounted on a substrate.

162. The reaction system of claim 159 wherein
the first plurality of inlet isolation valves, the second plurality of inlet isolation valves, the third plurality of inlet isolation valves and the fourth plurality of inlet isolation valves are integral with a substrate or with one or more microchip bodies mounted on a substrate,
the first plurality of outlet isolation valves, the second plurality of outlet isolation valves, the third plurality of outlet isolation valves and the fourth plurality of outlet isolation valves are integral with a substrate or with one or more microchip bodies mounted on a substrate,
the first plurality, the second plurality, the third plurality and the fourth plurality of selectable dedicated inlet flow restrictors are integral with a substrate or with one or more microchip bodies mounted on a substrate, and
the first plurality, the second plurality, the third plurality and the fourth plurality of selectable dedicated outlet flow restrictors are integral with a substrate or with one or more microchip bodies mounted on a substrate.

163. The reaction system of claim 149 wherein the pressure-partitioning subsystem comprises
a series of selectable sets of inlet flow restrictors, the series comprising (a) a first set of four or more inlet flow restrictors comprising first, second, third and fourth inlet flow restrictors providing fluid communication between at least one reactant source and first second, third and fourth reactors, respectively, each of the first, second, third and fourth inlet flow restrictors of the first set having a different flow resistance relative to each other, (b) a second set of four or more inlet flow restrictors comprising first, second, third and fourth inlet flow restrictors providing fluid communication between the least one reactant source and the first, second, third and fourth reactors, respectively, each of the first, second, third and fourth inlet flow restrictors of the second set having a different flow resistance relative to each other, the flow resistance of at least one of the four or more inlet flow restrictors of the second set varying from the flow resistance of the corresponding inlet flow restrictor of the first set, and (c) a first means for selecting the first set or the second set of inlet flow restrictors to provide fluid communication between the at least one reactant source and the four or more reactors, and
a series of selectable sets of outlet flow restrictors, the series comprising (a) a first set of four or more outlet flow restrictors comprising first, second, third and fourth outlet flow restrictors providing fluid communication between first, second, third and fourth reactors, respectively, and at least one effluent sink, each of the first, second, third and fourth outlet flow restrictors of the first set having a different flow resistance relative to each other, (b) a second set of four or more outlet flow restrictors comprising first, second, third and fourth outlet flow restrictors providing fluid communication between the first, second, third and fourth reactors, respectively, an the at least one effluent sink, each of the first, second, third and fourth outlet flow restrictors of the second set having a different flow resistance relative to each other, the flow resistance of at least one of the four or more outlet flow restrictors of the second set varying from the flow resistance of the corresponding outlet flow restrictor of the first set, and (c) a second means for selecting the first set or the second set of outlet flow restrictors to provide fluid communication between the four or more reactors and the at least one effluent sink.

164. The reaction system of claim 163 wherein
the first set of four or more inlet flow restrictors and the second set of four or more inlet flaw restrictors are integral with a substrate or with one or more microchip bodies mounted on a substrate, and
the first set of four or more outlet flow restrictors and the second set of four or more outlet flow restrictors are integral with a substrate or with one or more microchip bodies mounted on a substrate.

165. The reaction system of claim 163 wherein
the first set of four or more inlet flow restrictors and the second set of four or more inlet flow restrictors are integral with one or more microchip bodies mounted on a substrate, and
the first set of four or more outlet flow restrictors and the second set of four or more outlet flow restrictors are integral with one or more microchip bodies mounted on a substrate.

166. The reaction system of claim 163 wherein
the first set of four or more inlet flow restrictors and the second set of four or more inlet flow restrictors are integral with one or more microchip bodies detachably mounted on the substrate, and
the first set of four or more outlet flow restrictors and the second set of four or more outlet flow restrictors are integral with one or more microchip bodies detachably mounted on the substrate.

167. The reaction system of claim 163 wherein the first selection means comprises
an inlet selection valve for selecting at least one the first set of inlet flow restrictors or the second set of inlet flow restrictors, and
the second selection means comprises an outlet selection valve for selecting at least one the first set of outlet flow restrictors or the second set of outlet flow restrictors.

168. The reaction system of claim 163 wherein the first selection means comprises
a series of inlet isolation valves, the inlet-valve series comprising a first inlet isolation valve for selecting the first set of inlet flow restrictors, and a second inlet isolation valve for selecting the second set of inlet flow restrictors, and
the second selection means comprises a series of outlet isolation valves, the outlet-valve series comprising a first outlet isolation valve for selecting the first set of outlet flow restrictors, and a second outlet isolation valve for selecting the second set of outlet flow restrictors.

169. The reaction system of claim 168 wherein
the first inlet isolation valve and the second inlet isolation valve of the inlet-isolation-valve series are integral with a substrate or with one or more microchip bodies mounted on a substrate, and
the first outlet isolation valve and the second outlet isolation valve of the outlet-isolation-valve series are integral with a substrate or with one or more microchip bodies mounted on a substrate.

170. The reaction system of claim 168 wherein
the first set of four or more inlet flow restrictors and the second set of four or more inlet flow restrictors of the inlet-set series are integral with a substrate or with one or more microchip bodies mounted on a substrate, and
the first set of four or more outlet flow restrictors and the second set of four or more outlet flow restrictors of the outlet-set series are integral with a substrate or with one or more microchip bodies mounted on a substrate.

171. The reaction system of claim 168 wherein
the first inlet isolation valve and the second inlet isolation valve of the inlet-isolation valve series are integral with a substrate or with one or more microchip bodies mounted on a substrate,
the first outlet isolation valve and the second outlet isolation valve of the outlet-isolation-valve series are integral with a substrate or with one or more microchip bodies mounted on a substrate,
the first set of four or more inlet flow restrictors and the second set of four or more inlet flow restrictors of the inlet-set array are integral with a substrate or with one or more microchip bodies mounted on a substrate, and
the first set of four or more outlet flow restrictors and the second set of four or more outlet flow restrictors of the outlet-set series are integral with a substrate or with one or more microchip bodies mounted on a substrate.

172. The reaction system of claim 102 wherein the flow restrictors of the pressure partitioning subsystem are
a first set of four or more inlet flow restrictors, each of the four or more inlet flow restrictors providing fluid communication between at least one reactant source and one of the four or more reactors, each of the four or more inlet flow restrictors having a flow resistance, $R_{inlet}$, that varies relative to other inlet flow restrictors in the set, the pressure-partitioning system further comprising
a second set of four or more outlet flow restrictors, each of the four or more outlet flow restrictors providing fluid communication between one of the four or more reactors and at least one effluent sink, each of the four or more outlet flow restrictors having a flow resistance, $R_{outlet}$, that varies relative to other outlet flow restrictors in the set,
the total resistance of the inlet and outlet flow restrictors for each channel, $R_{total} = R_{inlet} + R_{outlet}$, being substantially the same between each of the four or more channels of the reaction system to provide substantially the same flow rates through each of the four or more reactors, and the ratio of the resistances of the inlet and outlet flow restrictors for each channel, $R_{inlet} : R_{outlet}$, varying between each of the four or more channels of the reaction system to provide a different pressure in the reaction cavities of each of the four or more reactors.

173. The reaction system of claim 172 wherein the flow restrictors are microfluidic channels.

174. The reaction system of claim 172 wherein the flow restrictors are capillaries.

175. A method for evaluating a chemical reaction process, the method comprising simultaneously supplying one or more reactants to each of four or more reactors under reaction conditions to effect a chemical reaction of interest, the one or more reactants being supplied through a fluid distribution system, controllably varying a first set of reaction conditions between the four or more reactors, the first set of reaction conditions being selected from flow rate, pressure and feed composition, and discharging a reactor effluent from each of the four or more reactors, the fluid distribution system comprising one or more subsystems selected from the group consisting of a flow-partitioning subsystem for providing a different flow rate to each of the four or more reactors, the flow-partitioning subsystem comprising at least one set of four or more passive inlet or outlet flow restrictors, wherein each reactor of the four or more reactors is in fluid communication with at least one different passive flow restrictor from the set of four or more passive inlet or outlet flow restrictors than the other reactors, each of the four or more inlet or outlet flow restrictors having a flow resistance that varies relative to other flow restrictors in the set, a pressure-partitioning subsystem for providing a different reaction pressure in the reaction cavity of each of the four or more reactors, the pressure-partitioning subsystem comprising at least one set of four or more passive inlet or outlet flow restrictors, wherein each reactor of the four or more reactors is in fluid communication with at least one different passive flow restrictor from the set of four or more passive inlet or outlet flow restrictors than the other reactors, each of the four or more inlet or outlet flow restrictors having a flow resistance that varies relative to other flow restrictors in the set, and a feed-composition subsystem for providing a different feed composition to each of the four or more reactors, the feed-composition subsystem comprising four or more mixing zones, each mixing zone in fluid communication with an inlet port of a different reactor of the four or more reactors and at least two sets of four or more passive flow restrictors, a first of the two sets of passive flow restrictors in fluid communication with a first reactant source and the four or more mixing zones so that each of the four or more mixing zones is in fluid communication with the first reactant source through at least one passive flow restrictor of the first set of flow restrictors, a second of the two sets of passive flow restrictors in fluid communication with a second reactant source and the four or more mixing zones so that each of the four or more mixing zones is in fluid communication with the second reactant source through at least one passive flow restrictor of the second set of flow restrictors, each of the four or more flow restrictors in a set providing a resistance to flow between the or more reactant sources and one of the four or more mixing zones, each of the four or more flow restrictors in a set having a flow resistance that varies relative to other flow restrictors in the set.

176. A method for evaluating a chemical reaction process, the method comprising simultaneously supplying one or more reactants through a fluid distribution system to each of four or more reactors under reaction conditions to effect a chemical reaction of interest, each of the four or more reactors having a volume of not more than about 10 ml, controllably varying a first set of reaction conditions between the four or more reactors, the first set of reaction conditions being selected from flow rate, pressure and feed composition, and discharging a reactor effluent from each of the four or more reactors through the fluid distribution system, the fluid distribution system comprising one or more subsystems selected from the group consisting of a flow-partitioning subsystem having operational capability for providing a different flow rate to each of the four or more reactors, the flow-partitioning subsystem comprising at least one set of four or more flow restrictors integral with a substrate or with one or more microchip bodies mounted on a substrate, wherein each reactor of the four or more reactors is in fluid communication with at least one different flow restrictor from the set of four or more flow restrictors than the other reactors, a pressure-partitioning subsystem having operational capability for providing a different reaction pressure in the reaction cavity of each of the four or more reactors, the pressure-partitioning subsystem comprising at least one set of four or more flow restrictors integral with a substrate or with one or more microchip bodies mounted on a substrate, wherein each reactor of the four or more reactors is in fluid communication with at least one different flow restrictor from the set of four or more flow restrictors than the other reactors, and a feed-composition subsystem for having operational capability providing a different feed composition to each of the four or more reactors, the feed-composition subsystem comprising four or more mixing zones. each mixing zone in fluid communication with an inlet port of a different reactor of the four or more reactors and at least one two sets of four or more flow restrictors, a first of the two sets of flow restrictors in fluid communication with a first reactant source and the four or more mixing zones so that each of the four or more mixing zones is in fluid communication with the first reactant source through at least one flow restrictor of the first set of flow restrictors, a second of the two sets of flow restrictors in fluid communication with a second reactant source and the four or more mixing zones so that each of the four or more mixing zones is in fluid communication with the second reactant source through at least one flow restrictor of the second set of flow restrictors, each of the four or more flow restrictors in a set providing a resistance to flow between the or more reactant sources and one of the four or more mixing zones, the four or more flow restrictors being integral with a substrate or with one or more microchip bodies mounted on a substrate.

177. The method of claims 175 or 176 further comprising controlling a second set of reaction conditions to be substantially the same in each of the four or more reactors.

178. The method of claims 175 or 176 further comprising analyzing the reactor effluent from each of the four or more reactors to determine the conversion, selectivity or yield of the chemical reaction of interest, and comparing the determined conversion, selectivity or yield for the reactions effected in each of the four or more reactors.

179. The method of claim 178 wherein the reactor effluent from each of the four or more reactors are simultaneously analyzed.

180. The method of claim 178 wherein the reactor effluent from each of the four or more reactors are simultaneously analyzed using gas chromatography or mass spectrometry.

181. The method of claim 178 wherein the reactor effluent from each of the four or more reactors are simultaneously analyzed using gas chromatography.

182. A system comprising four or more cavities, each of the four or more cavities having an inlet providing fluid communication with at least one fluid source, and optionally, where each of the four or more cavities is a flow cavity, an outlet providing fluid communication with at least one effluent sink, and a fluid distribution system comprising one or more subsystems selected from the group consisting of (a) a flow-partitioning subsystem for providing a different flow rate to each of the four or more cavities, (b) a pressure-partitioning subsystem for providing a different pressure in each of the four or more cavities, and (c) a feed-composition subsystem for providing a different feed composition to each of the four or more cavities, the one or more subsystems comprising at least one set of four or more flow restrictors, each of the four or more flow restrictors having a flow resistance that varies relative to other flow restrictors in the set each of the four or more flow restrictors (i) being a capillary or (ii) being integral with a substrate or with one or more microchip bodies mounted on a substrate, wherein in the feed-composition subsystem, the at least one set of flow restrictors is a first set of flow restrictors in fluid communication with a first fluid source and the four or more cavities so that each of the four or more cavities is in fluid communication with the first fluid source through at least one flow restrictor of the first set of flow restrictors, the feed-composition subsystem further comprising a second set of four or more flow restrictors in fluid communication with a second fluid source and the four or more cavities so that each of the four or more cavities is in fluid communication with the second fluid source through at least one flow restrictor of the second set of flow restrictors, each of the second set of four or more flow restrictors (i) being a capillary or (ii) being internal with a substrate or with one or more microchip bodies mounted on a substrate.

183. The system of claim 182 wherein the four or more flow restrictors are integral with a substrate or with one or more microchip bodies mounted on a substrate.

184. The system of claim 182 wherein the four or more flow restrictors are integral with a substrate or with one or more microchip bodies detachably mounted on a substrate.

185. The system of claim 182 wherein the cavity is a flow cavity and comprises the outlet in fluid communication with the at least one effluent sink.

186. The system of claim 182 wherein the cavity has a volume of not more than about 100 ml.

* * * * *

UNITED STATES PATENT AND TRADEMARK OFFICE
CERTIFICATE OF CORRECTION

PATENT NO. : 7,150,994 B2
APPLICATION NO. : 09/801390
DATED : December 19, 2006
INVENTOR(S) : Bergh et al.

It is certified that error appears in the above-identified patent and that said Letters Patent is hereby corrected as shown below:

Col. 52, line 65, delete "part" and replace with --port--
Col. 55, line 45, delete "reactors." and replace with --reactors, --
Col. 56, line 8, delete "between the"
Col. 57, line 2, delete "flaw" and replace with --flow--
Col. 57, line 53, delete "reactor." and replace with --reactors. --
Col. 58, line 25, delete "flaw" and replace with --flow--
Col. 59, line 63, insert --of-- between "least one" and "the"
Col. 62, line 6, delete "an" and replace with --and--
Col. 62, line 59, insert --more-- between "with one or" and "microchip"
Col. 63, line 40, delete "baying" and replace with --having--
Col. 63, line 53, delete "restrictors." and replace with --restrictors,--
Col. 64, line 56, delete "thirds" and replace with --third--
Col. 66, line 18, delete "an" and replace with --and--
Col. 66, line 58, insert --of-- between "at least one" and "the first"
Col. 66, line 62, insert --of-- between "at least one" and "the first"
Col. 67, line 39, delete "any" and replace with --array--
Col. 70, line 23, insert --at-- between "between the" and "least"
Col. 71, line 36, delete "end" and replace with --and--
Col. 72, line 61, insert a comma after the word "first"
Col. 72, line 63, delete "an" and replace with --and--
Col. 74, line 45, insert a comma after the word "restrictors"
Col. 75, line 26, delete "mircochip" and replace with --microchip--
Col. 75, line 48, delete "thirds" and replace with --third--
Col. 76, line 53, insert --at-- between "between the" and "least"
Col. 77, line 10, delete "an" and replace with --and--
Col. 77, line 23, delete "flaw" and replace with --flow--
Col. 79, line 60, delete "or more"
Col. 80, line 50, delete "or more"

UNITED STATES PATENT AND TRADEMARK OFFICE
CERTIFICATE OF CORRECTION

PATENT NO.        : 7,150,994 B2
APPLICATION NO.   : 09/801390
DATED             : December 19, 2006
INVENTOR(S)       : Bergh et al.

It is certified that error appears in the above-identified patent and that said Letters Patent is hereby corrected as shown below:

Col. 82, line 15, delete "internal" and replace with --integral--

Signed and Sealed this

Twenty-ninth Day of May, 2007

JON W. DUDAS
*Director of the United States Patent and Trademark Office*